US011959007B2

(12) United States Patent
Meyer et al.

(10) Patent No.: US 11,959,007 B2
(45) Date of Patent: *Apr. 16, 2024

(54) DIELECTRIC MATERIALS

(71) Applicant: MERCK PATENT GMBH, Darmstadt (DE)

(72) Inventors: Frank Meyer, Glashuetten (DE); Gregor Larbig, Gelnhausen (DE); Karsten Koppe, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/963,604

(22) PCT Filed: Jan. 21, 2019

(86) PCT No.: PCT/EP2019/051317
§ 371 (c)(1),
(2) Date: Jul. 21, 2020

(87) PCT Pub. No.: WO2019/141833
PCT Pub. Date: Jul. 25, 2019

(65) Prior Publication Data
US 2021/0062091 A1  Mar. 4, 2021

(30) Foreign Application Priority Data
Jan. 22, 2018 (EP) ..................... 18152777

(51) Int. Cl.
*C09K 19/20* (2006.01)
*C09K 19/04* (2006.01)
*C09K 19/32* (2006.01)
*C09K 19/34* (2006.01)

(52) U.S. Cl.
CPC .......... *C09K 19/2007* (2013.01); *C09K 19/32* (2013.01); *C09K 19/3483* (2013.01); *C09K 2019/0448* (2013.01); *C09K 2019/2078* (2013.01); *C09K 2219/03* (2013.01)

(58) Field of Classification Search
CPC .................................................. C09K 19/34
See application file for complete search history.

(56) References Cited

U.S. PATENT DOCUMENTS

| | | | |
|---|---|---|---|
| 4,303,775 A | 12/1981 | Chow et al. | |
| 6,169,186 B1 | 1/2001 | Imai et al. | |
| 6,261,481 B1 | 7/2001 | Akatsuka et al. | |
| 8,687,259 B2 * | 4/2014 | Adlem .................. | C09K 19/38 252/299.63 |
| 9,598,587 B2 | 3/2017 | Ramon-Gimenez et al. | |
| 9,644,145 B2 | 5/2017 | Sargent | |
| 2007/0065600 A1 | 3/2007 | Hammond-Smith | |
| 2008/0075961 A1 * | 3/2008 | Mizori .................. | C09J 179/085 524/588 |
| 2008/0210375 A1 * | 9/2008 | Dershem .................. | C07C 69/54 156/332 |
| 2009/0130609 A1 * | 5/2009 | Irving .................. | H01L 27/1225 430/324 |
| 2010/0014010 A1 * | 1/2010 | He .......................... | C09K 19/60 349/13 |
| 2011/0049731 A1 | 3/2011 | Dershem et al. | |
| 2017/0152418 A1 | 6/2017 | Aoyama et al. | |
| 2017/0335192 A1 | 11/2017 | Mulcahy et al. | |
| 2020/0291299 A1 | 9/2020 | Mulcahy et al. | |

FOREIGN PATENT DOCUMENTS

| | | | | |
|---|---|---|---|---|
| CN | 107384440 A | 11/2017 | | |
| DE | 4113586 A1 | 10/1992 | | |
| JP | 2000191640 A | 7/2000 | | |
| JP | 2007509198 A | 4/2007 | | |
| JP | 2016222613 A | 12/2016 | | |
| KR | 20160052234 A | 5/2016 | | |
| WO | 9604351 A1 | 2/1996 | | |
| WO | WO-2009158488 A1 * | 12/2009 | ............. | C09K 19/00 |
| WO | 12152409 A1 | 11/2012 | | |
| WO | 14090369 A1 | 6/2014 | | |
| WO | WO-2014090369 A1 * | 6/2014 | ........... | C09K 19/322 |
| WO | 17148567 A1 | 9/2017 | | |
| WO | WO-2017148567 A1 * | 9/2017 | ......... | C09K 19/3857 |
| WO | 2019040934 A1 | 2/2019 | | |

OTHER PUBLICATIONS

L. H. Sinh et al. „ Thermal, Dielectric, and Rheological Properties of Aluminum Nitride/Liquid Crystalline Copoly(ester amide) Composite for the Application of Thermal Interface Materials; Polymer Composites, 2012, pp. 2140-2146.
H. Q. Pham et al. Epoxy Resins, 2012, 13, pp. 155-244.
C. Ohm et al. "Liquid Crystalline Elastomers as Actuators and Sensors"; Adv. Mater. 2010, 22, pp. 3366-3387.
D. Liu et al. "Liquid Crystal Polymer Networks: Preparation, Properties, and Applications of Films with Patterned Molecular Alignment"; ACS Publications, 2014, 30, pp. 13499-13509.
J. P. F. Lagerwall et al. "A new era for liquid crystal research: Applications of liquid crystals in soft matter nano-, bio- and microtechnology"; Current Applied Physics, 12, 2012, pp. 1387-1412.
R. Stannarius "More than display fillings"; Nature Materials, 2009, vol. 8, pp. 617-618.

(Continued)

*Primary Examiner* — Chanceity N Robinson
(74) *Attorney, Agent, or Firm* — Millen, White, Zelano & Branigan, P.C.; Brion P. Heaney

(57) ABSTRACT

The present invention relates to a novel class of polymers which can be used as dielectric material for the preparation of passivation layers in electronic devices. The polymers are prepared from polymerizable compounds having mesogenic groups and they provide excellent film forming capability and excellent mechanical properties and have a low dielectric constant and a low coefficient of thermal expansion (CTE). There is further provided a method for forming said polymers and an electronic device containing said polymers as dielectric material. Beyond that, the present invention relates to a manufacturing method for preparing a packaged microelectronic structure and to a microelectronic device comprising said packaged microelectronic structure formed by said manufacturing method.

20 Claims, No Drawings

(56) References Cited

OTHER PUBLICATIONS

M. Töpper et al. "A Comparison of Thin Film Polymers for Wafer Level Packaging"; Electronic Components and Technology Conference; 2010, pp. 769-776.
International Search report PCT/EP2019/051317 dated Apr. 18, 2019 (pp. 1-2).
Office Action in corresponding JP application 2020-560561 dated Dec. 19, 2022 (pp. 1-3) and English translation thereof (pp. 1-5).
English translation of Office action in corresponding CN application 201980008713.3 dated Feb. 16, 2023 (pp. 1-11).
A. P. Melissaris et al.; "Thermally stable polymers based on bismaleimides containing amide, imide, and ester linkages"; Journal of Polymer Science, Part A: Polymer Chemistry, vol. 27, pp. 245-262 (1989).
J. Kedzierski et al, Determination of polar anchoring energy coefficient for nematics, substrate systems by wedge cell method, Proceedings of SPIE-4759,—The International Society for Optical Engineering, XIV Conference on Liquid Crystals, Chemistry, Physics, and Applications, pp. 312-320 (Jun. 27, 2002).
Office Action in corresponding Chinese Application 201980008713.3 dated Nov. 21, 2023 (pp. 1-10) and English translation thereof (pp. 1-14).

\* cited by examiner

DIELECTRIC MATERIALS

TECHNICAL FIELD OF THE INVENTION

The present invention relates to a novel class of polymers which can be used as dielectric material for the preparation of passivation layers in packaged electronic devices. The polymers are prepared from polymerizable compounds which have mesogenic groups. Such compounds are also referred to as reactive mesogens (RMs). The polymers obtained therefrom are thus materials with liquid-crystalline features conserved in their structure and they provide excellent film forming capability and excellent mechanical properties such as e.g. good elongation at break and good tensile strength properties. In addition, the polymers are characterized by a low dielectric constant and a low coefficient of thermal expansion (CTE). Beyond that, they are photostructurable and particularly suitable for various applications in electronic packaging such as e.g. the passivation of conductive or semiconducting components and die attach and as a major component in the preparation of substrates for printed circuit boards.

The polymerizable compounds, from which the polymers are formed, have an oligomeric structure with a repeating unit containing a mesogenic group (MG) in the middle of the molecule and polymerizable groups (P), one at each end of the molecule. There is further provided a method for forming said polymers and an electronic device containing said polymers as dielectric material. Beyond that, the present invention relates to a manufacturing method for preparing a packaged microelectronic structure, wherein a dielectric polymer layer is formed from said polymerizable compounds, and to a microelectronic device comprising said packaged microelectronic structure which is obtained or obtainable by said manufacturing method.

The manufacturing method according to the present invention allows a cost-effective and reliable manufacturing of microelectronic devices where the number of defective products caused by mechanical deformation (warping) due to undesirable thermal expansion is significantly reduced. Polymerization can occur at significant lower temperatures and thus leading to lower thermal stress during manufacturing, which reduces the waste of defective microelectronic devices which allows a resource-efficient and sustainable production.

BACKGROUND OF THE INVENTION

Reactive mesogens (RMs), when polymerized at temperatures at which they exhibit thermotropic liquid crystal (LC) phases (typically nematic, cholesteric or smectic), give anisotropic polymers which conserve the liquid crystalline state. In particular, optical anisotropy has been widely exploited in the field of optical films for compensation and brightness enhancement in flat panel displays, especially in liquid crystal displays.

In addition to their wide use in liquid crystal displays and displays, liquid crystalline materials are investigated for their advantages in other application types due to their special physical properties (R. Stannarius, Nat. Mat. 2009, 8, 617-618; and J. P. F. Lagerwall et al., Current Appl. Phys. 2012, 12, 1387-1412). In particular, highly ordered anisotropic polymer networks are an interesting material class with a diverse range of applications (D. J. Broer et al., Lagmuir 2014, 30, 13499-13509; and R. Zentel et al., Adv. Mater. 2010, 22, 3366-3387). However, in most cases the LC polymers or corresponding monomers from which the polymers are made do not have optimum properties required for the respective application.

WO 2012/152409 A1 relates to polymer particles with optical anisotropy and shape anisotropy comprising monomer units of at least one reactive mesogen, a process for their preparation, the use of these particles for the preparation of optical, electrooptical, electronic, electrochemical, electrophotographic, electrowetting and electrophoretic displays and/or devices and security, cosmetic, decorative, and diagnostic applications, and electrophoretic fluids and displays comprising said polymer particles. In particular, the polymer particles have monomer units of at least one RM with at least two polymerizable groups, at least one polymerizable dye as co-monomer, optionally at least one co-monomer, optionally at least one cross-linking co-monomer, optionally at least one ionic co-monomer, and optionally at least one polymerizable stabilizer.

Various processes for the preparation of liquid-crystalline polymers from RMs and for the preparation of the RM starting materials are known from the state of the art. For example, Siemensmeyer et al. describes a process for producing mixtures of LC compounds, wherein at least one of the starting components consists of a mixture of at least two compounds and this mixture is reacted with at least one other starting component to form a statistic mixture (WO 96/04351 A1).

In addition to efficient preparation methods for LC compounds, suitable polymerization methods for forming anisotropic polymer networks are in the focus of interest. A variety of reactive functional groups were investigated for their applicability in photoinitiated polymerization reactions. The most widespread reactive functional groups are acrylates and methacrylates, which are particularly well suited for UV-induced free-radical polymerizations due to their high polymerization rate (D. J. Broer et al., Lagmuir 2014, 30, 13499-13509). However, UV curing is not suitable for all kinds of application.

Mixtures of polymerizable liquid-crystalline monomers (reactive mesogens) can be used to prepare thin films which can be cured by thermal or photoinitiated polymerization. Films which are prepared in this way are relatively thin and contain a highly cross-linked duroplastic polymer which has a pronounced dimensional stability. However, these films are relatively brittle and exhibit very low elasticity. If, on the other hand, the crosslinking degree is reduced, no dimensionally stable polymer films can be obtained.

U.S. Pat. No. 6,261,481 B1 describes an organic insulating composition which provides a good thermal conductivity. The insulating composition contains a liquid crystal (LC) resin comprising a polymerization product of a resin composition containing a monomer which has a mesogenic group. The composition has a thermal conductivity in directions mutually orthogonal to each other of 0.4 W/mK. The monomer contained in the resin composition has a mesogenic group and preferably an epoxy group which can be polymerized thermally under acid catalysis. Preferably, the resin composition is heated under conditions that the monomer having the mesogenic group is partially arranged when the polymerization starts so that the anisotropic properties based on the partial arrangement are frozen in the polymer.

US 2008/0075961 A1 and US 2017/0152418 A1 relate to maleimide adhesive films which are prepared from thermosetting maleimide resins containing imide-extended mono-, bis- and polymaleimide compounds. The maleimide adhesive films are photostructurable and suitable for the production of electronic equipments, integrated circuits, semiconductor devices, passive devices, solar batteries, solar modules, and/or light emitting diodes. However, the maleimide compounds do not contain any mesogenic groups which could impart a preferential direction or partial arrangement of the compound in the film. This results in poorer properties with regard to mechanical stability and thermal conductivity. These materials typically also exhibit a relatively low glass transition point, which again impact their thermal expansion properties.

KR 20160052234 A describes a photocurable insulating resin composition and printed circuit board using the same. The photocurable insulating resin composition comprises a photocurable liquid crystal oligomer; a photocurable graphene oxide; and a photocurable metal alkoxide. However, the photocurable liquid crystal oligomers do not contain multiple mesogenic groups linked together by a spacer group. This results in an unfavorable solubility profile and energies used for photocuring are very high.

Electronic Packaging

As solid-state transistors started to replace vacuum-tube technology, it became possible for electronic components, such as resistors, capacitors, and diodes, to be mounted directly by their leads into printed circuit boards of cards, thus establishing a fundamental building block or level of packaging that is still in use. Complex electronic functions often require more individual components than can be interconnected on a single printed circuit card. Multilayer card capability was accompanied by development of three-dimensional packaging of daughter cards onto multilayer mother boards. Integrated circuitry allows many of the discrete circuit elements such as resistors and diodes to be embedded into individual, relatively small components known as integrated circuit chips or dies. In spite of incredible circuit integration, however, more than one packaging level is typically required, in part because of the technology of integrated circuits itself. Integrated circuit chips are quite fragile, with extremely small terminals. First-level packaging achieves the major functions of mechanically protecting, cooling, and providing capability for electrical connections to the delicate integrated circuit. At least one additional packaging level, such as a printed circuit card, is utilized, as some components (high-power resistors, mechanical switches, capacitors) are not readily integrated onto a chip. For very complex applications, such as mainframe computers, a hierarchy of multiple packaging levels is required.

A wide variety of advanced packaging technologies exist to meet the requirements of today's semiconductor industry. The leading Advanced Packaging technologies—wafer-level packaging (WLP), fan-out wafer level packaging (FOWLP), 2.5D interposers, chip-on-chip stacking, package-on-package stacking, embedded IC—all require structuring of thin substrates, redistribution layers and other components like high resolution interconnects. The end consumer market presents constant push for lower prices and higher functionality on ever smaller and thinner devices. This drives the need for the next generation packaging with finer features and improved reliability at a competitive manufacturing cost.

Wafer-level packaging (WLP) is the technology of packaging an integrated circuit while still part of the wafer, in contrast to the more conventional method of slicing the wafer into individual circuits (dice) and then packaging them. WLP is essentially a true chip-scale package (CSP) technology, since the resulting package is practically of the same size as the die. Wafer-level packaging allows integration of wafer fab, packaging, test, and burn-in at wafer level in order to streamline the manufacturing process undergone by a device from silicon start to customer shipment. Major application areas of WLP are smartphones and wearables due to their size constraints. Functions provided WLPs in smartphones or wearables include: compass, sensors, power management, wireless etc. Wafer-level chip scale packaging (WL-CSP) is one of the smallest packages currently available on the market.

Fan-out wafer level packaging (FOWLP) is one of the latest packaging trends in microelectronics: FOWLP has a high miniaturization potential both in the package volume as well as in the packaging thickness. Technological basis of FOWLP is a reconfigured, painted wafer with embedded chips and a thin film rewiring layer, which together form a surface-mounted device (SMD)-compatible package. The main advantages of the FOWLP are a very thin, because substrateless package, the low thermal resistance, good high-frequency properties due to short and planar electrical connections together with a bumpless chip connection instead of e.g. wire bonds or solder contacts.

For electronic packaging, different types of material are needed, from which the substrate, electrically conductive connections and insulating or passivating coatings are made. Substrate insulator materials for multichip and single-chip modules are selected from one of two broad groups of materials, organics and ceramics. Chip-to-package interconnection is typically achieved by one of three techniques: wire bond, tape-automated bond, and solder-ball flip chip. The wire bond is the most widely used first-level interconnection; it employs ultrasonic energy to weld very fine wires mechanically from metallized terminal pads along the periphery of the integrated circuit chip to corresponding bonding pads on the surface of the substrate.

Another important role play polymers which are key building blocks for all WLP and related technologies such as IPD (integrated passives devices) and 3D-SiP (system in Package). A couple of different classes of photo-sensitive polymeric materials are available for the integration, for example: polyimide (PI), polybenzoxazole (PBO), benzocyclobutene (BCB), silicones, acrylates and epoxy resins.

Polymeric coatings such as polyurethanes, acrylic, epoxy and silicone resins have been used for over 40 years to protect printed wiring boards (PWB) from moisture, handling and environmental influences. Special semiconductor grade polymers have been developed for chip passivation layers. Especially for epoxy resins multiple distillation procedures were introduced to remove the sodium and chloride ions which are by-products in the standard epoxy synthesis. Polyimide became the standard passivation layer for memory chips and other devices with the need of surface protection for the handling and testing procedure. Photo-sensitive resins have been developed to reduce processing cost.

Dry-etching requires a masking process with either a hard mask which is a sputtered and structured metal layer or a thick photo resist coating. Due to cost saving programs the in-depth characterization of material that was prevalent in the 1960s through the 1990s has slowed down considerably. In addition, due to mergers, spin-offs and low economic margins, the continuity of polymeric products is not always given. In contrast to that, polymeric materials became more important with the introduction of new packaging concepts for ICs like WLP, SiP and 3-D integration.

There is a wide range of material classes which could be used as a polymeric dielectric for WLP: polyimide, polybenzoxazole, benzocyclobutene, epoxy, silicone, acrylate, nanofilled phenol resin, siloxane, fluorinated polymer and polynorbornene. A profound overview of photo-sensitive formulations is given in M. Töpper et al., 2010 Electronic Components and Technology Conference, 769-776.

Polyimide-ODA was the first member of a series of new high performance polymers based on alternate aromatic homocyclic and heterocyclic rings developed by Du Pont:

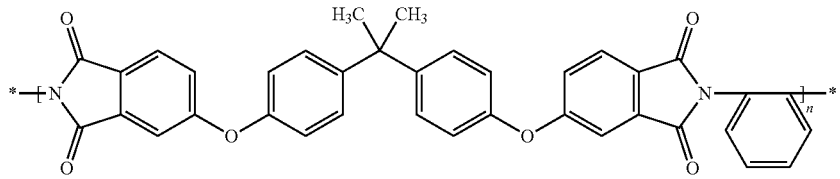 [SMILES: *c1ccccc1N1C(=O)c2ccc(Oc3ccc(C(C)(C)c4ccc(Oc5ccc6c(c5)C(=O)N(*)C6=O)cc4)cc3)cc2C1=O]

Polyimides are quite unique to their very high decomposition temperature which can go up to over 400° C. In addition, their mechanical properties guarantee a high flexibility (elongation at break up to 100%) with a very high tensile strength of over 200 MPa. PI is still the most popular polymer for IC passivation.

A modification to the negative-sensitive polymer PI was achieved by polybenzoxazole (PBO) which is sometime also called a positive-sensitive PI:

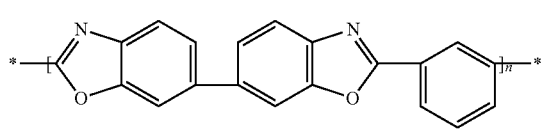 [SMILES: *c1cccc(-c2nc3ccc(-c4ccc5nc(*)oc5c4)cc3o2)c1]

The polymer film can be developed after photo-exposure using an aqueous developer.

Siloxanes are polymers which have a back-bone of Si—O-groups. The so-called BCB (benzocyclobutene) is an example of a siloxane-polymer group having in addition a vinyl and a benzocyclobutene ring system:

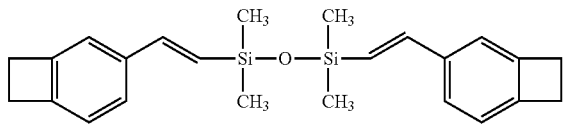 [SMILES: C[Si](C)(/C=C/c1ccc2c(c1)CC2)O[Si](C)(C)/C=C/c1ccc2c(c1)CC2]

A major advantage is the polymerization reaction (Diels-Alder reaction) which has high atomic economy, since no by-products occur. This highly-crosslinked thermoset polymer has excellent electrical performance, but is quite brittle with a low elongation to break value (8%) and low tensile strength of 87 MPa.

Epoxy polymers are the basis for most PWBs. A major advantage is their low curing temperature suitable for temperature sensitive devices. Important examples are Novolak-based epoxy resins:

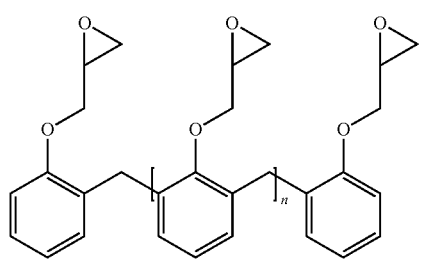

Epoxy and acrylate polymers are also available as dry-film materials. All other dielectrics have to be deposited by spin or spray coating.

Newer developments are polynorbornenes which are bridged cyclic hydrocarbons giving polymers by ring-opening metathesis polymerization or vinyl-addition polymerization:

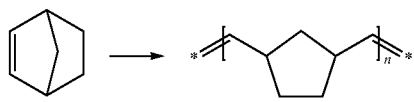

The processing of all liquid type photo-sensitive thin film polymers is quite similar: coating (mostly spin coating), exposure (UV), post exposure bake (not all polymers), development, post exposure bake and cure.

The requirements for the selection of a given polymer are quite broad: high decomposition or glass temperature for high temperature processes in packaging like solder reflow, high adhesion, high mechanical and chemical strength, excellent electrical properties, low water uptake, photosensitivity and high yield manufacturability. For these reasons, thermosets are usually used for packaging applications. They are manufactured and employed as pre-polymers which have a molecular weight of several 100.000 g/mol and are dissolved in an organic solvent. Such solutions are commonly called pre-cursors and are ready for the spin coating process. The final polymerization is performed on the wafer by thermal curing.

However, the polymers known from the state of the art show the following drawbacks:
  Polyimides and polybenzoxazoles typically require very high processing temperatures which increase the risk for warping, especially in multilayer redistribution layers (RDLs). In addition to that, polyimides show a high water uptake which is a problem for reliability of the devices.
  Benzocyclobutene derivatives as well as polynorbornenes show a very low dielectric constant, but this advantage is compromised by very poor adhesion to metals.

Photolithography

Photolithography has long been the key patterning technology for structuring inorganic and organic materials used in advanced packaging applications like flip-chip wafer bumping, electroplated gold, solder bumps, copper pillar technologies and redistribution layers. Photolithography is a key manufacturing process and cost contributor; the careful selection of the right exposure solution is critical to achieve the best possible cost structure in today's industrial lithography applications.

Current drivers and trends in the semiconductor industry clearly show that performance improvements of microelectronic devices are needed to meet the future end user requirements. For example, consumer electronic devices like tablets and smartphones are getting thinner and smaller while gaining higher computing power, increased data storage, and improved communication capabilities. In addition, cost considerations become more and more important in the competitive landscape for all parties within the supply chain, from the chip manufacturers, foundries, assembly and test suppliers to the device manufacturers. Therefore, the industry strives for innovative approaches to lower manufacturing costs coupled with enabling technologies that meet the challenging technical requirements.

For decades, photolithography has been and still is the fundamental process used in the fabrication and packaging of microelectronic devices. A key component of any photolithography process is the exposure tool, which uses light in the ultraviolet wavelength range to pattern a photosensitive resist or polymer. The exposure tool must be able to precisely create the desired features and align them to the previously fabricated structures in the underlying layers. Several types of exposure technologies exist today: proximity or contact printing, laser direct imaging, and projection lithography. The corresponding equipment toolsets differ in terms of technical capability (optical resolution, overlay performance and effective throughput), and the costs related to the exposure process. (see H. Hichri et al., SÜSS Micro Tec Photonic System Inc., Corona, CA, USA).

OBJECT OF THE INVENTION

Hence, it is an object of the present invention to overcome the disadvantages in the prior art and to provide a new class of polymers which can be used as a dielectric material in passivation layers of packaged electronic devices showing excellent film forming capability, easy processing from conventional solvents and excellent mechanical properties such as e.g. good elongation at break and good tensile strength properties and having a low dielectric constant and a low coefficient of thermal expansion (CTE).

Moreover, it is an object of the present invention to provide a novel polymer which is photostructurable and particularly suitable for various applications in electronic packaging such as e.g. the passivation of conductive or semiconducting components and die attach and as a major component in the preparation of substrates for printed circuit boards.

It is a further object of the present invention to provide a polymerizable compound as a monomer from which the novel polymer is made of. Beyond that, it is an object of the present invention to provide a method for forming said novel polymer using the polymerizable compound. Finally, it is an object of the present invention to provide an electronic device comprising said polymer as dielectric material, a manufacturing method for preparing a packaged microelectronic structure and a microelectronic device comprising said packaged microelectronic structure which is obtainable by said manufacturing method.

SUMMARY OF THE INVENTION

The present inventors have surprisingly found that the above objects are achieved by a polymer containing repeating units derived from a specific polymerizable compound which preferably is a polymerizable direactive mesogenic compound.

The polymerizable compound is represented by Formula (1):

$$P^1\text{-}Sp^1\text{-}(MG\text{-}Sp^1)_m\text{-}P^1 \quad \text{Formula (1)}$$

wherein:
m is an integer from 1 to 60, preferably 1 to 50, more preferably 2 to 30, and most preferably 3 to 20;
$P^1$ denotes a polymerizable group (P);
$Sp^1$ denotes at each occurrence a spacer group (Sp) or a single bond;
MG is a rod-shaped mesogenic group, which is preferably selected from Formula (2):

$$\text{-}(A^{21}\text{-}Z^{21})_k\text{-}A^{22}\text{-}(Z^{22}\text{-}A^{23})_l\text{-} \quad \text{Formula (2)}$$

wherein:
$A^{21}$ to $A^{23}$ are independently and at each occurrence independently of one another an aryl group, heteroaryl group, heterocyclic group, alicyclic group or cyclic imide group optionally being substituted by one or more identical or different groups L;
$Z^{21}$ and $Z^{22}$ are independently and at each occurrence independently from each other, —O—, —S—, —CO—, —COO—, —OCO—, —S—CO—, —CO—S—, —O—COO—, —CO—NR$^{01}$—, —NR$^{01}$—CO—, —NR$^{01}$—CO—NR$^{02}$, —NR$^{01}$—CO—O—, —O—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^{01}$—, —CY$^{01}$=CY$^{02}$—, —C≡C—, —CH=CH—COO—, —OCO—CH=CH—, or a single bond;
$R^{01}$ and $R^{02}$ each, independently of one another, denote H or alkyl having 1 to 12 C atoms;
L is F, Cl, Br, I, —CN, —NO$_2$, —NCO, —NCS, —OCN, —SCN, —C(=O)NR$^{xx}$R$^{yy}$, —C(=O)OR$^{xx}$, —C(=O)R$^{xx}$, —NR$^{xx}$R$^{yy}$, —OH, —SF$_5$, or straight chain or branched chain alkyl, alkoxy, alkylcarbonyl, alkoxycarbonyl, alkylcarbonyloxy or alkoxycarbonyloxy with 1 to 20 C atoms, preferably 1 to 12 C atoms, wherein one or more H atoms are optionally replaced by F or Cl, preferably F, —CN or straight chain or branched chain alkyl, alkoxy, alkylcarbonyl, alkoxycarbonyl, alkylcarbonyloxy or alkoxycarbonyloxy with 1 to 6 C atoms;
$R^{xx}$ and $R^{yy}$ independently of each other denote H or alkyl with 1 to 12 C atoms;
$Y^{01}$ and $Y^{02}$ each, independently of one another, denote H, alkyl having 1 to 12 C atoms, aryl, F, Cl, or CN; and
k and l are each and independently 0, 1, 2, 3 or 4, preferably 0, 1 or 2, most preferably 1.

Said polymerizable compounds are used as monomer compounds to form a new class of polymers. Said new class of polymers is prepared by the following method which also forms part of the present invention:

Method for forming a polymer, wherein the method comprises the following steps:
(i) providing a polymerizable starting material comprising one or more polymerizable compounds according to the present invention; and
(ii) polymerizing said polymerizable starting material.

Moreover, a polymer is provided which is obtainable or obtained by the above-mentioned method for forming a polymer.

Beyond that, an electronic device is provided comprising a polymer according to the present invention.

Finally, a manufacturing method for preparing a packaged microelectronic structure is provided, in which a substrate is provided with a coating comprising one or more polymerized liquid crystalline monomers, wherein the method comprises the following steps:

(1) applying a polymerizable composition comprising one or more polymerizable compounds according to the present invention to a surface of a substrate; and
(2) curing said polymerizable composition to form a dielectric layer.

There is also provided a microelectronic device comprising a packaged microelectronic structure being obtainable or obtained by the manufacturing method according to the present invention.

Preferred embodiments of the present invention are described hereinafter and in the dependent claims.

BRIEF DESCRIPTION OF THE FIGURES

The present application does not contain any figures.

DETAILED DESCRIPTION

Definitions

The term "liquid crystal", "mesomorphic compound", or "mesogenic compound" (also shortly referred to as "mesogen") means a compound that under suitable conditions of temperature, pressure and concentration can exist as a mesophase or in particular as a LC phase. Non-amphiphilic mesogenic compounds comprise for example one or more calamitic, banana-shaped or discotic mesogenic groups.

The term "calamitic" means a rod- or board/lath-shaped compound or group. The term "banana-shaped" means a bent group in which two, usually calamitic, mesogenic groups are linked through a semi-rigid group in such a way as not to be co-linear. The term "discotic" means a disc- or sheet-shaped compound or group.

The term "mesogenic group" or its abbreviation "MG" means a group with the ability to induce liquid crystal (LC) phase behavior. Mesogenic groups, especially those of the non-amphiphilic type, are usually either calamitic or discotic. The compounds comprising mesogenic groups do not necessarily have to exhibit an LC phase themselves. It is also possible that they show LC phase behavior only in mixtures with other compounds, or when the mesogenic compounds or the mixtures thereof are polymerized. For the sake of simplicity, the term "liquid crystal" is used hereinafter for both mesogenic and LC materials.

A calamitic mesogenic compound is usually comprising a calamitic, i.e. rod- or lath-shaped, mesogenic group consisting of one or more aromatic or alicyclic groups connected to each other directly or via linkage groups, optionally comprising terminal groups attached to the short ends of the rod, and optionally comprising one or more lateral groups attached to the long sides of the rod, wherein these terminal and lateral groups are usually selected e.g. from carbyl or hydrocarbyl groups, polar groups like halogen, nitro, hydroxy, etc., or polymerizable groups.

A discotic mesogenic compound is usually comprising a discotic, i.e. relatively flat disc- or sheet-shaped mesogenic group consisting for example of one or more condensed aromatic or alicyclic groups, like for example triphenylene, and optionally comprising one or more terminal groups that are attached to the mesogenic group and are selected from the terminal and lateral groups mentioned above.

The term "reactive mesogen" or its abbreviation "RM" means a polymerizable mesogenic or liquid crystalline compound, which is preferably a monomeric or oligomeric compound. Polymerizable compounds with one polymerizable group are also referred to as "monoreactive" compounds, compounds with two polymerizable groups as "direactive" compounds, and compounds with more than two polymerizable groups as "multireactive" compounds. Compounds without a polymerizable group are also referred to as "non-reactive" compounds.

The term "spacer" or "spacer group", also referred to as "Sp" below, is known to the person skilled in the art and is described in the literature. Unless stated otherwise, the term "spacer" or "spacer group" above and below denotes a flexible organic group, which in a polymerizable mesogenic compound ("RM") connects the mesogenic group and the polymerizable group(s).

The term "polymer" includes, but is not limited to, homopolymers, copolymers, for example, block, random, and alternating copolymers, terpolymers, quaterpolymers, etc., and blends and modifications thereof. Furthermore, unless otherwise specifically limited, the term "polymer" shall include all possible configurational isomers of the material. These configurations include, but are not limited to isotactic, syndiotactic, and atactic symmetries. A polymer is a molecule of high relative molecular mass, the structure of which essentially comprises the multiple repetition of units (i.e. repeating units) derived, actually or conceptually, from molecules of low relative mass (i.e. monomers). In the context of the present invention polymers are composed of more than 60 monomers.

The term "oligomer" is a molecular complex that consists of a few monomer units, in contrast to a polymer, where the number of monomers is, in principle, unlimited. Dimers, trimers and tetramers are, for instance, oligomers composed of two, three and four monomers, respectively. In the context of the present invention oligomers may be composed of up to 60 monomers.

The term "monomer" as used herein refers to a molecule which can undergo polymerization thereby contributing constitutional units (repeating units) to the essential structure of a polymer or an oligomer.

The term "homopolymer" as used herein stands for a polymer derived from one species of (real, implicit or hypothetical) monomer.

The term "copolymer" as used herein generally means any polymer derived from more than one species of monomer, wherein the polymer contains more than one species of corresponding repeating unit. In one embodiment the copolymer is the reaction product of two or more species of monomer and thus comprises two or more species of corresponding repeating unit. It is preferred that the copolymer comprises two, three, four, five or six species of repeating unit. Copolymers that are obtained by copolymerization of three monomer species can also be referred to as terpolymers. Copolymers that are obtained by copolymerization of four monomer species can also be referred to as quaterpolymers. Copolymers may be present as block, random, and/or alternating copolymers.

The term "block copolymer" as used herein stands for a copolymer, wherein adjacent blocks are constitutionally different, i.e. adjacent blocks comprise repeating units derived from different species of monomer or from the same species of monomer but with a different composition or sequence distribution of repeating units.

Further, the term "random copolymer" as used herein refers to a polymer formed of macromolecules in which the probability of finding a given repeating unit at any given site in the chain is independent of the nature of the adjacent repeating units. Usually, in a random copolymer, the sequence distribution of repeating units follows Bernoullian statistics.

The term "alternating copolymer" as used herein stands for a copolymer consisting of macromolecules comprising two species of repeating units in alternating sequence.

"Electronic packaging" is a major discipline within the field of electronic engineering, and includes a wide variety of technologies. It refers to inserting discrete components, integrated circuits, and MSI (medium-scale integration) and LSI (large-scale integration) chips (usually attached to a lead frame by beam leads) into plates through hole on multilayer circuit boards (also called cards), where they are soldered in place. Packaging of an electronic system must consider protection from mechanical damage, cooling, radio frequency noise emission, protection from electrostatic discharge maintenance, operator convenience, and cost.

The term "microelectronic device" as used herein refers to electronic devices of very small electronic designs and components. Usually, but not always, this means micrometer-scale or smaller. These devices typically contain one or more microelectronic components which are made from semiconductor materials and interconnected in a packaged structure to form the microelectronic device. Many electronic components of normal electronic design are available in a microelectronic equivalent. These include transistors, capacitors, inductors, resistors, diodes and naturally insulators and conductors can all be found in microelectronic devices. Unique wiring techniques such as wire bonding are also often used in microelectronics because of the unusually small size of the components, leads and pads.

Points of attachment (binding sites) of structural elements presented in this patent application may be indicated by

wherein * represents the structural element and

a binding site.

PREFERRED EMBODIMENTS

Polymerizable Compound

The present invention relates to a polymerizable compound represented by Formula (1):

$$P^1\text{-}Sp^1\text{-}(MG\text{-}Sp^1)_m\text{-}P^1 \quad \text{Formula (1)}$$

wherein:
m is an integer from 1 to 60;
$P^1$ denotes a polymerizable group (P);
$Sp^1$ denotes at each occurrence a spacer group (Sp) or a single bond;
MG is a rod-shaped mesogenic group, which is preferably selected from Formula (2):

$$\text{-}(A^{21}\text{-}Z^{21})_k\text{-}A^{22}\text{-}(Z^{22}\text{-}A^{23})_l\text{-} \quad \text{Formula (2)}$$

wherein:
$A^{21}$ to $A^{23}$ are independently and at each occurrence independently of one another an aryl group, heteroaryl group, heterocyclic group, alicyclic group or cyclic imide group optionally being substituted by one or more identical or different groups L;
$Z^{21}$ and $Z^{22}$ are independently and at each occurrence independently from each other, —O—, —S—, —CO—, —COO—, —OCO—, —S—CO—, —CO—S—, —O—COO—, —CO—NR$^{01}$—, —NR$^{01}$—CO—, —NR$^{01}$—CO—NR$^{02}$—, —NR$^{01}$—CO—O—, —O—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH═N—, —N═CH—, —N═N—, —CH═CR$^{01}$—, —CY$^{01}$═CY$^{02}$—, —C≡C—, —CH═CH—COO—, —OCO—CH═CH—, or a single bond;
$R^{01}$ and $R^{02}$ each, independently of one another, denote H or alkyl having 1 to 12 C atoms;
L is F, Cl, Br, I, —CN, —NO$_2$, —NCO, —NCS, —OCN, —SCN, —C(═O)NR$^{xx}$R$^{yy}$, —C(═O)OR$^{xx}$, —C(═O)R$^{xx}$, —NR$^{xx}$R$^{yy}$, —OH, —SF$_5$, or straight chain or branched chain alkyl, alkoxy, alkylcarbonyl, alkoxycarbonyl, alkylcarbonyloxy or alkoxycarbonyloxy with 1 to 20 C atoms, preferably 1 to 12 C atoms, wherein one or more H atoms are optionally replaced by F or Cl, preferably F, —CN or straight chain or branched chain alkyl, alkoxy, alkylcarbonyl, alkoxycarbonyl, alkylcarbonyloxy or alkoxycarbonyloxy with 1 to 6 C atoms;
$R^{xx}$ and $R^{yy}$ independently of each other denote H or alkyl with 1 to 12 C atoms;
$Y^{01}$ and $Y^{02}$ each, independently of one another, denote H, alkyl having 1 to 12 C atoms, aryl, F, Cl, or CN; and
k and l are each and independently 0, 1, 2, 3 or 4.

The polymerizable compound according to the present invention is preferably a polymerizable direactive mesogenic compound.

The polymerizable group P is a group capable to undergo a polymerization reaction such as, for example, a radical or ionic chain polymerization, a polyaddition or a polycondensation, or capable to undergo a polymerization analogous reaction such as, for example, an addition or a condensation on a polymer backbone.

It is preferred that the index m is from 1 to 50. More preferably, the index m is from 2 to 30, and most preferably from 3 to 20.

It is preferred that $Z^{21}$ and $Z^{22}$ are independently and at each occurrence independently from each other —COO—, —OCO—, —CO—O—, —O—CO—, —OCH$_2$—, —CH$_2$O—, —CH$_2$CH$_2$—, —(CH$_2$)$_4$—, —CF$_2$CH$_2$—, —CH$_2$CF$_2$—, —CF$_2$CF$_2$—, —C≡C—, —CH═CH—COO—, —OCO—CH═CH—, or a single bond.

Preferably, k and l are each and independently 0, 1 or 2, more preferably k and l are 1.

Preferred polymerizable groups P are selected from groups containing a C═C double bond or a C≡C triple bond, and from groups which are suitable for polymerization by a ring-opening reaction, such as, for example, oxetane or epoxide groups.

More preferred polymerizable groups P are selected from the list consisting of CH$_2$═CW$^1$—COO—, CH$_2$═CW$^1$—CO—,

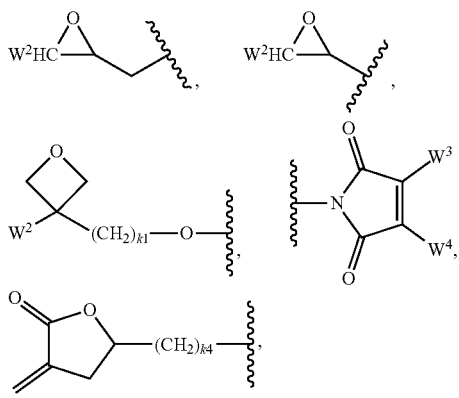

$CH_2=CW^2-(O)_{k3}-$, $CW^1_2=CH-CO-(O)_{k3}-$, $CW^1_2=CH-CO-NH-$, $CH_2=CW^1-CO-NH-$, $CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $CH_2=CW^1-CO-NH-$, $CH_2=CH-(COO)_{k1}$-Phe-$(O)_{k2}-$, $CH_2=CH-(CO)_{k1}$-Phe-$(O)_{k2}-$, and Phe-$CH=CH-$, wherein:

$W^1$ denotes H, F, Cl, CN, $CF_3$, phenyl or alkyl having 1 to 5 C atoms, more preferably H, F, Cl or $CH_3$;

$W^2$ denotes H or alkyl having 1 to 5 C atoms, more preferably H, methyl, ethyl or n-propyl;

$W^3$ and $W^4$ each, independently of one another, denote H, Cl or alkyl having 1 to 5 C atoms;

Phe denotes 1,4-phenylene, which is optionally substituted by one or more radicals L as being defined above but being different from P-Sp, preferably preferred substituents L are F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ and phenyl; and $k_1$, $k_2$ and $k_3$ each, independently of one another, denote 0 or 1, $k_3$ preferably denotes 1; and $k_4$ is an integer from 1 to 10.

Most preferred polymerizable groups P are vinyloxy, acrylate, methacrylate, fluoroacrylate, chloroacrylate, oxetane, epoxy, maleimide, 3-methyl maleimide, 3-ethyl maleimide, 3-propyl maleimide, 3,4-dimethyl maleimide, 3-methyl-4-ethyl maleimide, 3-methyl-4-propoyl maleimide, 3,4-diethyl maleimide, 3-ethyl-4-propoyl maleimide and 3,4-dipropyl maleimide groups, most preferably acrylate, methacrylate, maleimide and 3,4-dimethyl maleimide groups.

Preferred spacer groups Sp are selected from the formula Sp'-X', so that the radical "P-Sp-" corresponds to the formula "P-Sp'-X'—", wherein:

Sp' denotes
(a) straight chain or branched chain alkylene having 1 to 40, preferably 1 to 30 C atoms, which is optionally mono- or polysubstituted by F, Cl, Br, I or CN and in which, in addition, one or more non-adjacent $CH_2$ groups may each be replaced, independently of one another, by —O—, —S—, —NH—, —$NR^{01}$—, —$SiR^{01}R^{02}$—, —CO—, —COO—, —OCO—, —OCO—O—, —S—CO—, —CO—S—, —$NR^{01}$—CO—O—, —O—CO—$NR^{01}$—, —$NR^{01}$—CO—$NR^{01}$—, —CH=CH— or —C≡C— in such a way that O and/or S atoms are not linked directly to one another, or (b) -$Sp^x$-G-$Sp^y$-, wherein $Sp^x$ and $Sp^y$ denote independently of each other alkylene having 1 to 20 C atoms, preferably 1 to 12 C atoms, or a single bond; G denotes cycloalkylene having 3 to 20 C atoms, preferably 5 to 12 C atoms, which is optionally mono- or polysubstituted by alkyl having 1 to 20 C atoms, preferably 1 to 12 C atoms;

X' denotes —O—, —S—, —CO—, —COO—, —OCO—, —O—COO—, —CO—$NR^{01}$—, —$NR^{01}$—CO—, —$NR^{01}$—CO—$NR^{01}$—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=C—, —N=N—, —CH=$CR^{01}$—, —$CY^{01}$=$CY^{02}$—, —C≡C—, —CH=CH—COO—, —OCO—CH=CH— or a single bond, preferably —O—, —S—, —CO—, —COO—, —OCO—, —O—COO—, —CO—$NR^0$—, —$NR^{01}$—CO—, —$NR^{01}$—CO—$NR^{01}$— or a single bond;

$R^{01}$ and $R^{02}$ each, independently of one another, denote H or alkyl having 1 to 12 C atoms; and $Y^{01}$ and $Y^{02}$ each, independently of one another, denote H, F, Cl or CN.

Preferred groups Sp' are in each case selected from straight chain methylene, ethylene, propylene, butylene, pentylene, hexylene, heptylene, octylene, nonylene, decylene, undecylene, dodecylene, and octadecylene, cyclohexylene, ethyleneoxyethylene, methyleneoxybutylene, ethylenethioethylene, ethylene-N-methyliminoethylene, 1-methylalkylene, ethenylene, propenylene and butenylene.

More preferred spacer groups Sp are selected from the list consisting of —$(CH_2)_{p1}$—, —$(CH_2CH_2O)_{q1}$—$CH_2CH_2$—, —$CH_2CH_2$—S—$CH_2CH_2$—, —$CH_2CH_2$—NH—$CH_2CH_2$—, —$(SiR^{01}R^{02}$—$O)_{p1}$—, —$(CH_2)_{p1}$-(cyclo-$C_6H_8R^{01}R^{02}$)—$(CH_2)_{p1}$—, and

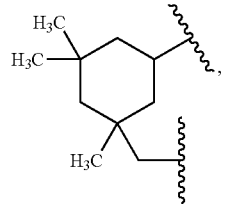

wherein:

p1 is an integer from 1 to 60, preferably from 1 to 36, more preferably from 1 to 12;

q1 is an integer from 1 to 12, preferably from 1 to 3; and $R^{01}$ and $R^{02}$ each, independently of one another, denote H or alkyl having 1 to 12 C atoms.

Most preferred groups Sp are —$(CH_2)_{p1}$—, —O—$(CH_2)_{p1}$—, —O—$(CH_2)_{p1}$—O—, —OCO—$(CH_2)_{p1}$—, and —OCOO—$(CH_2)_{p1}$—, in which p1 is an integer from 1 to 36, preferably from 1 to 12.

In a preferred embodiment of the present invention, the groups $A^{21}$ to $A^{23}$ denote independently and, in case of multiple occurrence, independently of one another, a moiety selected from the following groups a) to e):

a) trans-1,4-cyclohexylene, 1,4-cyclohexenylene and 4,4'-bicyclohexylene, in which one or more non-adjacent $CH_2$ groups may be replaced by —O— and/or —S— and wherein one or more H atoms may be replaced by a group L;

b) 1,4-phenylene, 1,3-phenylene, 4,4'-biphenylene, 2,5-thiphene and 2,6-dithieno[3,2-b:2',3'-d]thiophene in which one or two CH groups may be replaced by N and where one or more H atoms may be replaced by a group L;
c) tetrahydropyran-2,5-diyl, 1,3-dioxane-2,5-diyl, tetrahydrofuran-2,5-diyl, cyclobut-1,3-diyl, piperidine-1,4-diyl, thiophene-2,5-diyl and selenophen-2,5-diyl, which may be substituted one or more groups L;
d) saturated, partially unsaturated or completely unsaturated, and optionally substituted, polycyclic radicals having 5 to 20 cyclic C atoms, of which one or more can also be replaced by heteroatoms, preferably selected from the group consisting of bicyclo [1.1.1] pentane-1,3-diyl, bicyclo [2.2.2] octane-1,4-diyl, spiro [3.3] heptane-2,6-diyl, tricyclo [3.3.1.1] decane-1,3-diyl,

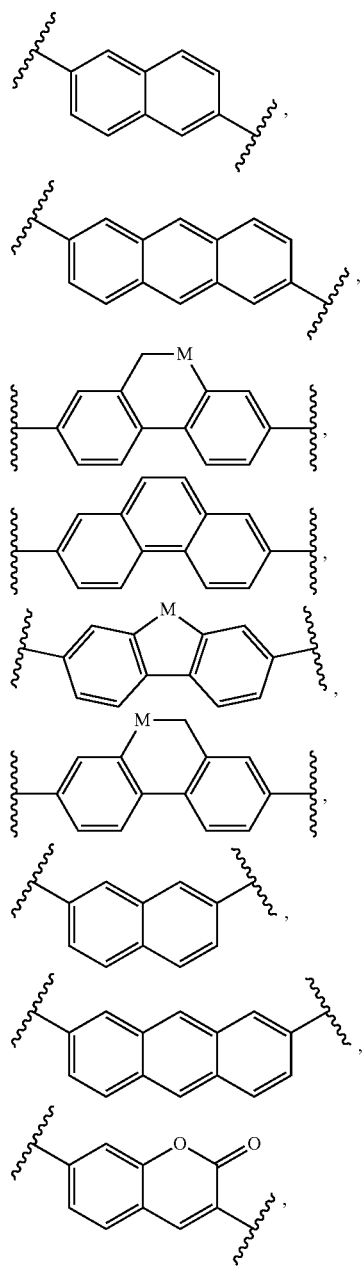

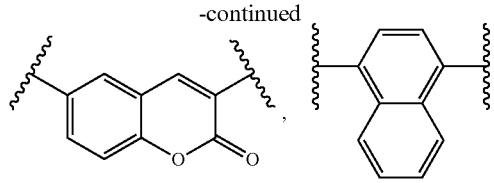

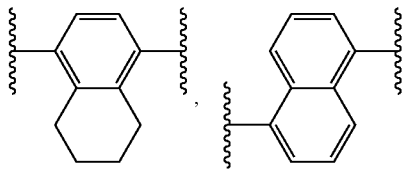

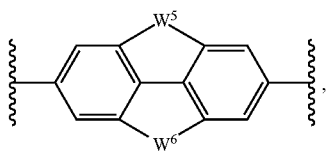

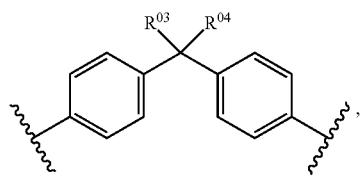

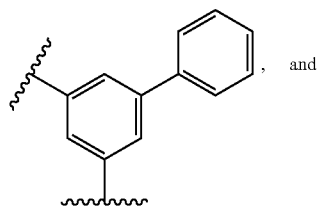

, and

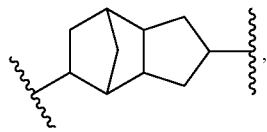

where one or more H atoms may be replaced by a group L, and/or one or more double bonds may be replaced by single bonds, and/or one or more CH groups may be replaced by N, and where M denotes —O—, —S—, —CH$_2$—, —CHY$^{03}$— or —CY$^{03}$Y$^{04}$—;

Y$^{03}$, Y$^{04}$ denote independently of each other one of the meanings given above for R$^{01}$, F, Cl, CN, OCF$_3$ or CF$_3$, and preferably H, F, Cl, CN, OCF$_3$ or CF$_3$;

W$^5$, W$^6$ denote independently of each other —CH$_2$CH$_2$—, —CH=CH—, —CH$_2$—O—, —O—CH$_2$—, —C(R$^c$R$^d$)— or —O—;

R$^c$, R$^d$ denote independently of each other H or alkyl having 1 to 6 C atoms, preferably H, methyl or ethyl; and R$^{03}$, R$^{04}$ denote independently of each other H, F, straight chain or branched chain alkyl having 1 to 12 C atoms where one or more H atoms may be replaced by F;

e) cyclic imides selected from the group consisting of:
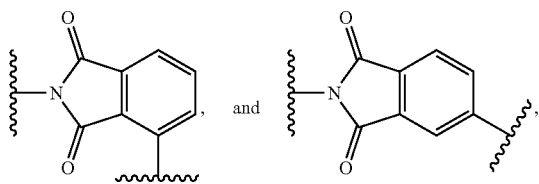 [SMILES: *c1cccc2c1C(=O)N(*)C2=O ; *c1ccc2c(c1)C(=O)N(*)C2=O]
where one or more H atoms may be replaced by a group L, and/or
one or more double bonds may be replaced by single bonds, and/or
one or more CH groups may be replaced by N.
Preferred polymerizable compounds according to Formula (1) are:
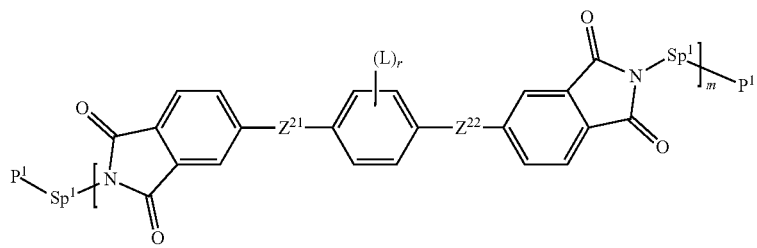
M1
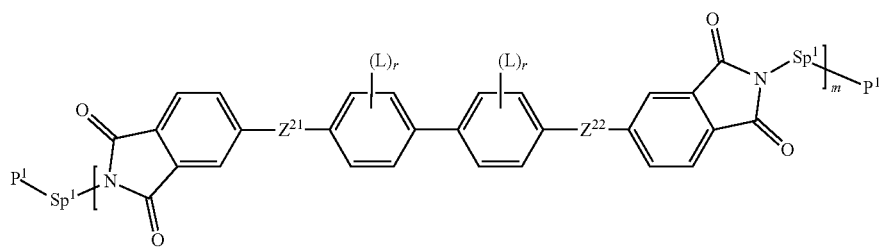
M2
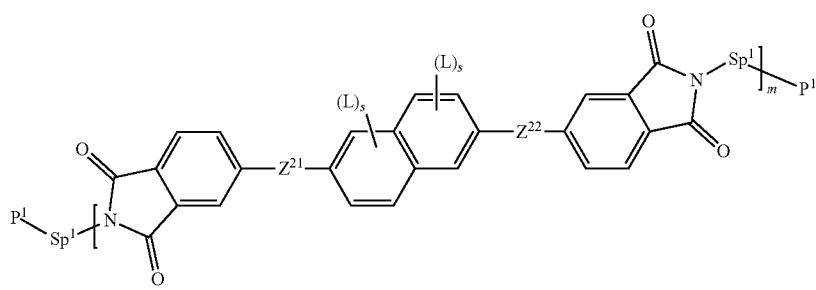
M3
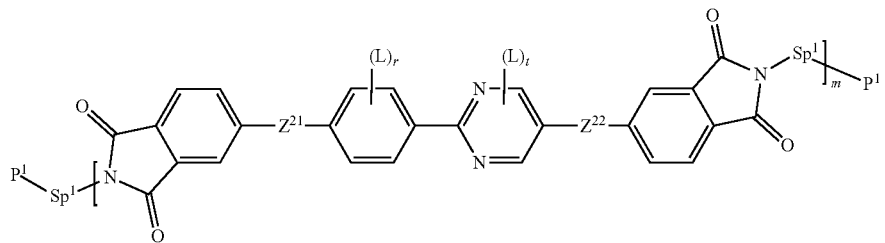
M4
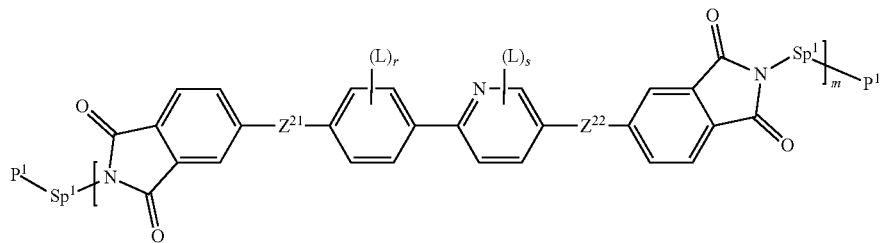
M5

-continued
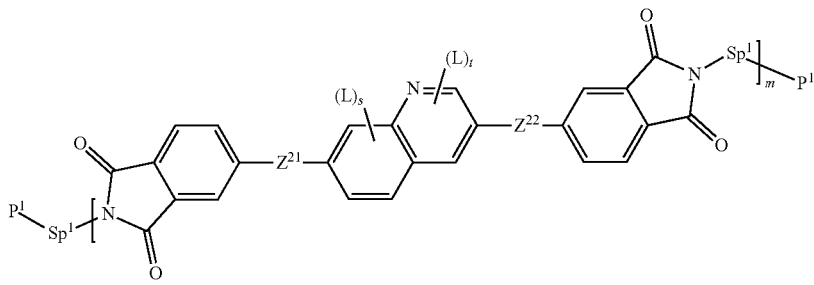
M6
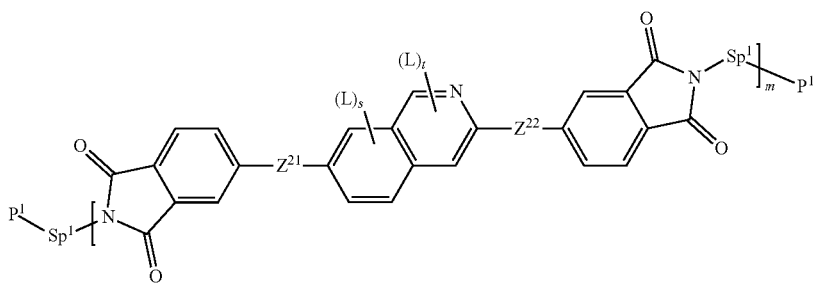
M7
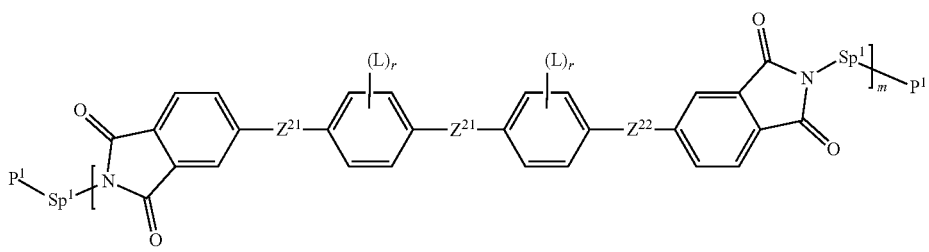
M8
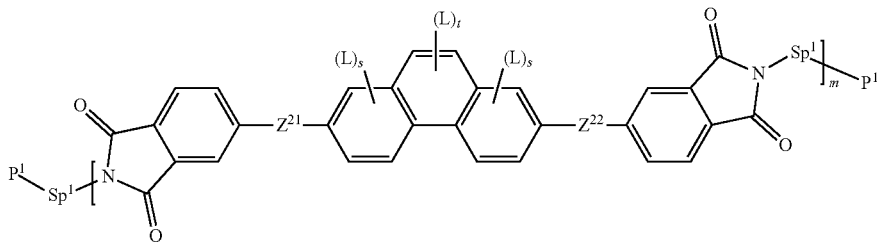
M9
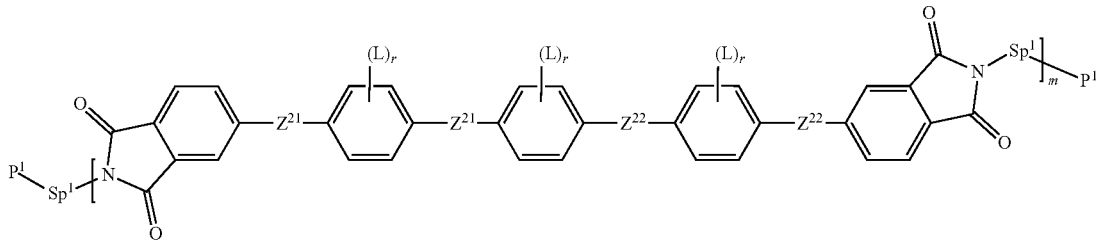
M10
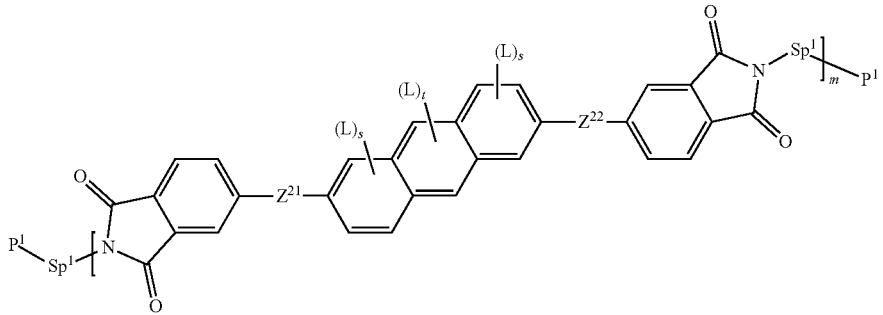
M11

-continued
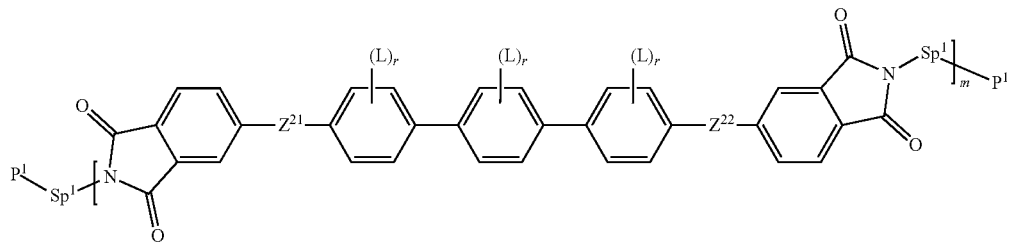
M12
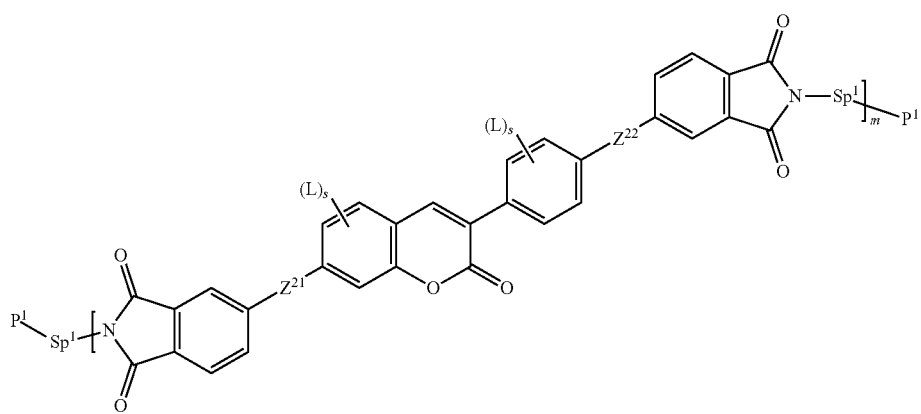
M13
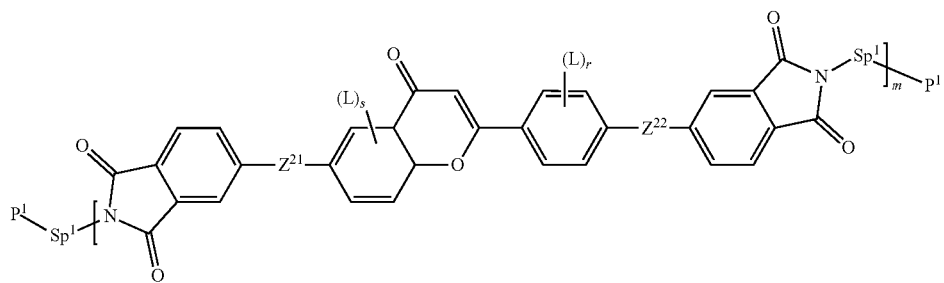
M14
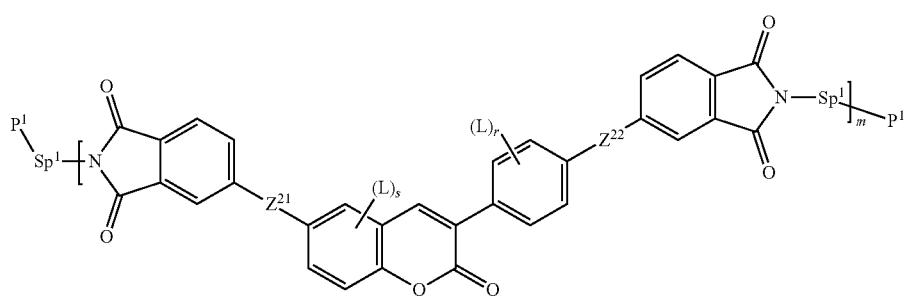
M15

M16
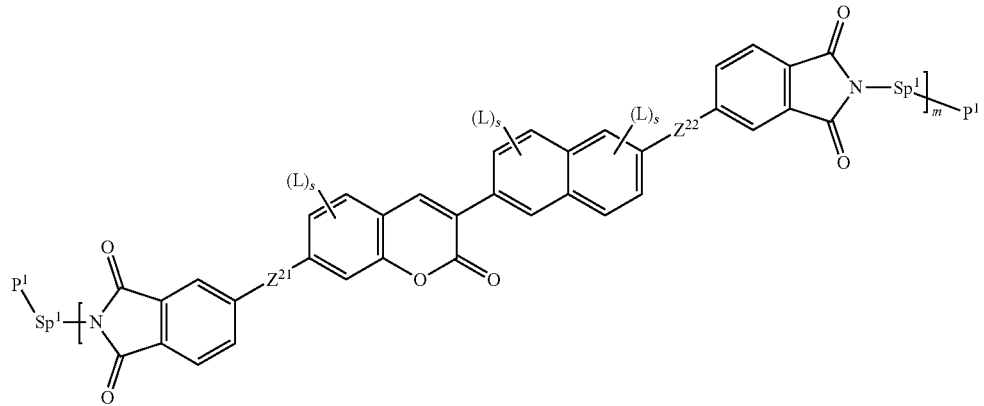
M17 M18
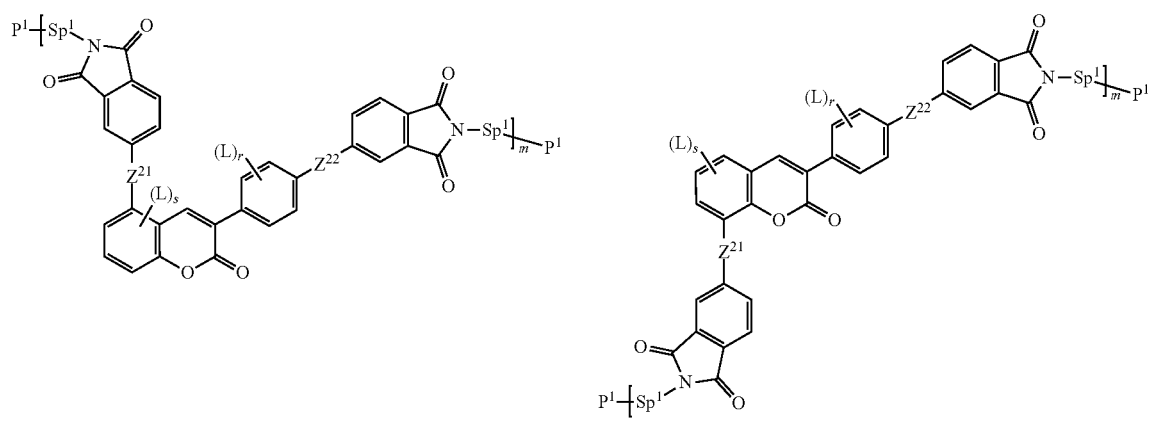
M19
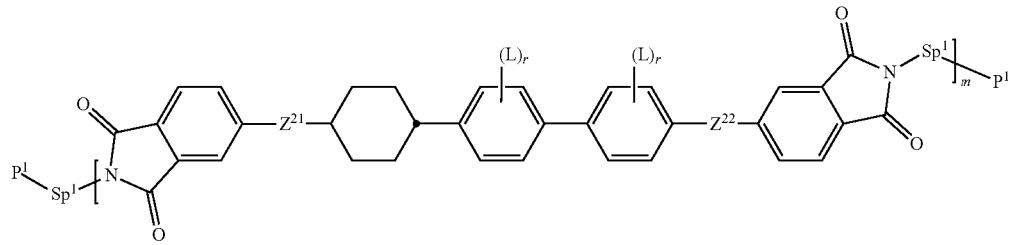
M20
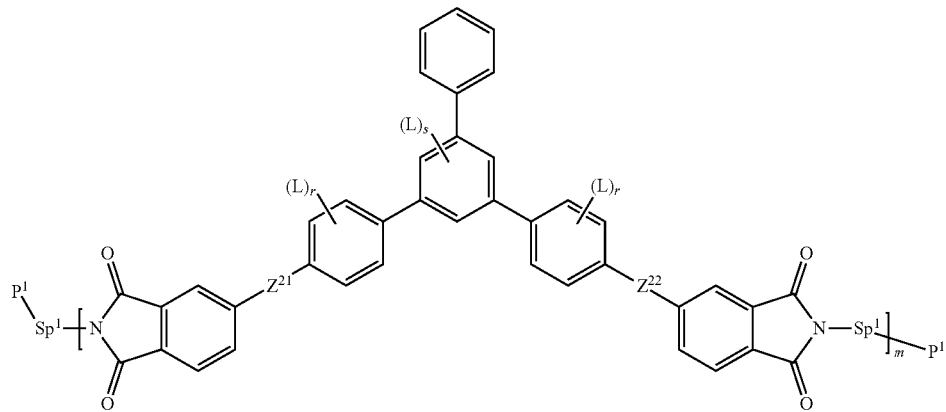

-continued
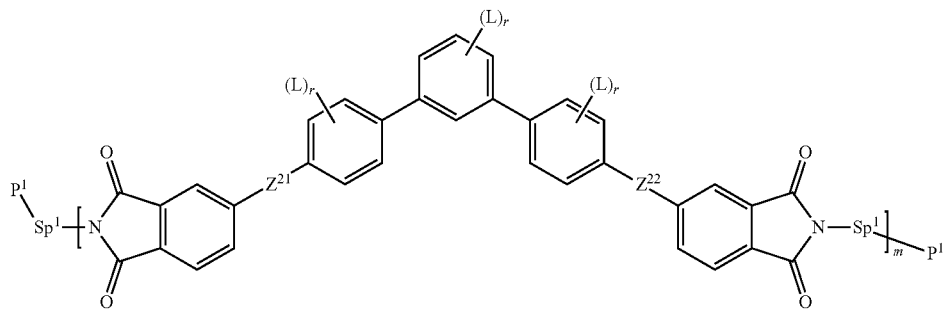
M21
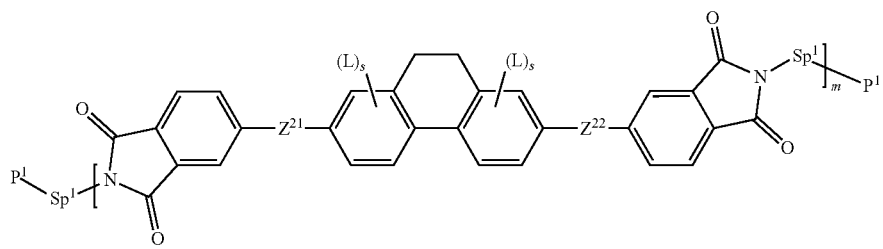
M22
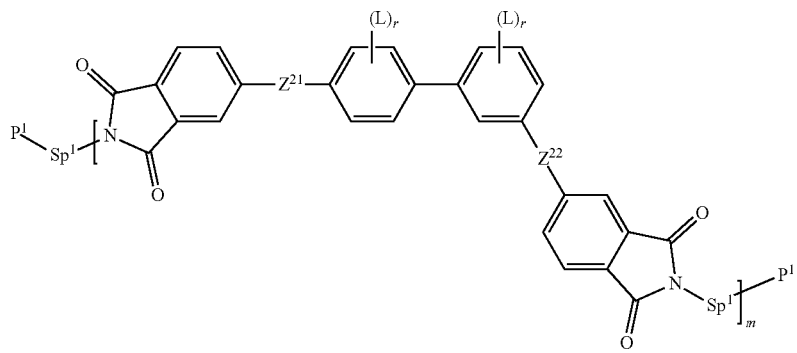
M23
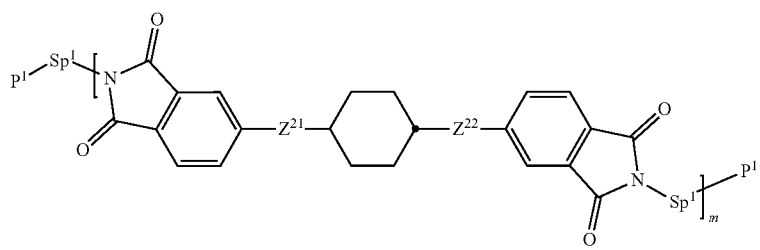
M24
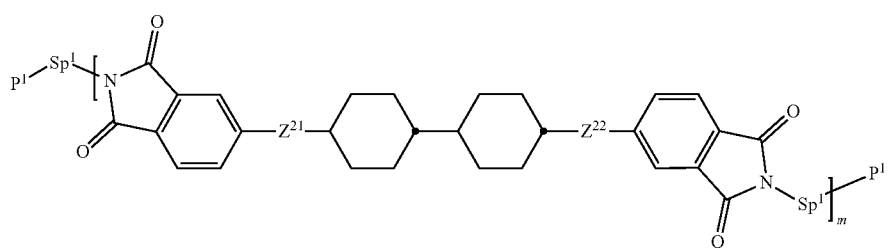
M25
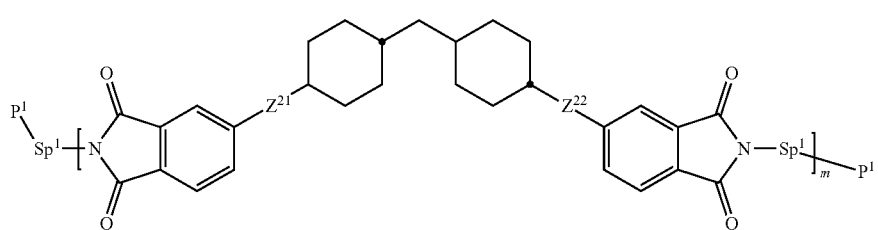
M26

-continued
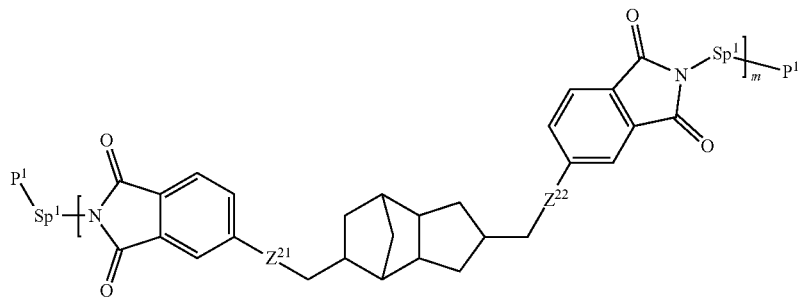
M27
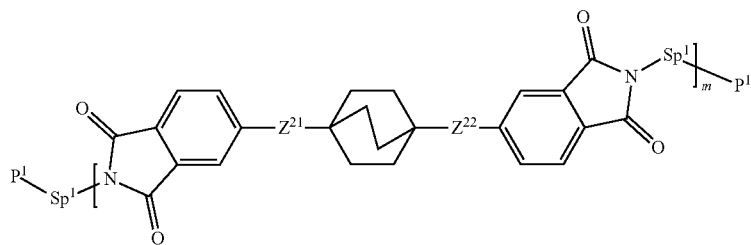
M28
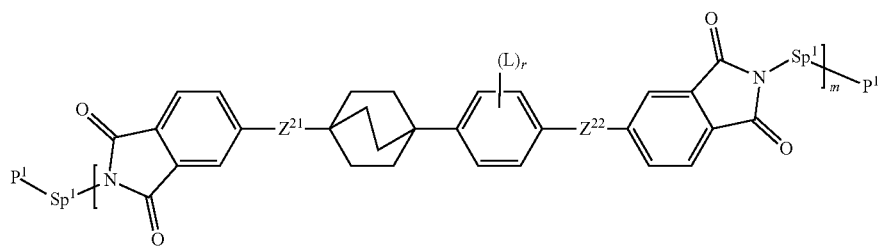
M29
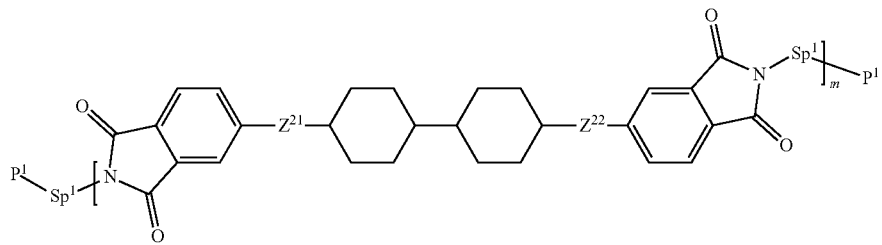
M30
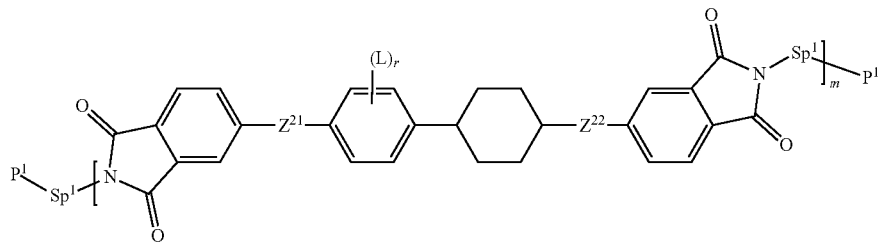
M31
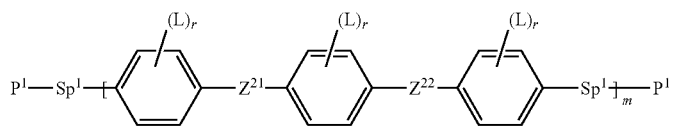
M32
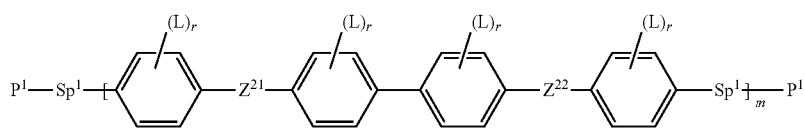
M33

-continued

M34

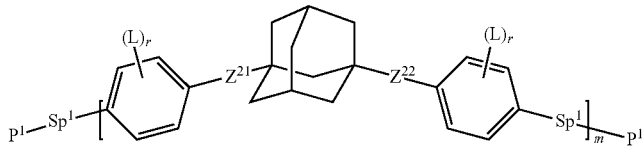

where the radicals and indices have the following meanings:

L is F, Cl, Br, I, —CN, —NO$_2$, —NCO, —NCS, —OCN, —SCN, —C(=O)NR$^{xx}$R$^{yy}$, —C(=O)OR$^{xx}$, —C(=O)R$^{xx}$, —NR$^{xx}$R$^{yy}$, —OH, —SF$_5$, or straight chain or branched chain alkyl, alkoxy, alkylcarbonyl, alkoxycarbonyl, alkylcarbonyloxy or alkoxycarbonyloxy with 1 to 20 C atoms, preferably 1 to 12 C atoms, wherein one or more H atoms are optionally replaced by F or Cl, preferably F, —CN or straight chain or branched chain alkyl, alkoxy, alkylcarbonyl, alkoxycarbonyl, alkylcarbonyloxy or alkoxycarbonyloxy with 1 to 6 C atoms;

R$^{xx}$ and R$^{yy}$ independently of each other denote H or alkyl with 1 to 12 C atoms;

r is 0, 1, 2, 3 or 4;

s is 0, 1, 2 or 3;

t is 0, 1 or 2;

Z$^{21}$ and Z$^{22}$ are independently and at each occurrence independently from each other, —O—, —S—, —CO—, —COO—, —OCO—, —S—CO—, —CO—S—, —O—COO—, —CO—NR$^{o1}$—, —NR$^{o1}$—CO—, —NR$^{o1}$—CO—NR$^{o2}$, —NR$^{o1}$—CO—NR$^{o2}$, —NR$^{o1}$—CO—O—, —O—CO—NR$^{o1}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^{o1}$—, —CY$^{o1}$=CY$^{o2}$—, —C≡C—, —CH=CH—COO—, —OCO—CH=CH—, or a single bond, preferably —COO—, —OCO—, —CO—O—, —O—CO—, —OCH$_2$—, —CH$_2$O—, —CH$_2$CH$_2$—, —(CH$_2$)$_4$—, —CF$_2$CH$_2$—, —CH$_2$CF$_2$—, —CF$_2$CF$_2$—, —C≡C—, —CH=CH—COO—, —OCO—CH=CH—, or a single bond;

R$^{o1}$ and R$^{o2}$ each, independently of one another, denote H or alkyl having 1 to 12 C atoms;

Sp$^1$ denotes at each occurrence a space group (Sp) as defined above or a single bond;

P$^1$ denotes a polymerizable group (P) as defined above; and m is an integer from 1 to 60, preferably 1 to 50, more preferably 2 to 30, and most preferably 3 to 20.

More preferred polymerizable compounds according to Formula (1) are:

M1a

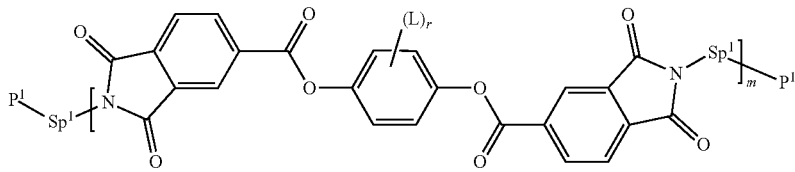

M2a

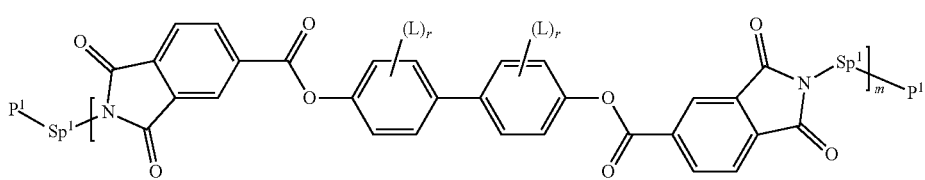

M10a

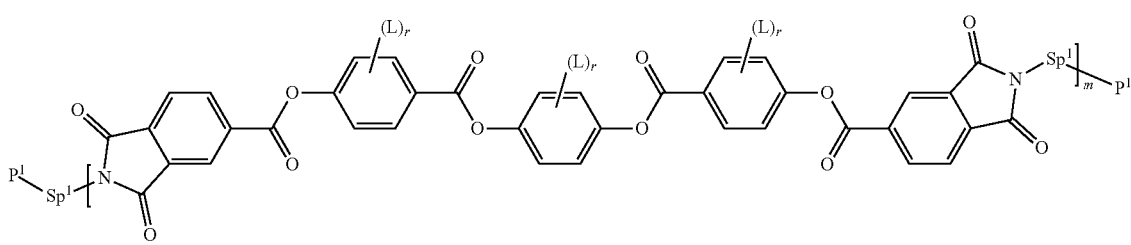

-continued
M32a
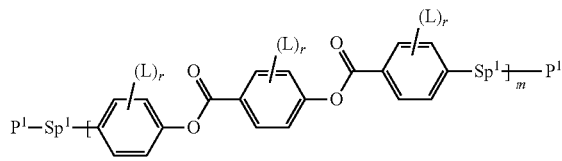
M32b
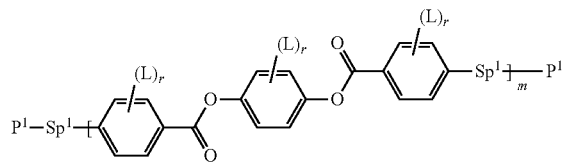
M33a
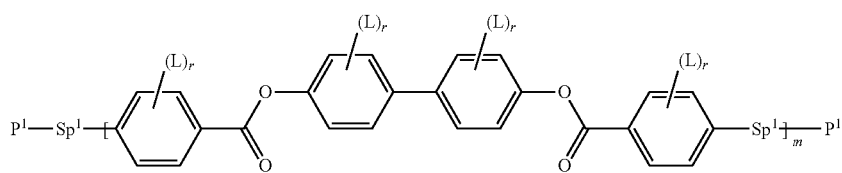
M34a
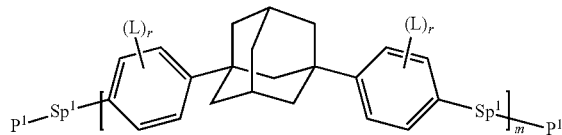
where the radicals and indices have one of the meanings as defined above.
Particularly preferred polymerizable compounds according to Formula (1) are:
M1b
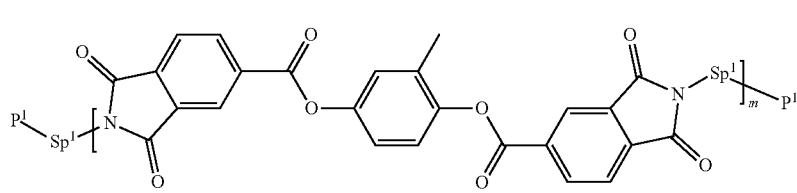
M2b
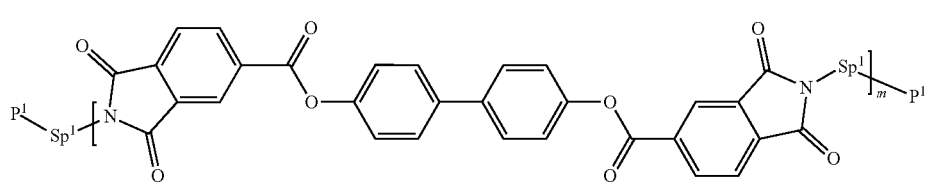
M10b
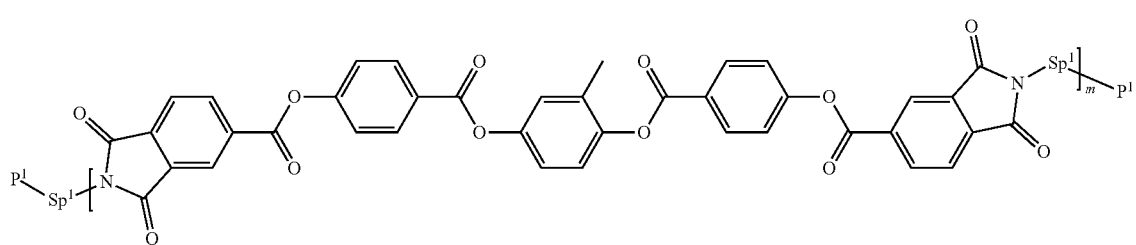
M10c
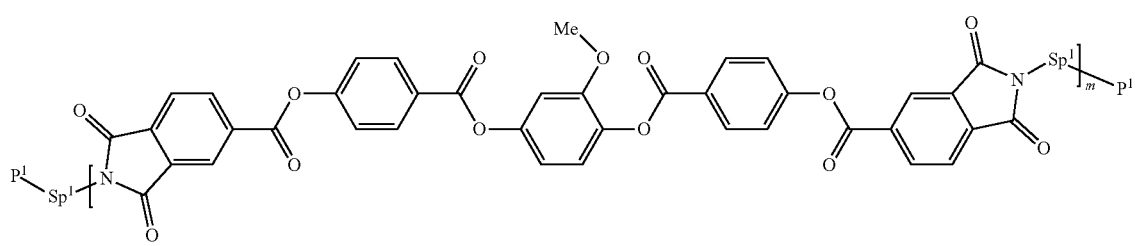

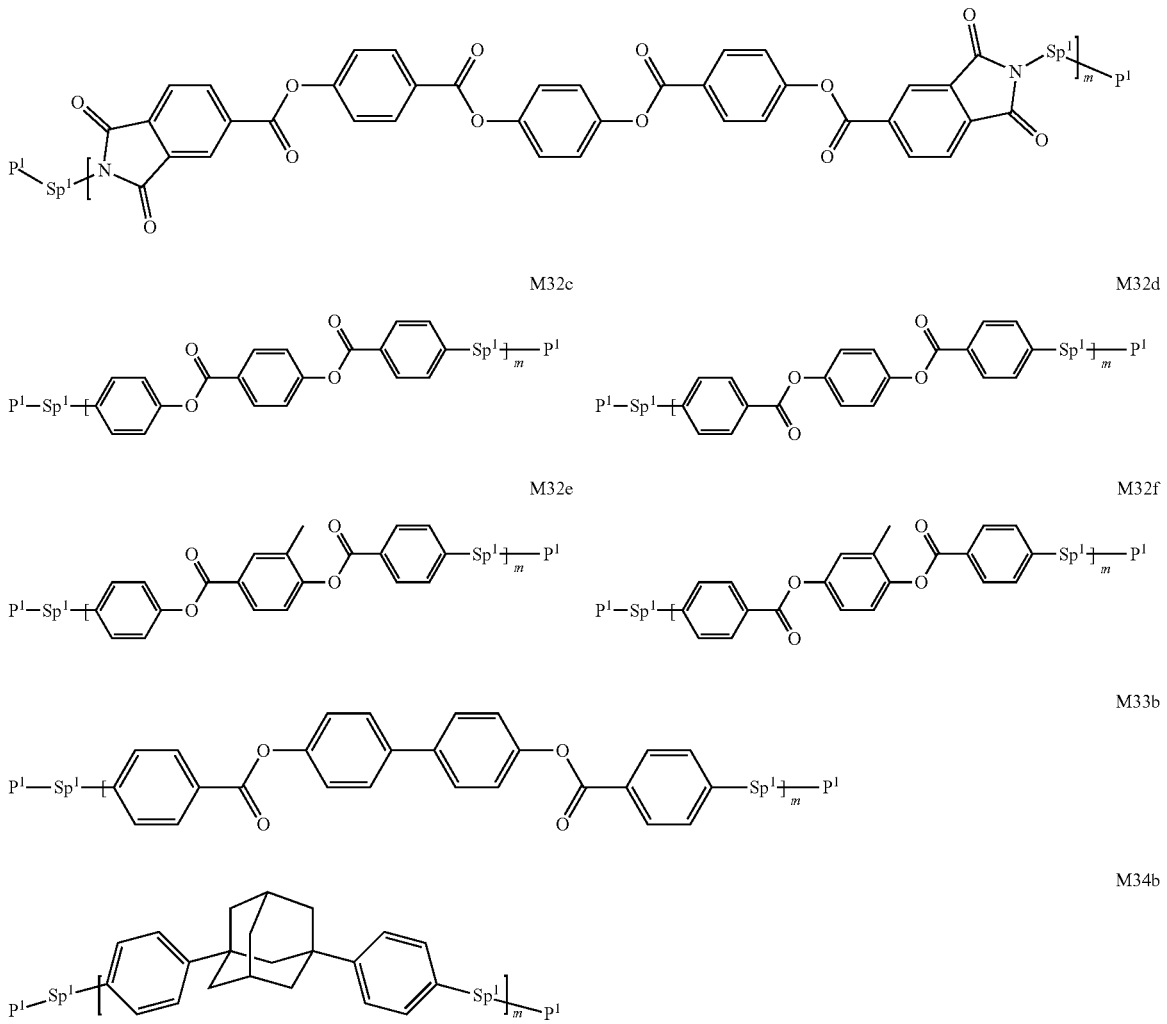
where the radicals and indices have one of the meanings as defined above.
Most preferred polymerizable compounds according to Formula (1) are:
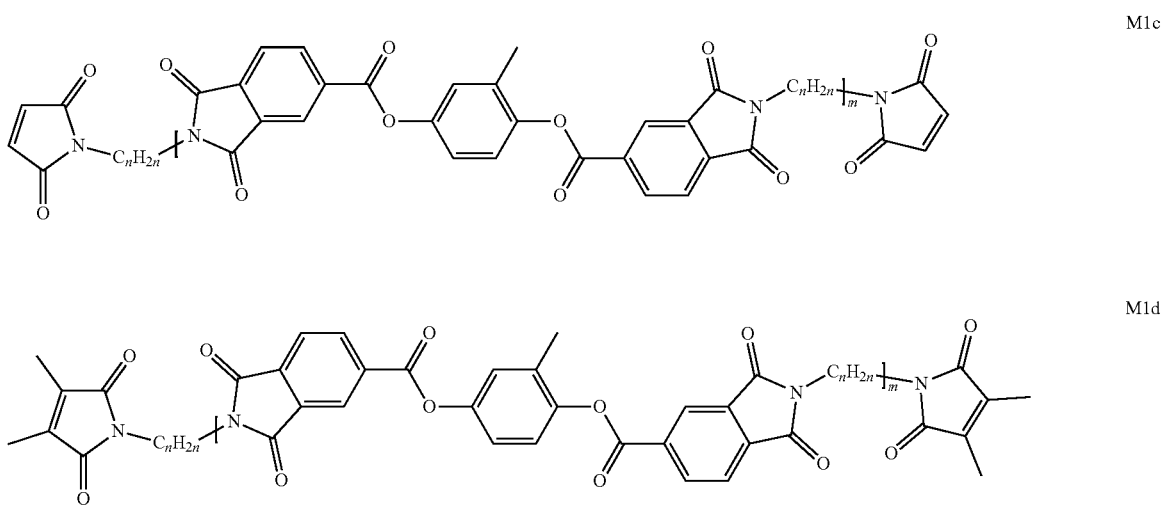

-continued
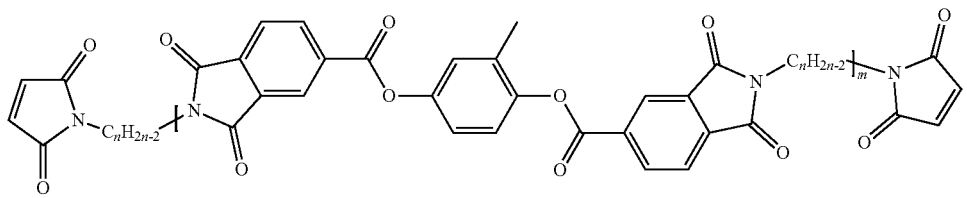
M1e
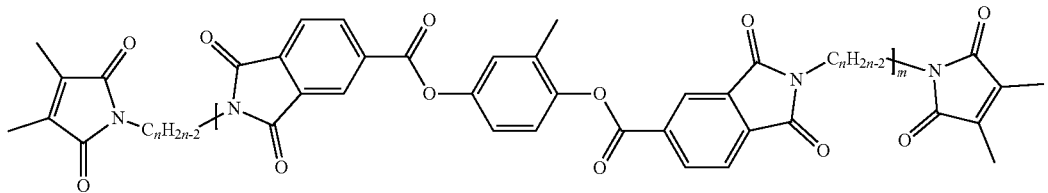
M1f
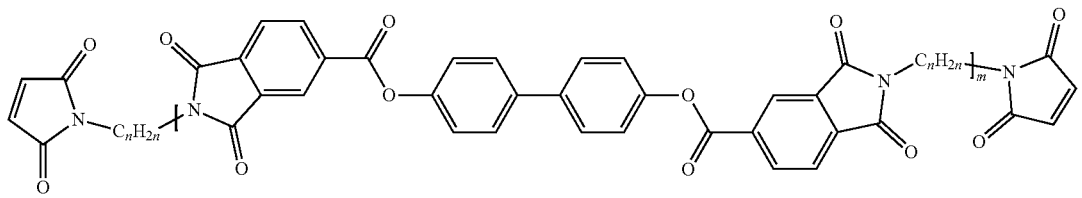
M2c
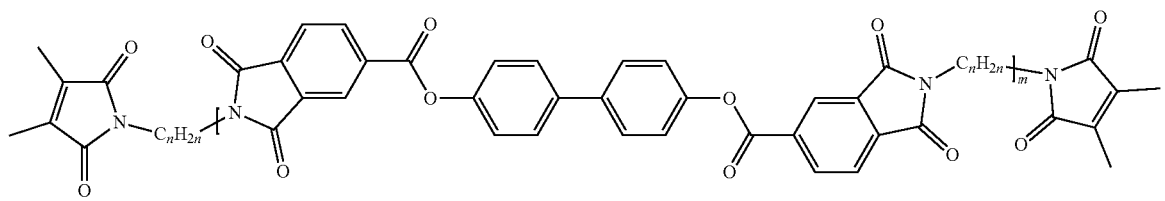
M2d
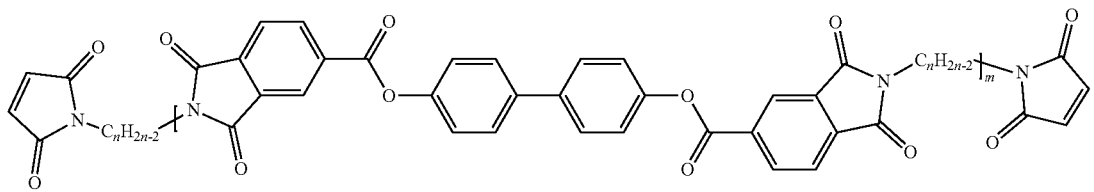
M2e
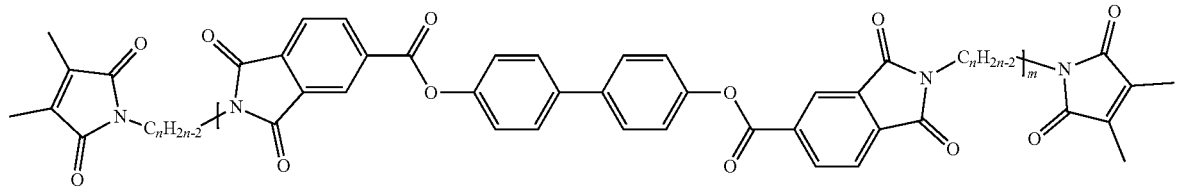
M2f
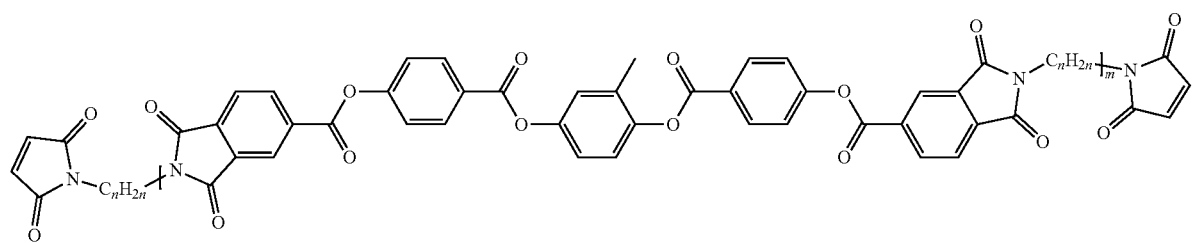
M10e -continued
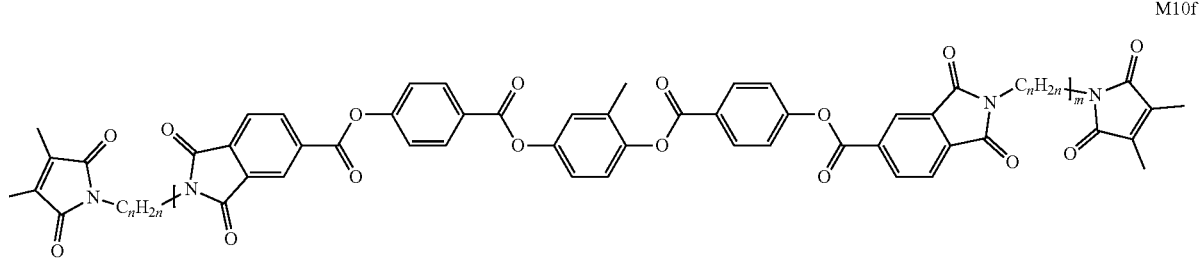
M10f
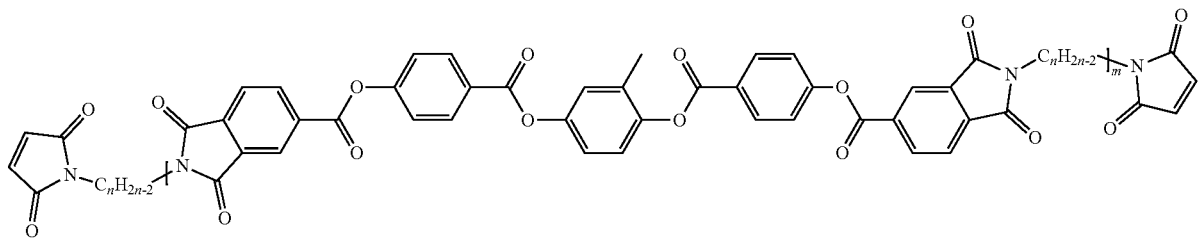
M10g
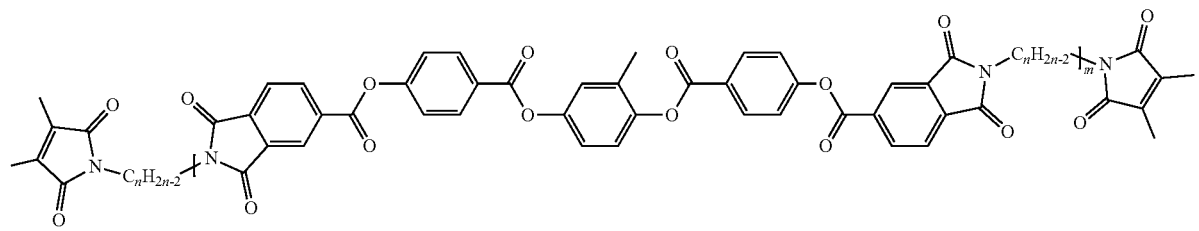
M10h
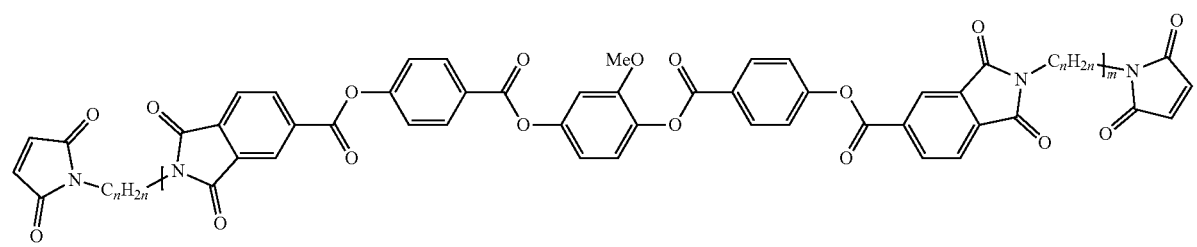
M10i
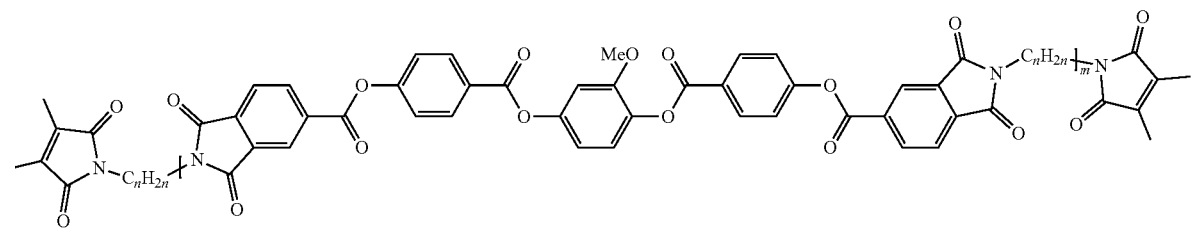
M10j
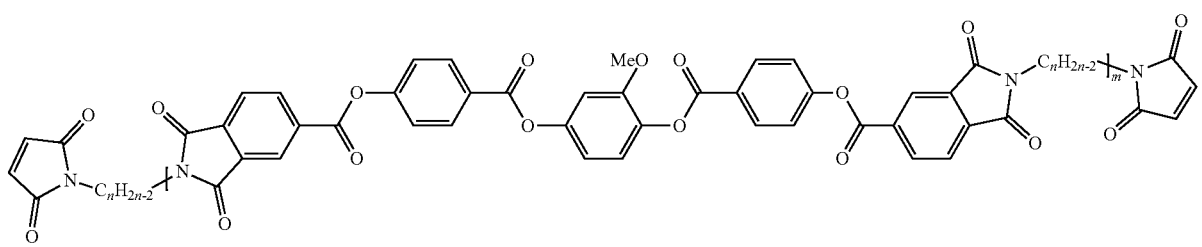
M10k -continued
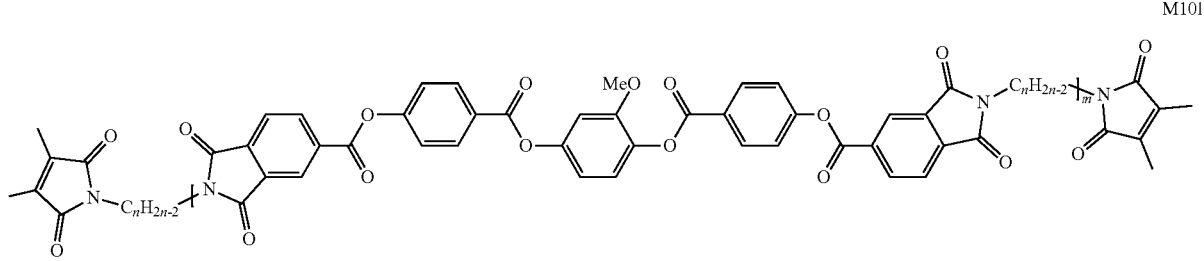
M10l
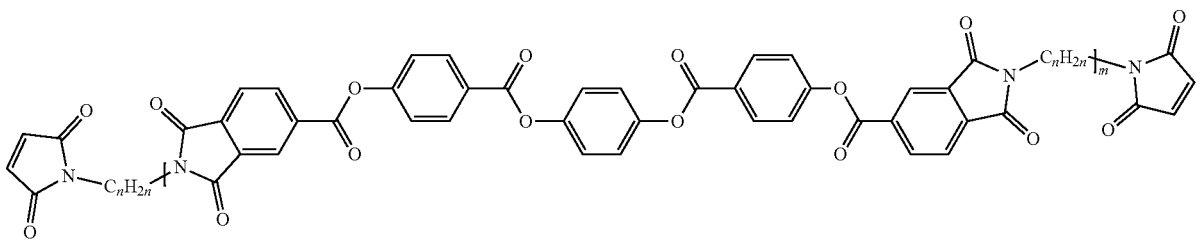
M10m
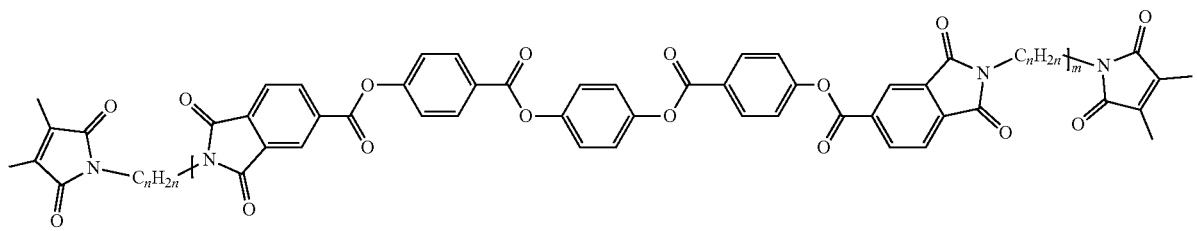
M10n
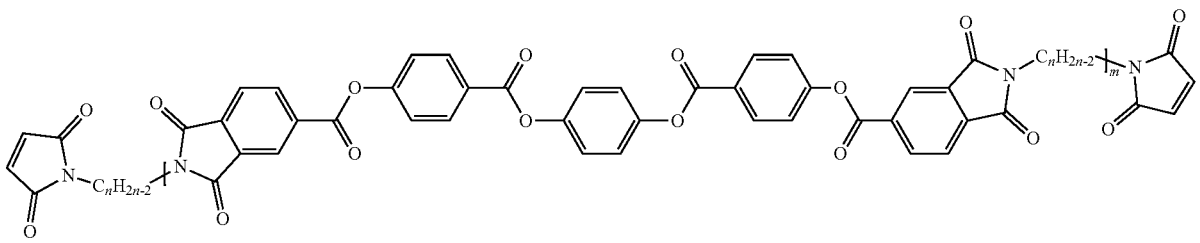
M10o
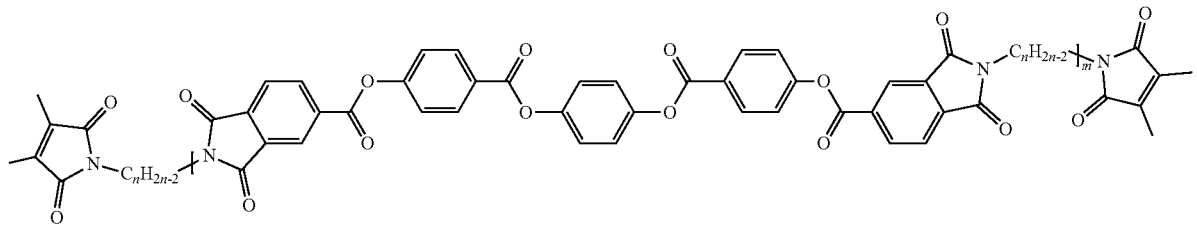
M10p
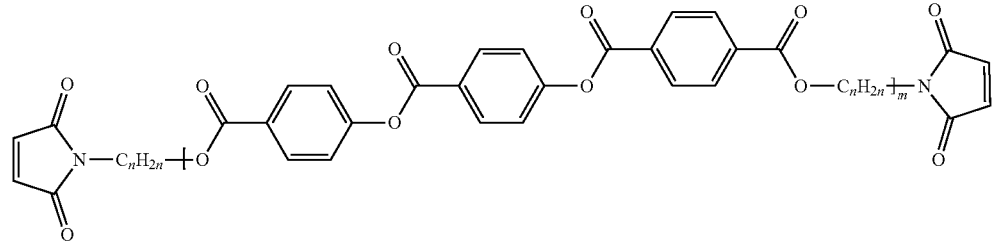
M32g -continued
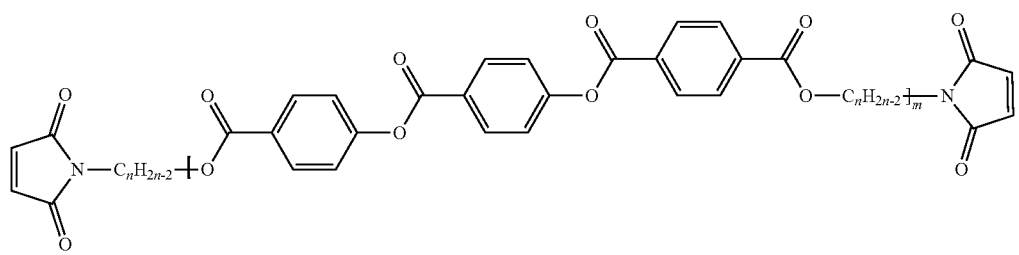
M32h
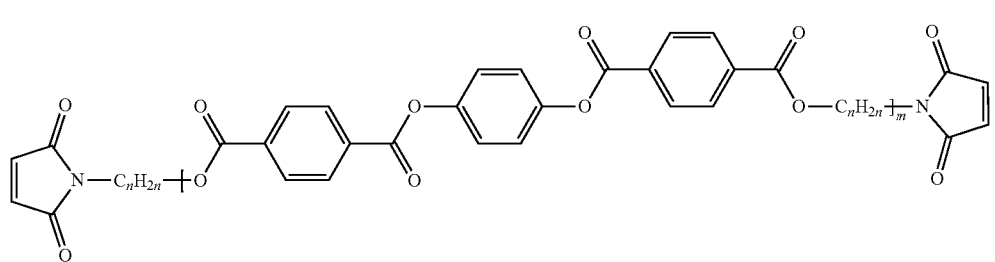
M32i
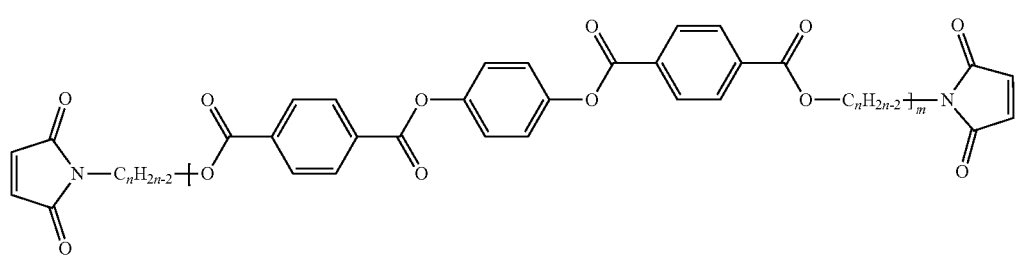
M32j
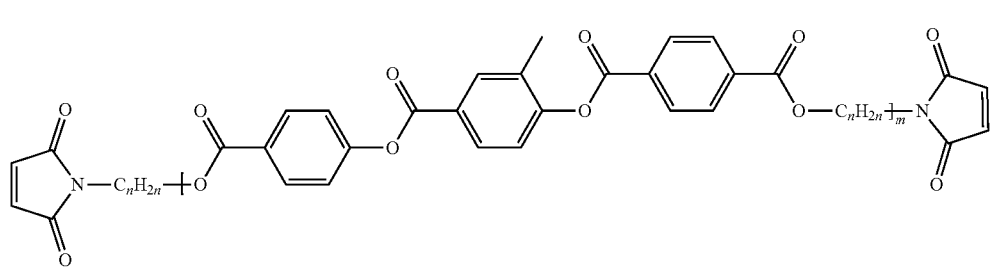
M32k
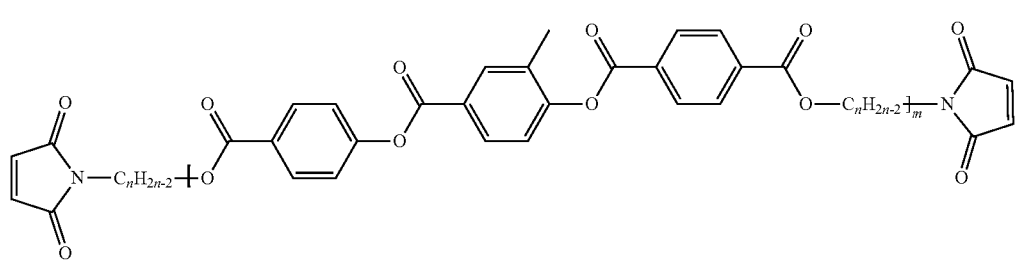
M32l
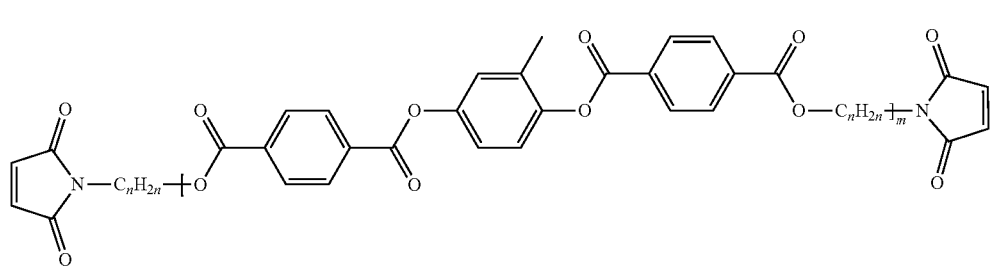
M32m -continued
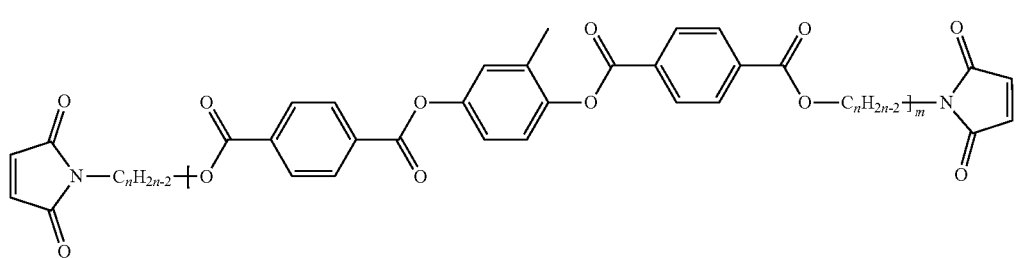
M32n
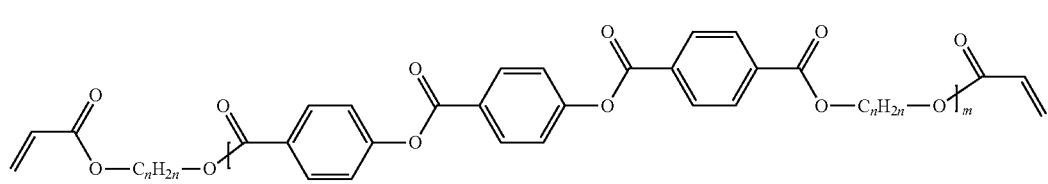
M32o
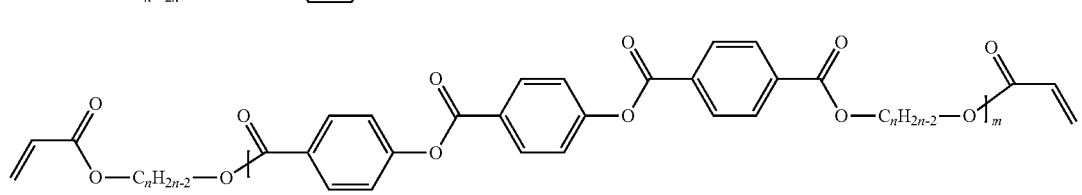
M32p
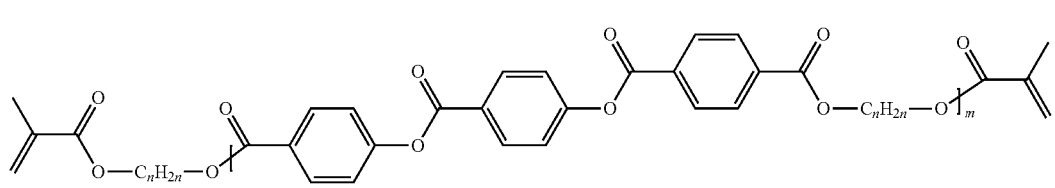
M32q
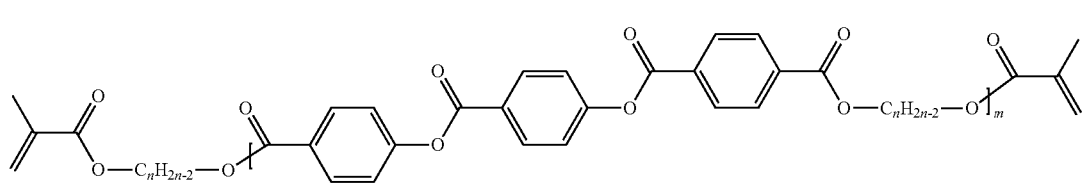
M32r
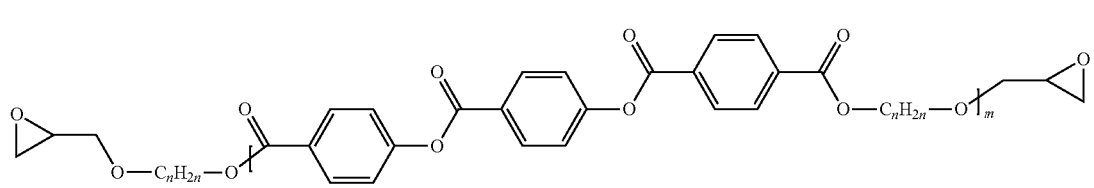
M32s
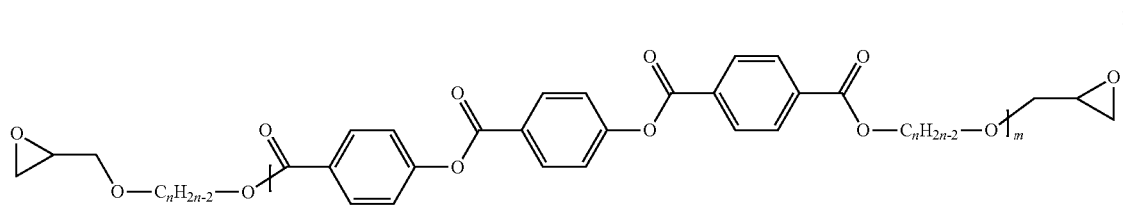
M32t
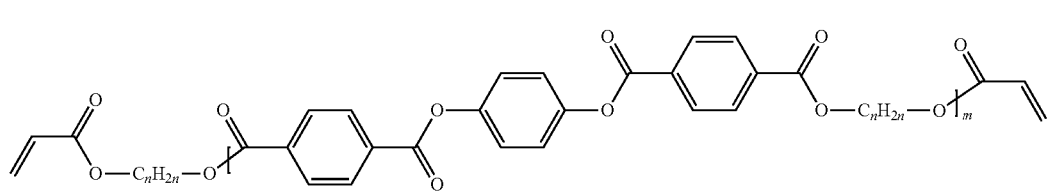
M32u

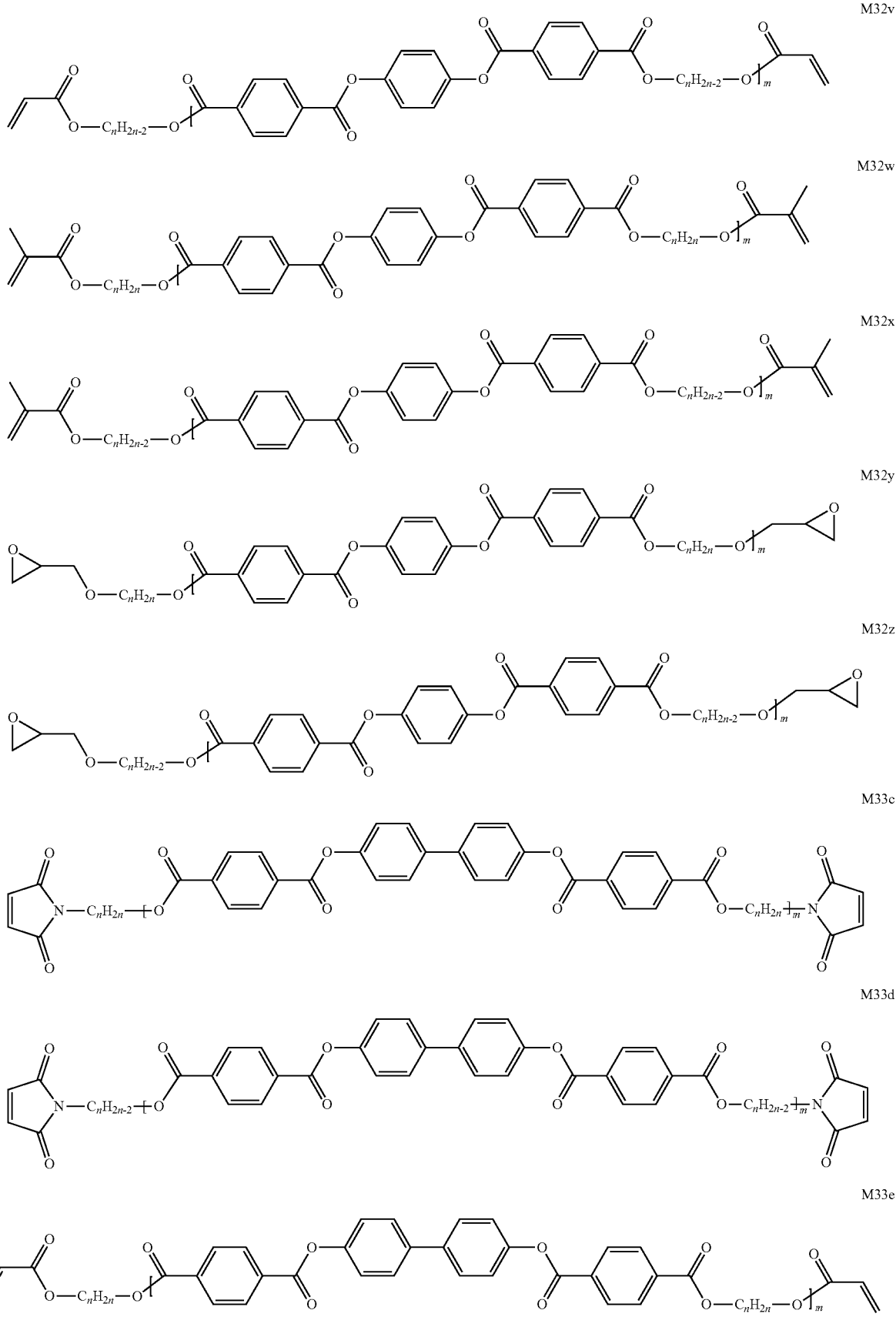

-continued
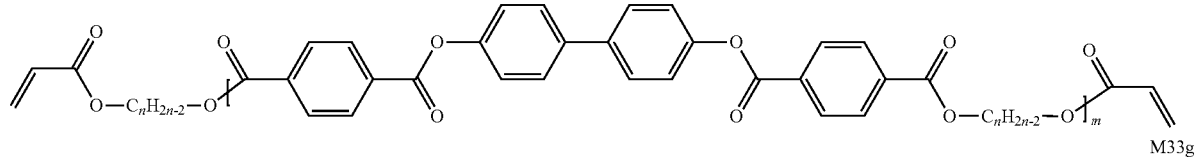
M33f
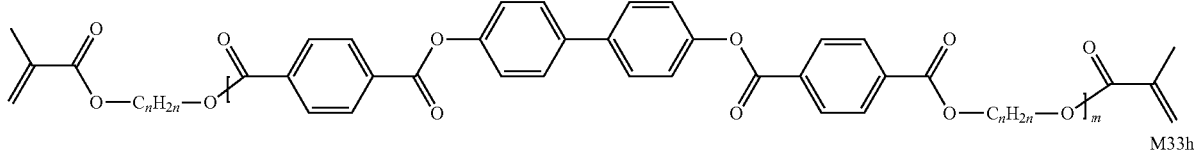
M33g
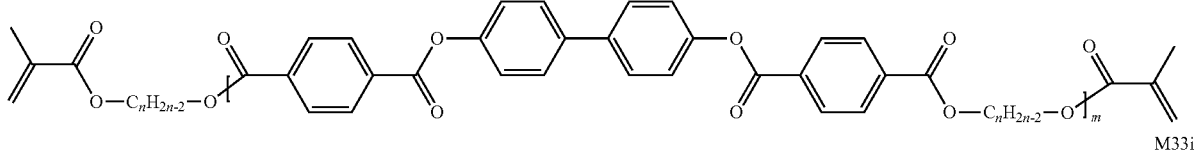
M33h
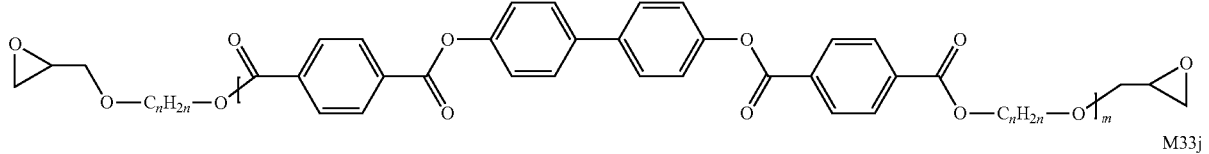
M33i
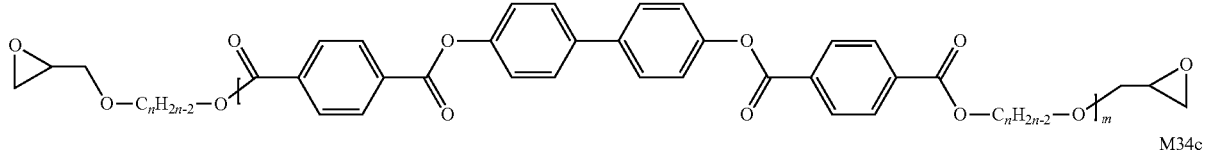
M33j
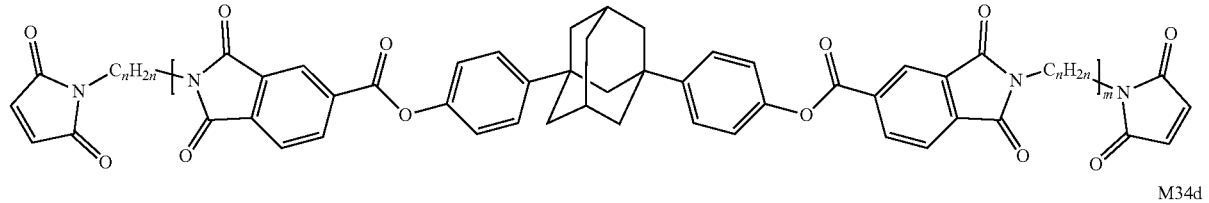
M34c
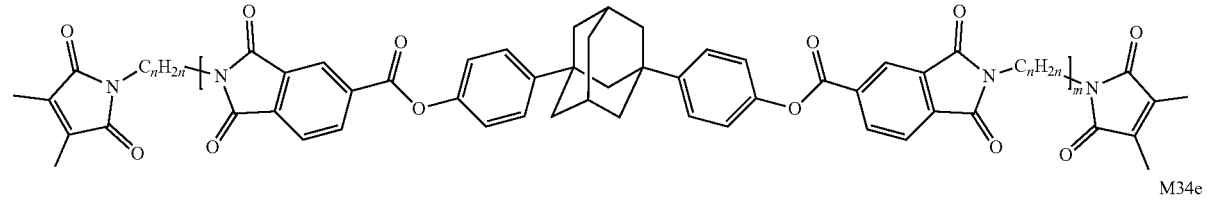
M34d
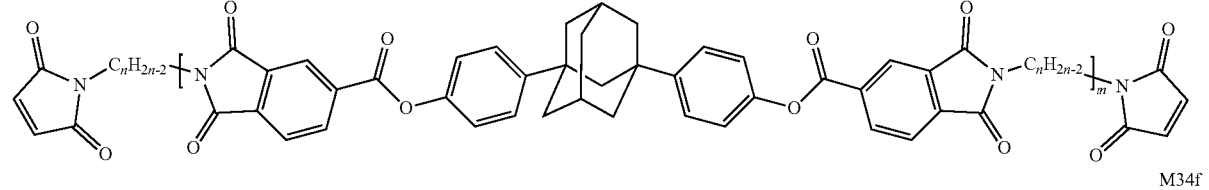
M34e
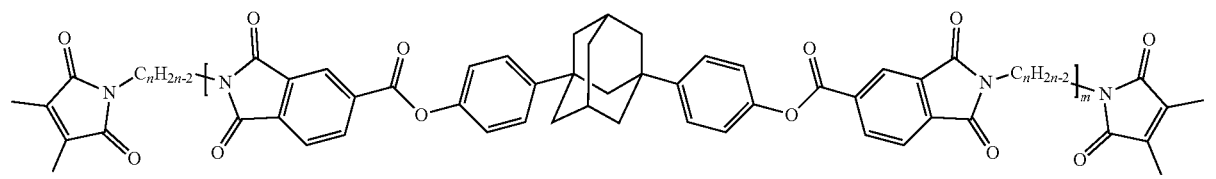
M34f wherein
n is an integer from 1 to 60, preferably from 1 to 36, and more preferably from 6 to 12; and
m is an integer from 1 to 60, preferably 1 to 50, more preferably 2 to 30, and most preferably 3 to 20.

In the compounds of formulae M1 to M33 and the corresponding sub-formulae, the ring group

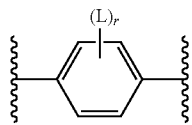

is preferably

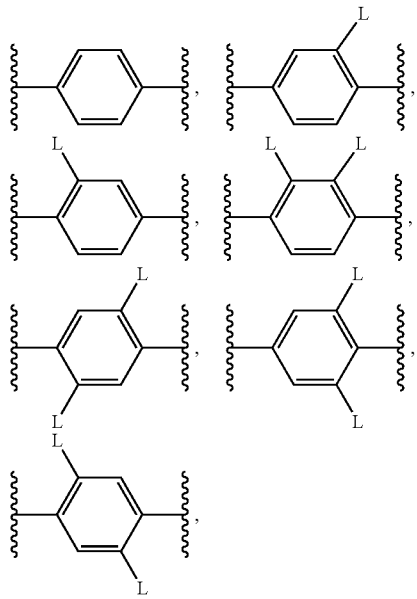

wherein
L is at each occurrence independently from each other F, Cl, Br, I, —CN, —NO$_2$, —NCO, —NCS, —OCN, —SCN, —C(=O)NR$^{xx}$R$^{yy}$, —C(=O)OR$^{xx}$, —C(=O)R$^{xx}$, —NR$^{xx}$R$^{yy}$, —OH, —SF$_5$, or straight chain or branched chain alkyl, alkoxy, alkylcarbonyl, alkoxycarbonyl, alkylcarbonyloxy or alkoxycarbonyloxy with 1 to 20 C atoms, preferably 1 to 12 C atoms, wherein one or more H atoms are optionally replaced by F or Cl, preferably F, —CN or straight chain or branched chain alkyl, alkoxy, alkylcarbonyl, alkoxycarbonyl, alkylcarbonyloxy or alkoxycarbonyloxy with 1 to 6 C atoms; and
R$^{xx}$ and R$^{yy}$ are defined according to the definitions given above.

The polymerizable compound represented by Formula (1) can be prepared by any standard synthesis. Usually, the compound is retrosynthetically cut into smaller units and formed stepwise from suitable precursor compounds. For this purpose, known standard reactions can be used. It has proven to be particularly advantageous to attach the polymerizable groups P$^1$ at a late stage of the synthesis, typically at the very last step of the synthesis. By doing so, undesirable side-reactions or premature polymerization of the compound can be avoided.

For example, if the polymerizable compound contains polymerizable groups P which are represented by

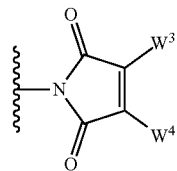

wherein W$^3$ and W$^4$ each, independently of one another, denote H, Cl or alkyl having 1 to 5 C atoms,
a precursor represented by Formula (3):

$$X\text{-}Sp^1\text{-}(MG\text{-}Sp^1)_m\text{-}X \qquad \text{Formula (3)}$$

is reacted with

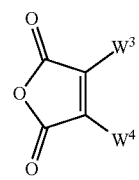

to form a polymerizable compound represented by Formula (1):

$$P^1\text{-}Sp^1\text{-}(MG\text{-}Sp^1)_m\text{-}P^1 \qquad \text{Formula (1)}$$

wherein X is NH$_2$;
P$^1$ is

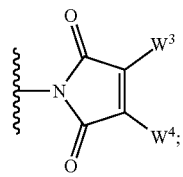

and
Sp$^1$, MG, and m have one of the definitions as given above.

The present invention further provides a method for forming a polymer comprising monomer units of one or more of the polymerizable compound. The polymer is a dielectric polymer which may be linear or crosslinked.

The method for forming a polymer comprises the following steps:
(i) providing a polymerizable starting material comprising one or more polymerizable compounds according to the present invention; and
(ii) polymerizing said polymerizable starting material.

The polymerizable compound comprised in the polymerizable starting material is a polymerizable compound which is represented by Formula (1) and the above-mentioned definitions.

It is preferred that the polymerizable starting material provided in step (i) comprises one polymerizable compound according to the present invention.

In a preferred embodiment, the polymerizable starting material provided in step (i) comprises one or more additional polymerizable compounds which are capable to react with the polymerizable compound according to the present invention to form a copolymer.

Preferred additional polymerizable compounds are monomers which are capable to react with the polymerizable group P of the polymerizable compound of the present invention to form a copolymer. Such preferred additional polymerizable compounds are selected from acrylates, epoxides, olefins, vinyl ethers, vinyl esters, polythiols, polyamines, and polymaleimides. Using basic chemical knowledge, the skilled person is able to find and select for a given polymerizable compound of the present invention suitable additional polymerizable compounds which are capable to react with the first mentioned to form a copolymer.

Preferred acrylates are acrylic acid, methacrylic acid, methyl acrylate, methyl methacrylate, methyl cyanoacrylate, ethyl acrylate, ethyl methacrylate, ethyl cyanoacrylate, propyl acrylate, propyl methacrylate, propyl cyanoacrylate, butyl acrylate, butyl methacrylate, butyl cyanoacrylate, pentyl acrylate, pentyl methacrylate, pentyl cyanoacrylate, hexyl acrylate, hexyl methacrylate, hexyl cyanoacrylate, heptyl acrylate, heptyl methacrylate, heptyl cyanoacrylate, octyl acrylate, octyl methacrylate, octyl cyanoacrylate, ethylene glycol dimethacrylate, 2-ethylhexyl acrylate, glycidyl methacrylate, (hydroxyethyl)acrylate, (hydroxyethyl) methacrylate, methyl 2-chloroacrylate, and methyl 2-fluoroacrylate.

Preferred epoxides are ethylene oxide, propylene oxide, butylene oxide, pentylene oxide, hexylene oxide, heptylene oxide, octylene oxide, glycidamide, glycidol, styrene oxide, 3,4-epoxytetrahydrothiophene-1,1-dioxide, ethyl 2,3-epoxypropionate, methyl 2-methylglycidate, methyl glycidyl ether, ethyl glycidyl ether, diglycidyl ether, cyclopentene oxide, cyclohexene oxide, cycloheptene oxide, cyclooctene oxide, and stilbene oxide.

Preferred olefins are ethylene, propylene, butylene, pentylene, hexylene, heptylene, octylene, isoprene styrene, and vinylethylene.

Preferred vinyl ethers are divinyl ether, methylvinylether, ethylvinylether, propylvinylether, butylvinylether, pentylvinylether, hexylvinylether, heptylvinylether, and octylvinylether.

Preferred vinyl esters are vinyl formate, vinyl acetate, vinyl propanoate, vinyl butanoate, vinyl pentanoate, vinyl hexanoate, vinyl heptanoate, vinyl octanoate, vinyl nonanoate, vinyl decanoate, vinyl acrylate, vinyl methacrylate, vinyl benzoate, vinyl 4-tert-butylbenzoate, vinyl cinnamate, and vinyl trifluoroacetate.

Preferred polythiols are organosulfur compounds with two or more thiol functional groups. Particularly preferred polythiols are selected from the list consisting of HS—$(C_nH_{2n})$—SH, wherein n=2 to 20, preferably 2 to 12; $C_nH_{2n-1}(SH)_3$, wherein n=3 to 20, preferably 3 to 12; HS—Ar—SH, wherein Ar=substituted or unsubstituted $C_6$-$C_{20}$ arylene; and HS—$(CH_2)_m$—Ar—$(CH_2)_m$—SH, wherein Ar=substituted or unsubstituted $C_6$-$C_{20}$ arylene and m=1 to 12.

Preferred polyamines are organoamine compounds with two or more amino functional groups. Particularly preferred polyamines are selected from the list consisting of $H_2N$—$(C_nH_{2n})$—$NH_2$, wherein n=2 to 20, preferably 2 to 12; $H_2N$—$(C_nH_{2n}NH)$—$NH_2$, wherein n=2 to 20, preferably 2 to 12; $C_nH_{2n-1}(NH_2)_3$, wherein n=3 to 20, preferably 3 to 12; $H_2N$—Ar—$NH_2$, wherein Ar=substituted or unsubstituted $C_6$-$C_{20}$ arylene; and $H_2N$—$(CH_2)_m$—Ar—$(CH_2)_m$—$H_2N$, wherein Ar=substituted or unsubstituted $C_6$-$C_{20}$ arylene and m=1 to 12.

Preferred polymaleimides are maleimide end-capped polyimides as described in US 2008/0075961 A1 and US 2017/0152418 A1 the disclosure of which is herewith incorporated by reference. It is preferred that the polymaleimides are dimaleimides selected from compounds represented by the following Formula (A) or Formula (B):

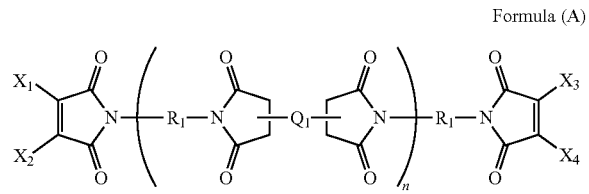

Formula (A)

wherein $R_1$ and $Q_1$ are independently selected from the group consisting of structures derived from unsubstituted or substituted aliphatic, alicyclic, alkenyl, aryl, heteroaryl, siloxane, poly(butadiene-co-acrylonitrile) and poly(alkylene oxide); $X_1$ to $X_4$ are each independently H or an alkyl group with 1 to 6 C atoms; and n=0 to 30;

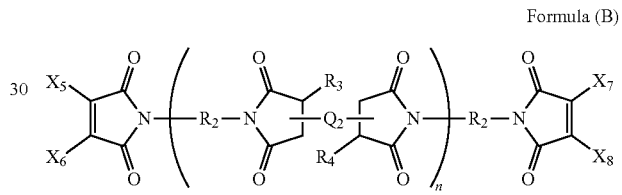

Formula (B)

wherein $R_2$ and $Q_2$ are independently selected from the group consisting of structures derived from unsubstituted or substituted aliphatic, alicyclic, alkenyl, aryl, heteroaryl, siloxane, poly(butadiene-co-acrylonitrile) and poly(alkylene oxide); $X_5$ to $X_8$ are each independently H or an alkyl group with 1 to 6 C atoms; $R_3$ and $R_4$ are each independently H or $CH_3$, wherein at least one of $R_3$ and $R_4$ is $CH_3$; and n=0 to 30.

In a preferred embodiment, the structure derived from unsubstituted or substituted aliphatic, alicyclic, alkenyl, aryl, heteroaryl, siloxane, poly(butadiene-co-acrylonitrile) and poly(alkylene oxide) are alkyl group, alkenyl group, alkynyl group, hydroxyl group, oxo group, alkoxy group, mercapto group, cycloalkyl group, substituted cycloalkyl group, heterocyclic group, substituted heterocyclic group, aryl group, substituted aryl group, heteroaryl group, substituted heteroaryl group, aryloxy group, substituted aryloxy group, halogen, haloalkyl group, cyano group, nitro group, nitrone group, amino group, amide group, —C(O)H, acyl group, oxyacyl group, carboxyl group, carbamate group, sulfonyl group, sulfonamide group, sulfuryl group, or —C(O)—, —S—, —S(O)$_2$—, —OC(O)—O—, —NA-C(O)—, —NAC(O)—NA-, —OC(O)—NA-, (in the formula, A is H or an alkyl group with 1 to 6 carbons), and it is preferable that one terminal further contains a substituent.

Preferred substituents are alkyl group, alkenyl group, alkynyl group, hydroxyl group, oxo group, alkoxy group, mercapto group, cycloalkyl group, substituted cycloalkyl group, heterocyclic group, substituted heterocyclic group, aryl group, substituted aryl group, heteroaryl group, substituted heteroaryl group, aryloxy group, substituted aryloxy group, halogen, haloalkyl group, cyano group, nitro group, nitrone group, amino group, amide group, —C(O)H, acyl group, oxyacyl group, carboxyl group, carbamate group, sulfonyl group, sulfonamide group, sulfuryl group, or —C(O)—, —S—, —S(O)$_2$—, —OC(O)—O—, —NA-C (O)—, —NAC(O)—NA-, —OC(O)—NA-, (in the formula, A is H or an alkyl group with 1 to 6 carbons), acyl group, oxyacyl group, carboxyl group, carbamate group, sulfonyl group, sulfonamide group, or sulfuryl group.

In a more preferred embodiment, $R^1$ and $R^2$, and $Q^1$ and $Q^2$ are independently selected from the group consisting of substituted or unsubstituted aliphatic, alicyclic, alkenyl, aromatic, heteroaromatic, siloxane, poly(butadiene-co-acrylonitrile), or poly(alkylene oxide) moieties.

Preferred aliphatic moieties are straight or branched chain $C_1$-$C_{50}$ alkylene, more preferably straight or branched chain $C_1$-$C_{36}$ alkylene.

Preferred alicyclic moieties are both aliphatic and cyclic and contain one or more all-carbon rings which may be either substituted or unsubstituted and which may be optionally condensed and/or bridged. Preferred alicyclic moieties have 3 to 72 C atoms, more preferably 3 to 36 C atoms. Particularly preferred alicyclic moieties are represented by -$Sp^1$-Cy-$Sp^2$-, wherein $Sp^1$ and $Sp^2$ denote independently of each other alkylene having 1 to 12 C atoms or a single bond; G denotes cycloalkylene having 3 to 12 C atoms which is optionally mono- or polysubstituted by alkyl having 1 to 12 C atoms.

Preferred alkenyl moieties are straight or branched chain hydrocarbyl moieties having at least one carbon-carbon double bond, and having in the range of about up to 100 C atoms. More preferred alkenyl moieties are $C_2$-$C_{50}$ alkenylene, most preferably $C_2$-$C_{36}$ alkenylene.

Preferred aromatic moieties are arylene groups having 6 to 20 C atoms, more preferably 6 to 14 C atoms, which may be either substituted or unsubstituted.

Heteroaromatic moieties are aromatic moieties containing one or more heteroatoms (e.g. N, O, S, or the like) as part of the ring structure. Preferred heteroaromatic moieties have 3 to 20 C atoms, preferably 3 to 14 C atoms, and one or more heteroatoms selected from N, O and/or S, and they may be either substituted or unsubstituted.

Preferred siloxane moieties are selected from —[$R^a R^b$Si—O]$_n$—$R^a R^b$Si—, wherein $R^a$ and $R^b$ are independently H or $C_1$-$C_6$ alkyl, and n=1 to 1000, more preferably 1 to 100.

Preferred poly(alkylene oxide) moieties are poly($C_1$-$C_{12}$ alkylene oxide) moieties.

It is preferred that the molar ratio between the polymerizable compounds of the present invention and the additional polymerizable compounds in the polymerizable starting material is from 0.1:100 to 100:0.1.

It is preferred that the polymerizable starting material provided in step (i) is substantially free of solvent. Substantially free of solvent means that the content of total residual solvent in the polymerizable starting material is not more than 10 wt.-%, preferably not more than 5 wt.-%, and more preferably not more than 1 wt.-%, based on the total weight of the polymerizable compound(s).

It is preferred that the polymerizable starting material is polymerized in step (ii) by radical or ionic polymerization or by exposure to radiation. It is further preferred that the polymerizable starting material contains an initiator for free radical polymerization or an initiator for ionic polymerization. It is further preferred that the polymerization of the polymerizable compounds in step (ii) takes place at elevated temperature, preferably at a temperature in the range from 25 to 200° C., more preferably at a temperature in the range from 25 to 150° C.

Preferably, the initiators for radical polymerization are activated thermally by exposure to heat or photochemically by exposure to radiation such as UV and/or visible light.

Preferred initiators for radical polymerization are: tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, and potassium persulfate. Typically, such initiators are radical polymerization initiators which may be thermally activated.

Further preferred initiators for radical polymerization are: acetophenone, p-anisil, benzil, benzoin, benzophenone, 2-benzoylbenzoic acid, 4,4'-bis(diethylamino)benzophenone, 4,4'-bis(dimethylamino)benzophenone, benzoin methyl ether, benzoin isopropyl ether, benzoin isobutyl ether, benzoin ethyl ether, 4-benzoylbenzoic acid, 2,2'-bis(2-chlorophenyl)-4,4',5,5'-tetraphenyl-1,2'-biimidazole, methyl 2-benzoylbenzoate, 2-(1,3-benzodioxol-5-yl)-4,6-bis(trichloromethyl)-1,3,5-triazine, 2-benzyl-2-(dimethylamino)-4'-morpholinobutyrophenone, (±)-camphorquinone, 2-chlorothioxanthone, 4,4'-dichlorobenzophenone, 2,2-Diethoxyacetophenone, 2,2-Dimethoxy-2-phenylacetophenone, 2,4-diethylthioxanthen-9-one, diphenyl(2,4,6-trimethylbenzoyl)phosphine oxide, 1,4-dibenzoylbenzene, 2-ethylanthraquinone, 1-hydroxycyclohexyl phenyl ketone, 2-hydroxy-2-methylpropiophenone, 2-hydroxy-4'-(2-hydroxyethoxy)-2-methylpropiophenone, 2-isopropylthioxanthone, lithium phenyl(2,4,6-trimethylbenzoyl)phosphinate, 2-methyl-4'-(methylthio)-2-morpholino-propiophenone, 2-isonitrosopropiophenone, 2-phenyl-2-(p-toluenesulfonyloxy)acetophenone, and phenylbis(2,4,6-trimethylbenzoyl) phosphine oxide. Typically, such initiators are radical polymerization initiators which may be photochemically activated.

Preferred initiators for ionic polymerization are: alkyl lithium compounds, alkylamine lithium compounds and pentamethylcyclopentadienyl (Cp*) complexes of titanium, zirconium and hafnium.

Further preferred initiators for ionic polymerization are: bis(4-tert-butylphenyl)iodonium hexafluorophosphate, bis(4-fluorophenyl)iodonium trifluoromethanesulfonate, cyclopropyldiphenylsulfonium tetrafluoroborate, dimethylphenacylsulfonium tetrafluoroborate, diphenyliodonium hexafluorophosphate, diphenyliodonium hexafluoroarsenate, diphenyliodonium trifluoromethanesulfonate, 2-(3,4-dimethoxystyryl)-4,6-bis(trichloromethyl)-1,3,5-triazine, 2-[2-(furan-2-yl)vinyl]-4,6-bis(trichloromethyl)-1,3,5-triazine, 4-isopropyl-4'-methyldiphenyliodonium tetrakis(pentafluorophenyl)borate, 2-[2-(5-methylfuran-2-yl)vinyl]-4,6-bis(trichloromethyl)-1,3,5-triazine, 2-(4-methoxyphenyl)-4,6-bis(trichloromethyl)-1,3,5-triazine, 2-(4-methoxystyryl)-4,6-bis(trichloro-methyl)-1,3,5-triazine, (2-methylphenyl)(2,4,6-trimethylphenyl)iodonium trifluoromethanesulfonate, (3-methylphenyl)(2,4,6-trimethylphenyl)iodonium trifluoromethanesulfonate, (4-methylphenyl)(2,4,6-trimethylphenyl)iodonium trifluoromethanesulfonate, 4-nitrobenzenediazonium tetrafluoroborate, (4-nitrophenyl)(phenyl)iodonium trifluoromethanesulfonate, triphenylsulfonium tetrafluoroborate, triphenylsulfonium bromide, tri-p-tolylsulfonium hexafluorophosphate, tri-p-tolylsulfonium trifluoromethanesulfonate, [3-(trifluoromethyl)phenyl](2,4,6-trimethylphenyl)iodonium trifluoro-methanesulfonate, and [4-(trifluoromethyl)phenyl](2,4,6-trimethyl-phenyl)iodonium trifluoromethanesulfonate. Typically, such initiators are cationic polymerization initiators which may be photochemically activated.

Further preferred initiators for ionic polymerization are: acetophenone O-benzoyloxime, 1,2-bis(4-methoxyphenyl)-2-oxoethyl cyclohexylcarbamate, nifedipine, 2-nitrobenzyl cyclohexylcarbamate, 2-(9-oxoxanthen-2-yl)propionic acid 1,5,7-triazabicyclo[4.4.0]dec-5-ene salt, 2-(9-oxoxanthen-2-yl)propionic acid 1,5-diazabicyclo[4.3.0]non-5-ene salt, and 2-(9-oxoxanthen-2-yl)propionic acid 1,8-diazabicyclo[5.4.0]undec-7-ene salt. Typically, such initiators are anionic polymerization initiators which may be photochemically activated.

Exposure to radiation includes exposure to visible light and/or UV light. It is preferred that the visible light is electromagnetic radiation with a wavelength from >380 to 780 nm, more preferably from >380 to 500 nm. It is preferred that the UV light is electromagnetic radiation with a wavelength of 380 nm, more preferably a wavelength from 100 to 380 nm. More preferably, the UV light is selected from UV-A light having a wavelength from 315 to 380 nm, UV-B light having a wavelength from 280 to 315 nm, and UV-C light having a wavelength from 100 to 280 nm.

As UV light sources Hg-vapor lamps or UV-lasers are possible, as IR light sources ceramic-emitters or IR-laser diodes are possible and for light in the visible area laser diodes are possible.

Preferred UV light sources are light sources having a) a single wavelength radiation with a maximum of <255 nm such as e.g. 254 nm and 185 nm Hg low-pressure discharge lamps, 193 nm ArF excimer laser and 172 nm Xe2 layer, or b) broad wavelength distribution radiation with a wavelength component of <255 m such as e.g. non-doped Hg low-pressure discharge lamps.

In a preferred embodiment of the present invention the light source is a xenon flash light. Preferably, the xenon flash light has a broad emission spectrum with a short wavelength component going down to about 200 nm.

It is preferred that the polymerization in step (ii) takes place in a time range from 0.1 to 1 h, preferably from 0.5 to 1 h.

There is further provided a polymer which is obtainable or obtained by the above-mentioned method for forming a polymer according to the present invention. The polymer is preferably a linear or crosslinked polymer, more preferably a linear polymer.

There is also provided a polymer which contains at least one repeating unit derived from the polymerizable compound of Formula (1) as defined above.

More preferably, said polymer contains repeating units comprising a structural unit represented by the following Formula (4):

[-Sp$^1$-(MG-Sp$^1$)$_m$-]    Formula (4)

wherein Sp$^1$, MG and m have one of the above-mentioned definitions.

In a preferred embodiment, the polymer further contains additional repeating units derived from the additional polymerizable compounds as defined above.

Preferably, the polymers according to the present invention have a molecular weight $M_w$, as determined by GPC, of at least 2000 g/mol, more preferably of at least 4000 g/mol, even more preferably of at least 5000 g/mol. Preferably, the molecular weight $M_w$ of the polymers is less than 50000 g/mol. More preferably, the molecular weight $M_w$ of the polymers is in the range from 5000 to 20000 g/mol.

Moreover there is provided an electronic device comprising a polymer according to the present invention. For the electronic device it is preferred that the polymer forms a dielectric layer. The dielectric layer serves to electrically separate one or more electronic components being part of the electronic device from each other.

Finally, there is provided a manufacturing method for preparing a packaged microelectronic structure, in which a substrate is provided with a dielectric coating comprising one or more polymerized liquid crystalline monomers, wherein the method comprises the following steps:

(1) applying a polymerizable composition comprising one or more polymerizable compounds according to the present invention to a surface of a substrate; and
(2) curing said polymerizable composition to form a dielectric layer.

It is preferred that the polymerizable composition provided in step (1) comprises one polymerizable compound according to the present invention.

In a preferred embodiment, the polymerizable composition provided in step (1) comprises one or more additional polymerizable compounds which are capable to react with the polymerizable compound according to the present invention to form a copolymer.

Preferred additional polymerizable compounds are monomers which are capable to react with the polymerizable group P of the polymerizable compound of the present invention to form a copolymer. Such preferred additional polymerizable compounds are selected from acrylates, epoxides, olefins, vinyl ethers, vinyl esters, polythiols, polyamines, and polymaleimides. Using basic chemical knowledge, the skilled person is able to find and select for a given polymerizable compound of the present invention suitable additional polymerizable compounds which are capable to react with the first mentioned to form a copolymer.

Preferred acrylates, epoxides, olefins, vinyl ethers, vinyl esters, polythiols, polyamines, and polymaleimides are the same as described above.

It is preferred that the molar ratio between the polymerizable compounds of the present invention and the additional polymerizable compounds in the polymerizable composition is from 0.1:100 to 100:0.1.

It is preferred that the polymerizable composition further comprises one or more inorganic filler materials. Preferred inorganic filler materials are selected from nitrides, titanates, diamond, oxides, sulfides, sulfites, sulfates, silicates and carbides which may be optionally surface-modified with a capping agent. More preferably, the filler material is selected from the list consisting of AlN, $Al_2O_3$, BN, $BaTiO_3$, $B_2O_3$, $Fe_2O_3$, $SiO_2$, $TiO_2$, $ZrO_2$, PbS, SiC, diamond and glass particles.

Preferably, the total content of the inorganic filler material in the polymerizable composition is in the range from 0.001 to 90 wt.-%, more preferably 0.01 to 70 wt.-% and most preferably 0.01 to 50 wt.-%, based on the total weight of the polymerizable composition.

It is preferred that the polymerizable composition provided in step (1) is substantially free of solvent. Substantially free of solvent means that the content of total residual solvent in the polymerizable composition is not more than 10 wt.-%, preferably not more than 5 wt.-%, and more preferably not more than 1 wt.-%, based on the total weight of the polymerizable compound(s).

The method by which the polymerizable composition is applied in step (1) is not particularly limited. Preferred application methods for step (1) are dispensing, dipping, screen printing, stencile printing, roller coating, spray coating, slot coating, spin coating, gravure printing, flexo printing or inkjet printing.

The polymerizable compounds of the present invention may be provided in the form of a formulation suitable for gravure printing, flexo printing and/or ink-jet printing. For the preparation of such formulations, ink base formulations as known from the state of the art can be used.

Alternatively, the polymerizable compound of the present invention may be provided in the form of a formulation suitable for photolithography. The photolithography process allows the creation of a photopattern by using light to transfer a geometric pattern from a photomask to a light-curable composition. Typically, such light-curable composition contains a photochemically activatable polymerization initiator. For the preparation of such formulations, photoresist base formulations as known from the state of the art can be used.

The layer of the polymerizable composition which is applied in step (1) has preferably an average thickness of 1 to 50 μm, more preferably 2 to 30 μm, and most preferably 3 to 15 μm.

It is preferred that the curing in step (2) is carried out by radical or ionic polymerization or by exposure to radiation. Preferred curing conditions correspond to the preferred polymerization conditions as given above for the method for forming a polymer material.

There is also provided a microelectronic device which comprises the packaged microelectronic structure prepared according to the above-mentioned manufacturing method.

The present invention is further illustrated by the examples following hereinafter which shall in no way be construed as limiting. The skilled person will acknowledge that various modifications, additions and alternations may be made to the invention without departing from the spirit and scope of the invention as defined in the appended claims.

EXAMPLES

A Synthesis of Dianhydrides

1. Synthesis of 2-methyl-1,4-phenylene bis(4-hydroxybenzoate) (1)

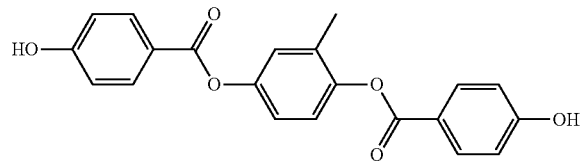 [SMILES: Cc1cc(OC(=O)c2ccc(O)cc2)ccc1OC(=O)c1ccc(O)cc1]

A mixture of 4-hydroxybenzoic acid (111 g, 0.8 mol), 2-methylhydroquinone (50 g, 0.4 mol), p-toluenesulfonic acid monohydrate (7.7 g, 0.04 mol) and p-xylene (400 mL) was heated to reflux using a Dean-Stark apparatus for 20 h. The reaction mixture was cooled to room temperature and the product was isolated by filtration, washed with methanol (400 mL) and vacuum-dried at 40° C. for 12 h to give the product as a white crystalline solid (136 g, 93%). LC-MS (ESI-MS): m/z=365 g/mol $[M+1H]^{1+}$.

2. Synthesis of (((2-methyl-1,4-phenylene)bis(oxy)) bis(carbonyl)bis (4,1-phenylene) bis(1,3-dioxo-1,3-dihydroisobenzofuran-5-carboxylate (2)

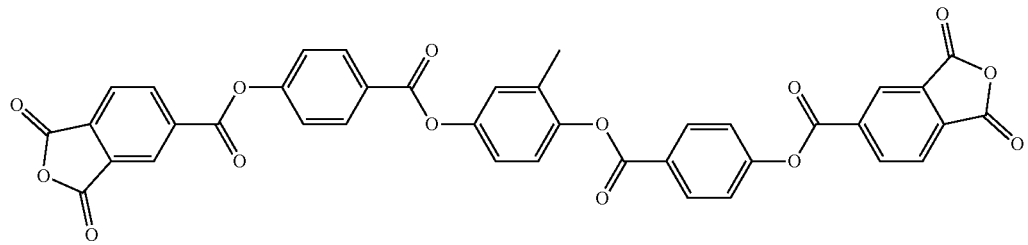

Diphenol 1 (72 g, 0.2 mol) was dissolved in dry THF (1.2 L) in the presence of pyridine (50 mL, 0.62 mol) as an HCl acceptor. In a separated flask trimellitic anhydride chloride (TMAC, 85 g, 0.41 mol) was dissolved in dry THF (0.8 L). The diphenol solution was slowly added to the TMAC solution at 0° C. After stirring for 20 h at room temperature the formed precipitate was filtered, washed with THF, water and again THF and vacuum-dried at 80° C. for 12 h. An excess of $Ac_2O$ was added to the partially hydrolyzed product and heated at 120° C. for 3 h to ensure cyclodehydration. $Ac_2O$ was azeotropically removed with toluene. The product was finally purified by recrystallization from toluene and vacuum-dried at 160° C. for 12 h (104 g, 71%). $^1$H-NMR (500 MHz, DMSO-$d_6$): δ=8.74-8.62 (m, 3H), 8.41-8.22 (m, 6H), 7.71-7.66 (m, 3H), 7.65-7.61 (m, 1H), 7.40-7.36 (m, 3H), 7.28 (dd, J=8.6, 2.7 Hz, 1H), 2.25 (s, 3H) ppm.

3. Synthesis of 2-methyl-1,4-phenylene bis(1,3-dioxo-1,3-dihydroiso-benzofuran-5-carboxylate) (3)

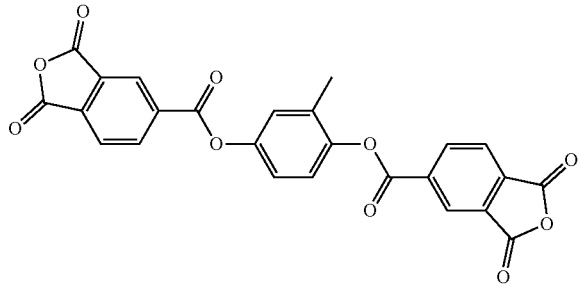 [SMILES: Cc1cc(OC(=O)c2ccc3c(c2)C(=O)OC3=O)ccc1OC(=O)c1ccc2c(c1)C(=O)OC2=O]

2-Methyl hydroquinone (30 g, 0.24 mol) was dissolved in a mixed solvent of dry THF (0.4 L) and pyridine (59 mL, 0.73 mol). Trimellitic anhydride chloride (104 g, 0.48 mol) was dissolved in anhydrous THF (0.3 L) and added dropwise to the methyl hydroquinone solution at 0° C. with continuous stirring over 1 h, then subsequently reacted at room temperature for 12 h. The reaction mixture was filtered off to collect the white precipitate consisting of crude product and pyridine/hydrochloride salt as by-product. The precipitate was repeatedly washed with water and THF to remove the salt and subsequently dried at 160° C. for 24 h in vacuum. Since the product undergoes partial hydrolysis toward anhydride ring opening on the procedure, the solid was suspended in dry toluene (600 mL), added with DMF (6 drops) and oxalyl chloride (49.5 g, 0.39 mol) and stirred at reflux for 8 h to ensure ring closure dehydration. The batch is cooled to room temperature, filtered and washed with dry toluene and dry THF and finally dried at 120° C. in vacuum. The crude product obtained was finally recrystallized from a mixed solvent of 1,4-dioxane/THF (1/1, v/v) then vacuum-dried again at 160° C. for 24 h to yield the product as a white solid (102 g, 89%). $^1$H NMR (500 MHz, DMSO-$d_6$): δ=8.71 (dd, J=7.9, 1.4 Hz, 1H), 8.69-8.65 (m, 2H), 8.64 (t, J=1.1 Hz, 1H), 8.31 (ddd, J=7.9, 4.6, 0.8 Hz, 2H), 7.47 (d, J=8.8 Hz, 1H), 7.45 (dd, J=2.8, 0.8 Hz, 1H), 7.37 (dd, J=8.6, 2.9 Hz, 1H), 2.26 (s, 3H) ppm.

4. Synthesis of [1,1'-biphenyl]-4,4'-diylbis(1,3-dioxo-1,3-dihydroiso-benzo-furan-5-carboxylate (4)

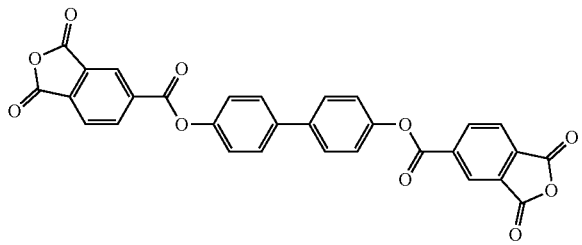 [SMILES: O=C(Oc1ccc(-c2ccc(OC(=O)c3ccc4c(c3)C(=O)OC4=O)cc2)cc1)c1ccc2c(c1)C(=O)OC2=O]

4,4'-Dihydroxybiphenyl (60 g, 0.32 mol) was dissolved in a mixed solvent of dry DMF (0.6 L) and pyridine (80 mL, 0.97 mol). Trimellitic anhydride chloride (139 g, 0.64 mol) was dissolved in anhydrous DMF (0.4 L) and added dropwise to the 4,4'-dihydroxybiphenyl solution at 0° C. with continuous stirring over 1 h, then subsequently reacted at 80° C. for 20 h. The reaction mixture was filtered off to collect the yellow precipitate consisting of crude product and pyridine/hydrochloride salt as by-product. The precipitate was repeatedly washed with water and dry THF to remove the salt. Since the product undergoes partial hydrolysis toward anhydride ring opening on the procedure, it was heated at 160° C. for 24 h in vacuum to ensure ring closure dehydration to yield the product as a yellow solid (138 g, 80%). $^1$H-NMR (500 MHz, DMSO-$d_6$): δ=8.72-8.64 (m, 4H), 8.31 (d, J=8.6, 2H), 7.86 (d, J=8.3 Hz, 4H), 7.53 (J=8.3 Hz, 4H) ppm.

5. Synthesis of 1,4-phenylene bis(4-hydroxybenzoate) (5)

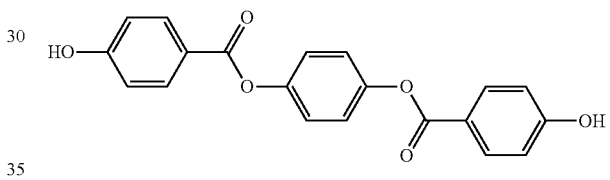

A mixture of 4-hydroxybenzoic acid (49 g, 0.35 mol), hydroquinone (20 g, 0.176 mol), p-toluenesulfonic acid monohydrate (3.4 g, 0.017 mol) and p-xylene (0.2 L) was heated to reflux using a Dean-Stark apparatus for 20 h. The reaction mixture was cooled to room temperature and the product was isolated by filtration, washed with methanol (400 mL) and vacuum-dried at 40° C. for 12 h to yield the product as a white crystalline solid (59 g, 95%). $^1$H-NMR (500 MHz, DMSO-$d_6$): δ=10.54 (s, 2H), 8.04-7.97 (m, 4H), 7.33 (s, 4H), 6.98-6.91 (m, 4H) ppm. LC-MS (ESI-MS): m/z=351 g/mol [M+1H]$^{1+}$.

6. Synthesis of ((1,4-phenylenebis(oxy))bis(carbonyl))bis (4,1-phenylene) bis(1,3-dioxo-1,3-dihydroisobenzofuran-5-carboxylate) (6)

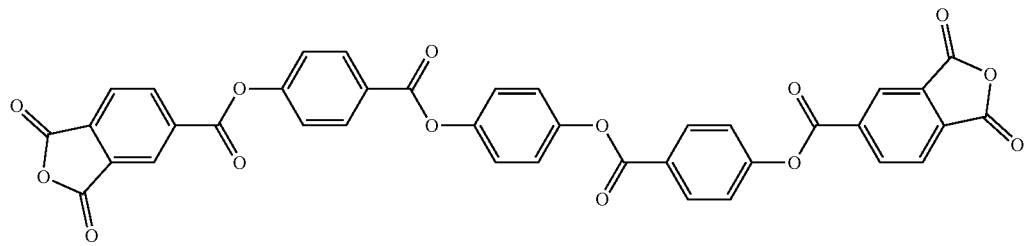 [SMILES: O=C(Oc1ccc(OC(=O)c2ccc(OC(=O)c3ccc4c(c3)C(=O)OC4=O)cc2)cc1)c1ccc(OC(=O)c2ccc3c(c2)C(=O)OC3=O)cc1]

Trimellitic anhydride chloride (TMAC, 147 g, 0.685 mol) was dissolved in dry THF (1.0 L) in the presence of pyridine (50.8 g, 0.64 mol). In a separated flask diphenol 5 (75 g, 0.21 mol) was dissolved in dry THF (0.8 L) and slowly added to the TMAC solution at 0° C. After stirring for 20 h at reflux the formed precipitate was filtered, washed with THF, water and again THF and vacuum-dried at 160° C. for 20 h (104 g, 71%). $^1$H-NMR (500 MHz, DMSO-$d_6$): δ=8.74-8.62 (m, 3H), 8.36-8.27 (m, 6H), 8.22 (dd, J=8.9, 2.9 Hz, 2H), 7.68 (dd, J=8.8, 2.4 Hz, 2H), 7.50-7.35 (m, 5H) ppm.

7. Synthesis of 4,4'-((1s,3s,5r,7r)-adamantane-1,3-diyl)diphenol (7)

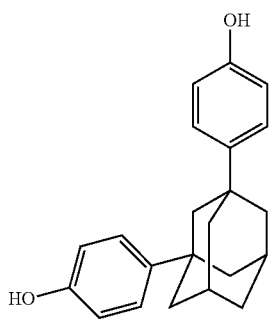 [SMILES: Oc1ccc(C23CC4CC(C2)CC(c2ccc(O)cc2)(C4)C3)cc1]

Phenol (47 g, 0.5 mol, dissolved in 920 mL TFA) was treated with 1,3-adamantanediol (40 g, 0.24 mol) and heated at reflux for 20 h. The reaction mixture was cooled to room temperature and quenched cautiously with H$_2$O (1 L). A white solid precipitated, which was suspended in DCM and stirred overnight at 35° C. The solid was filtered off, washed with DCM and dried under vacuum to yield 58 g (76%) of white crystalline solid.

$^1$H-NMR (500 MHz, DMSO-$_{d6}$) δ=8.99 (broad s), 7.20-7.16 (m, 4H), 6.72-6.67 (m, 4H), 2.21 (p, J=3.0, 2H), 1.87-1.79 (m, 10H), 1.71 (d, J=3.1 Hz, 2H) ppm.

8. Synthesis of ((1s,3s,5r,7r)-adamantane-1,3-diyl) bis(4,1-phenylene) bis(1,3-dioxo-1,3-dihydroisobenzofuran-5-carboxylate) (8)

Trimellitic anhydride chloride (TMAC, 43 g, 0.2 mol) was dissolved in dry THF (0.3 L) in the presence of pyridine (14.8 g, 0.19 mol). In a separated flask diphenol 7 (20 g, 0.062 mol) was dissolved in dry THF (0.3 L) and slowly added to the TMAC solution at 0° C. After stirring for 20 h at reflux the formed precipitate was filtered, washed with THF, water and again THF and vacuum-dried at 45° C. for 20 h. An excess of Ac$_2$O was added to the partially hydrolyzed product and heated at 120° C. for 12 h to ensure cyclodehydration. The reaction mixture was filtered, washed with THF and vacuum-dried at 100° C. for 12 h (29.6 g, 71% of a lightly yellow solid). $^1$H-NMR (500 MHz, DMSO-$d_6$): δ=8.67-8.59 (m, 4H), 8.28 (d, J=7.9 Hz, 2H), 7.58 (d, J=8.4 Hz, 4H), 7.33 (d, J=8.2 Hz, 4H), 2.31 (s, 2H), 2.06 (s, 2H), 2.02-1.91 (m, 8H), 1.79 (s, 2H) ppm.

B Synthesis of Oligomers

9. Example 1

Dianhydride 2 (30 g, 0.04 mol) was dissolved in NMP/toluene (0.3 L, 1/1, v/v). A solution of hexamethylenediamine (9.8 g, 0.08 mol) in NMP (50 mL) was added and the reaction mixture was heated to reflux using a Dean-Stark apparatus for 12 h. The reaction mixture was cooled to room temperature and maleic anhydride (9.8 g, 0.1 mol) was slowly added. The mixture was heated again to reflux using a Dean-Stark apparatus for 12 h. An additional 100 mL of toluene was added after the mixture had been cooled down to room temperature. The mixture was finally added dropwise to methanol to precipitate the oligomer. After filtering and drying 11.7 g (85%) of the oligomer was yielded as brown powder.

10. Example 2

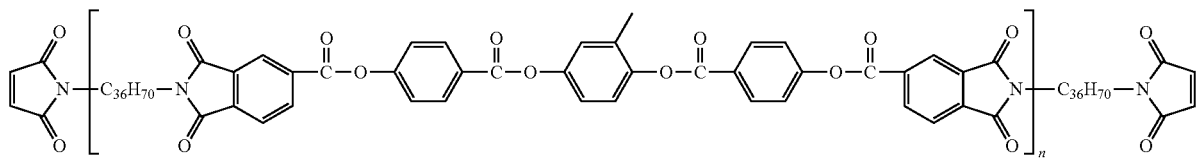

Dianhydride 2 (30 g, 0.04 mol) was dissolved in NMP/toluene (0.3 L, 1/1, v/v) followed by the addition of priamine (45 g, 0.08 mol). The reaction mixture was heated to reflux using a Dean-Stark apparatus for 12 h. The reaction mixture was cooled to room temperature and maleic anhydride (9.8 g, 0.1 mol) was slowly added. The mixture was heated again to reflux using a Dean-Stark apparatus for 12 h. An additional 50 mL of toluene was added after the mixture had been cooled down to room temperature. The mixture was finally added drop-wise to methanol (0.6 L) to precipitate the oligomer. After removing the solvent the crude product was washed twice with methanol and vacuum-dried to produce 65 g (81%) of a brown waxy resin.

11. Example 3

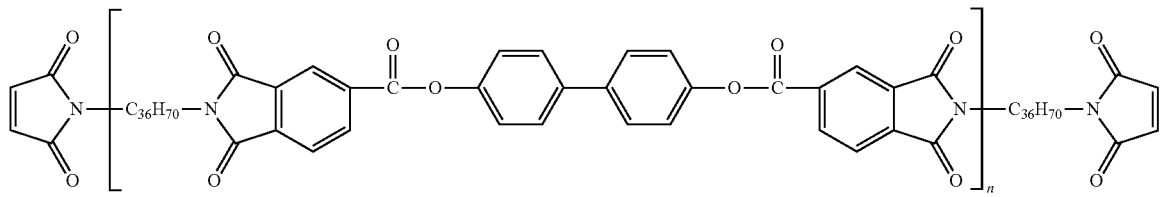

Dianhydride 4 (21 g, 0.04 mol) was suspended in NMP/toluene (0.3 L, 1/1, v/v) followed by the addition of priamine (45 g, 0.08 mol). The reaction mixture was heated to reflux using a Dean-Stark apparatus for 12 h. The reaction mixture was cooled to room temperature and maleic anhydride (10 g, 0.1 mol) was slowly added. The mixture was heated again to reflux using a Dean-Stark apparatus for 12 h. An additional 50 mL of toluene was added after the mixture had been cooled down to room temperature. The mixture was finally added drop-wise to methanol (0.6 L) to precipitate the oligomer. After removing the solvent the crude product was washed twice with methanol and vacuum-dried to produce 61 g (88%) of a dark waxy resin.

12. Example 4

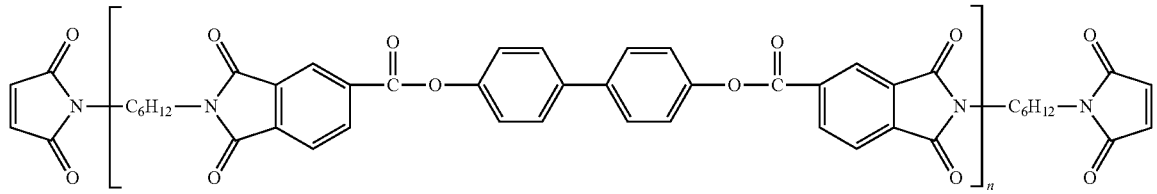

Dianhydride 4 (21 g, 0.04 mol) was dissolved in NMP/toluene (0.3 L, 1/1, v/v). A solution of hexamethylenediamine (9.8 g, 0.08 mol) in NMP (50 mL) was added and the reaction mixture was heated to reflux using a Dean-Stark apparatus for 12 h. The reaction mixture was cooled to room temperature and maleic anhydride (9.8 g, 0.1 mol) was slowly added. The mixture was heated again to reflux using a Dean-Stark apparatus for 12 h. An additional 100 mL of toluene was added after the mixture had been cooled down to room temperature. The mixture was finally added drop-wise to methanol to precipitate the oligomer. After filtering and drying 25 g (70%) of the oligomer was yielded as brown powder.

13. Example 5

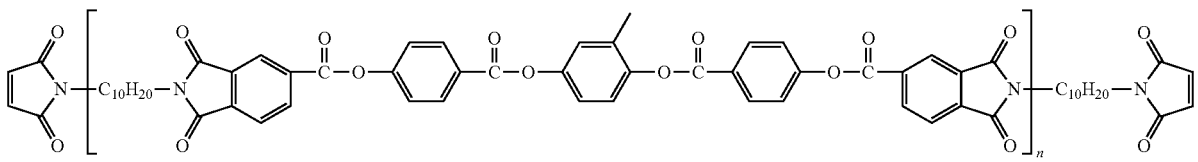

Dianhydride 2 (15 g, 0.02 mol) was suspended in NMP/toluene (0.2 L, 1/1, v/v) followed by the addition of decane-1,10-diamine (7.3 g, 0.04 mol). The reaction mixture was heated to reflux using a Dean-Stark apparatus for 12 h. The reaction mixture was cooled to room temperature and maleic anhydride (5.2 g, 0.052 mol) was slowly added. The mixture was heated again to reflux using a Dean-Stark apparatus for 12 h. An additional 0.2 L of toluene was added after the mixture had been cooled down to room temperature. The mixture was finally added drop-wise to methanol (0.8 L) to precipitate the oligomer. After removing the solvent the crude product was washed twice with methanol and vacuum-dried to produce 24 g (96%) of a brown solid.

14. Example 6

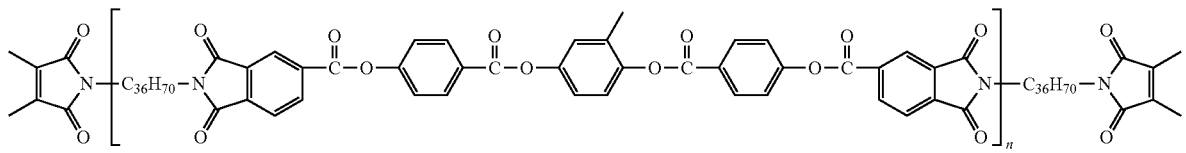

Dianhydride 2 (30 g, 0.04 mol) was dissolved in NMP/toluene (0.3 L, 1/1, v/v) followed by the addition of priamine (45 g, 0.08 mol). The reaction mixture was heated to reflux using a Dean-Stark apparatus for 12 h. The reaction mixture was cooled to room temperature and 2,3-dimethylmaleic anhydride (13.7 g, 0.1 mol) was slowly added. The mixture was heated again to reflux using a Dean-Stark apparatus for 12 h. An additional 100 mL of toluene was added after the mixture had been cooled down to room temperature. The mixture was finally added drop-wise to methanol (0.5 L) to precipitate the oligomer. After removing the solvent the crude product was washed twice with methanol and vacuum-dried to produce 54 g (65%) of a brown waxy resin.

15. Example 7

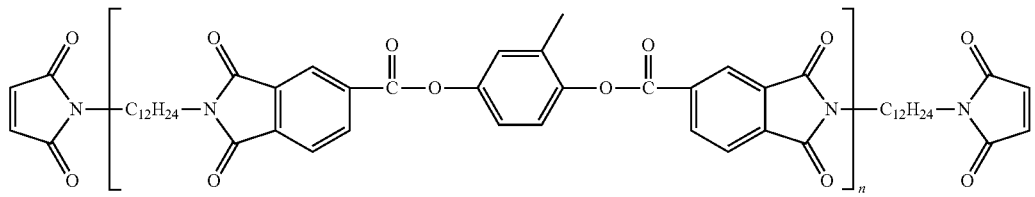

Dianhydride 3 (13 g, 0.028 mol) was suspended in NMP/toluene (0.3 L, 1/1, v/v) followed by the addition of 1,12-diaminododecane (11.5 g, 0.056 mol). The reaction mixture was heated to reflux using a Dean-Stark apparatus for 12 h. The reaction mixture was cooled to room temperature and maleic anhydride (7.0 g, 0.07 mol) was slowly added. The mixture was heated again to reflux using a Dean-Stark apparatus for 12 h. An additional 0.2 L of toluene was added after the mixture had been cooled down to room temperature. The mixture was finally added drop-wise to methanol (0.8 L) to precipitate the oligomer. After removing the solvent the crude product was washed twice with methanol and vacuum-dried to produce 20 g (71%) of a brown solid.

16. Example 8

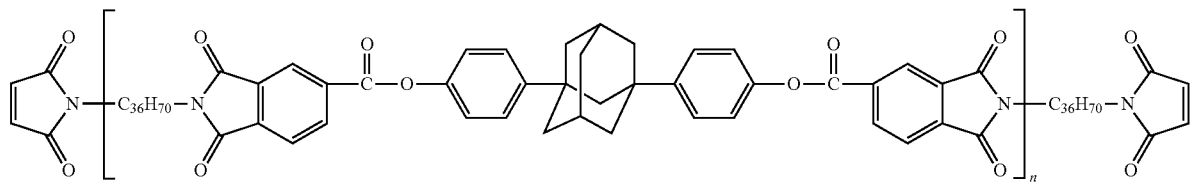

Dianhydride 8 (10 g, 0.015 mol) was dissolved in NMP/toluene (0.1 L, 1/1, v/v) followed by the addition of priamine (16.5 g, 0.03 mol). The reaction mixture was heated to reflux using a Dean-Stark apparatus for 12 h. The reaction mixture was cooled to room temperature and maleic anhydride (3.7 g, 0.04 mol) was slowly added. The mixture was heated again to reflux using a Dean-Stark apparatus for 12 h. An additional 50 mL of toluene was added after the mixture had been cooled down to room temperature. The mixture was finally added drop-wise to methanol (0.2 L) to precipitate the oligomer. After removing the solvent the crude product was washed twice with methanol and vacuum-dried to produce 20 g (71%) of a brown waxy resin.

C Mechanical Testing

17. Example

Tensile Strength and Elongation at Break

Tensile strength and elongation at break were measured from some of the example polymer specimens (film dimension 25 mm long, 15 mm wide, typically 50-60 µm thick) on a mechanical testing machine (500 N Zwicki) (see Table 1). The measurements were performed according to the following parameter set: premeasurement: 0.1 N at an extension rate of 10 mm/min; main extension rate of 50 mm/min. All experiments were conducted at room temperature (23±2° C.).

TABLE 1

Measurement of elongation at break and tensile strength.

|  | UV dose [min] | Elongation at break [%] | Tensile strength [MPa] |
| --- | --- | --- | --- |
| Example 2 |  |  |  |
| $M_n$ = 9.600 Da | 0.5 | 245 | 6 |
|  | 3 | 206 | 17 |
| $M_n$ = 14.000 Da | 0.5 | 231 | 22 |
|  | 3 | 157 | 19 |
| Example 6 |  |  |  |
| $M_n$ = 7.000 Da | 0.5 | 255 | 4 |
|  | 3 | 209 | 8 |
| $M_n$ = 15.000 Da | 0.5 | 288 | 24 |
|  | 3 | 242 | 14 |

D Electrical Properties

18. Example

Evaluation of the Dielectric Constant

ITO (indium tin oxide) glass was coated via spin coating process with a defined thickness of the materials. The thickness was measured with a profilometer from Bruker. Subsequently, a silver layer was vacuum deposited via a mask process to avoid short cuts on the coated area. The resistance of the layer stacks was determined with an LCR meter and the dielectric constant was calculated. The results are shown in Table 2.

TABLE 2

Calculation of dielectric constants

| Material | Layer thickness [µm] | Capacitance [nF] | Dielectric constant |
| --- | --- | --- | --- |
| Example 3 (a) | 3.66 | 0.17 | 3.6 |
| Example 3 (b) | 3.18 | 0.2 | 3.7 |
| Example 3 (c) | 2.99 | 0.21 | 3.6 |
| Example 6 (a) | 3.21 | 0.21 | 3.9 |
| Example 6 (b) | 3.23 | 0.19 | 3.5 |
| Example 6 (c) | 4.04 | 0.17 | 4.0 |

The invention claimed is:

1. A polymerizable compound, represented by Formula (1):

$$P^1\text{-}Sp^1\text{-}(MG\text{-}Sp^1)_m\text{-}P^1 \quad \text{Formula (1)}$$

wherein:

m is an integer from 2 to 60;

$P^1$ denotes a polymerizable group (P);

$Sp^1$ denotes at each occurrence
  $Sp'\text{-}X'$;

$Sp'$ denotes
  (a) $C_{1\text{-}40}$-straight chain alkylene or $C_{3\text{-}40}$-branched chain alkylene, each of which is optionally mono- or polysubstituted by F, Cl, Br, I or CN and in which, in addition, one or more non-adjacent $CH_2$ groups may each be replaced, independently of one another, by —O—, —S—, —NH—, —NR$^{01}$—, —SiR$^{01}$R$^{02}$—, —CO—, —COO—, —OCO—, —OCO—O—, —S—CO—, —CO—S—, —NR$^{01}$—CO—O—, —O—CO—NR$^{01}$—, —NR$^{01}$—CO—NR$^{01}$—, or —CH=CH— in such a way that O and/or S atoms are not linked directly to one another, or
  (b) -Sp$^x$-G-Sp$^y$-, wherein Sp$^x$ and Sp$^y$ denote independently of each other $C_{1\text{-}20}$-alkylene or a single bond; G denotes $C_{3\text{-}20}$-cycloalkylene which is optionally mono- or polysubstituted by $C_{1\text{-}20}$-alkyl;

X' denotes —O—, —S—, —CO—, —COO—, —OCO—, —O—COO—, —CO—NR$^{01}$—, —NR$^{01}$—CO—, —NR$^{01}$—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=C—, —N=N—, —CH=CR$^{01}$—, —CY$^{01}$=CY$^{02}$—, —CH=CH—COO—, —OCO—CH=CH— or a single bond;

$R^{01}$ and $R^{02}$ each, independently of one another, denote H or $C_{1-12}$-alkyl; and $Y^{01}$ and $Y^{02}$ each, independently of one another, denote H, F, Cl or CN;

MG is a rod-shaped mesogenic group, which is selected from Formula (2):

  Formula (2)

wherein:

$A^{22}$ is at each occurrence independently of one another an aryl group, heteroaryl group, heterocyclic group, alicyclic group optionally being substituted by one or more identical or different groups L, or a cyclic imide group selected from the group consisting of:

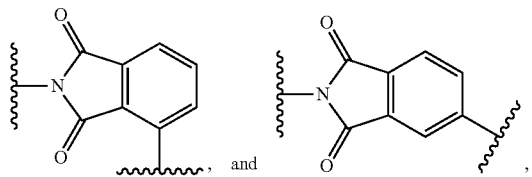 [SMILES: *c1cccc2c1C(=O)N(*)C2=O ; *c1ccc2c(c1)C(=O)N(*)C2=O]

where one or more H atoms may be replaced by a group L, and/or one or more double bonds may be replaced by single bonds, and/or one or more CH groups may be replaced by N;

$A^{21}$ and $A^{23}$ are independently and at each occurrence independently of one another a cyclic imide group selected from the group consisting of:

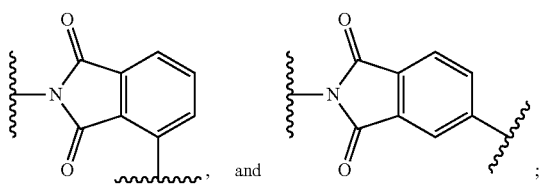 [SMILES: *c1cccc2c1C(=O)N(*)C2=O ; *c1ccc2c(c1)C(=O)N(*)C2=O]

$Z^{21}$ and $Z^{22}$ are independently and at each occurrence independently from each other, —O—, —S—, —CO—, —COO—, —OCO—, —S—CO—, —CO—S—, —O—COO—, —CO—NR$^{01}$—, —NR$^{01}$—CO—, —NR$^{01}$—CO—NR$^{02}$—, —NR$^{01}$—CO—O—, —O—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^{01}$—, —CY$^{01}$=CY$^{02}$—, —C≡C—, —CH=CH—COO—, —OCO—CH=CH—, or a single bond;

L is F, Cl, Br, I, —CN, —NO$_2$, —NCO, —NCS, —OCN, —SCN, —C(=O)NR$^{xx}$R$^{yy}$, —C(=O)OR$^{xx}$, —C(=O)R$^{xx}$, —NR$^{xx}$R$^{yy}$, —OH, —SF$_5$, or straight chain alkyl, alkoxy, alkylcarbonyl, alkoxycarbonyl, alkylcarbonyloxy or alkoxycarbonyloxy with 1 to 20 C atoms, or branched chain alkyl, alkoxy, alkylcarbonyl, alkylcarbonyloxy or alkoxycarbonyloxy with 3 to 20 carbon atoms, wherein one or more H atoms are optionally replaced by F or Cl, —CN straight chain alkyl, alkoxy, alkylcarbonyl, alkoxycarbonyl, alkylcarbonyloxy or alkoxycarbonyloxy with 1 to 6 C atoms, or branched chain alkyl, alkoxy, alkylcarbonyl, alkoxycarbonyl, alkylcarbonyloxy or alkoxycarbonyloxy with 3 to 6 carbon atoms;

$R^{xx}$ and $R^{yy}$ independently of each other denote H or alkyl with 1 to 12 C-atoms; and k and l are each and independently 1, 2, 3 or 4.

2. The polymerizable compound according to claim 1, wherein the polymerizable groups P are groups containing a C=C double bond or C≡C triple bond, or groups which are suitable for polymerization by a ring-opening reaction.

3. The polymerizable compound according to claim 1, wherein the polymerizable groups P are CH$_2$=CW$^1$—COO—, CH$_2$=CW$^1$—CO—,

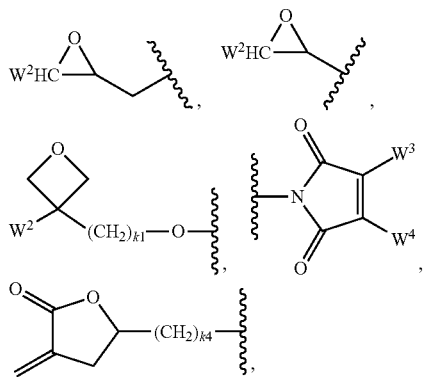

CH$_2$=CW$^2$—(O)$_{k3}$—, CW$^1{}_2$=CH—CO—(O)$_{k3}$—, CW$^1{}_2$=CH—CO—NH—, CH$_2$=CW$^1$—CO—NH—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, or Phe-CH=CH—, wherein:

W$^1$ denotes H, F, Cl, CN, CF$_3$, phenyl or alkyl having 1 to 5 C atoms;

W$^2$ denotes H or alkyl having 1 to 5 C atoms;

W$^3$ and W$^4$ each, independently of one another, denote H, Cl or alkyl having 1 to 5 C atoms;

Phe denotes 1,4-phenylene, which is optionally substituted by one or more radicals L as being defined above but being different from P-Sp; and k$_1$, k$_2$ and k$_3$ each, independently of one another, denote 0 or 1; and k$_4$ is an integer from 1 to 10.

4. The polymerizable compound according to claim 1, wherein each Sp$^1$ is independently —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$—, or —(SiR$^{01}$R$^{02}$—O)$_{p1}$—, wherein:

p1 is an integer from 1 to 60;

q1 is an integer from 1 to 12; and

R$^{01}$ and R$^{02}$ each, independently of one another, denote H or alkyl having 1 to 12 C atoms.

5. The polymerizable compound according to claim 1, wherein A$^{22}$ denotes independently and, in case of multiple occurrence, independently of one another, a moiety of groups a) to e):

a) trans-1,4-cyclohexylene, 1,4-cyclohexenylene and 4,4'-bicyclohexylene, in which one or more non-adjacent CH₂ groups may be replaced by —O— and/or —S— and wherein one or more H atoms may be replaced by a group L;

b) 1,4-phenylene, 1,3-phenylene, 4,4'-biphenylene, 2,5-thiophene and 2,6-dithieno[3,2-b:2',3'-d]thiophene in which one or two CH groups may be replaced by N and where one or more H atoms may be replaced by a group L;

c) tetrahydropyran-2,5-diyl, 1,3-dioxane-2,5-diyl, tetrahydrofuran-2,5-diyl, cyclobut-1,3-diyl, piperidine-1,4-diyl, thiophene-2,5-diyl and selenophen-2,5-diyl, which may be substituted one or more groups L;

d) saturated, partially unsaturated or completely unsaturated, and optionally substituted, polycyclic radicals having 5 to 20 cyclic C atoms, of which one or more can also be replaced by heteroatoms, or e) cyclic imides:

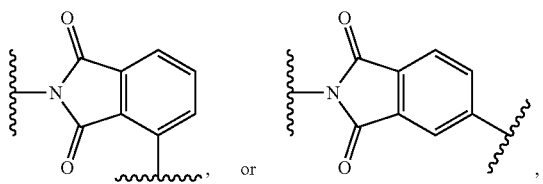 [SMILES: *c1cccc2c1C(=O)N(*)C2=O ; *c1ccc2c(c1)C(=O)N(*)C2=O]

where one or more H atoms may be replaced by a group L, and/or one or more double bonds may be replaced by single bonds, and/or one or more CH groups may be replaced by N.

6. A method for forming a polymer comprising:
(i) providing a polymerizable starting material comprising one or more polymerizable compounds according to claim 1; and
(ii) polymerizing said polymerizable starting material.

7. The method forming a polymer according to claim 6, wherein the polymerizable starting material further comprises one or more additional polymerizable compounds selected from the group consisting of acrylates, epoxides, olefins, vinyl ethers, vinyl esters, polythiols and polyamines, which are capable of reacting with the polymerizable compound to form a copolymer.

8. The method forming a polymer according to claim 6, wherein the polymerizable starting material is polymerized in (ii) by radical or ionic polymerization or by exposure to radiation.

9. A polymer containing at least one repeating unit which is derived from the polymerizable compound of Formula (1) as defined in claim 1.

10. The polymer according to claim 9, wherein the repeating unit comprises a structural unit represented by Formula (4):

[-Sp¹-(MG-Sp¹)ₘ-]     Formula (4).

11. An electronic device comprising a polymer according to claim 9.

12. The electronic device according to claim 11, wherein the polymer forms a dielectric layer.

13. A manufacturing method preparing a packaged microelectronic structure, in which a substrate is provided with a coating comprising one or more polymerized liquid crystalline monomers, wherein the method comprises:
(1) applying a polymerizable composition comprising one or more polymerizable compounds according to claim 1 to a surface of a substrate; and (2) curing said polymerizable composition to form a dielectric layer.

14. The manufacturing method preparing a packaged microelectronic structure according to claim 13, wherein the polymerizable composition further comprises one or more additional polymerizable compounds selected from the group consisting of acrylates, epoxides, olefins, vinyl ethers, vinyl esters, polythiols, and polyamines, which are capable of reacting with the polymerizable compound to form a copolymer.

15. The manufacturing method preparing a packaged microelectronic structure according to claim 13, wherein the polymerizable composition further comprises one or more inorganic filler materials.

16. A microelectronic device comprising a packaged microelectronic structure comprising a polymer containing at least one repeating unit which is derived from the polymerizable compound of Formula (1) as defined in claim 1.

17. The polymerizable compound according to claim 5, wherein the d) saturated, partially unsaturated or completely unsaturated, and optionally substituted, polycyclic radicals having 5 to 20 cyclic C atoms, of which one or more can also be replaced by heteroatoms are bicyclo [1.1.1] pentane-1,3-diyl, bicyclo [2.2.2] octane-1,4-diyl, spiro [3.3] heptane-2,6-diyl, tricyclo [3.3.1.1] decane-1,3-diyl,

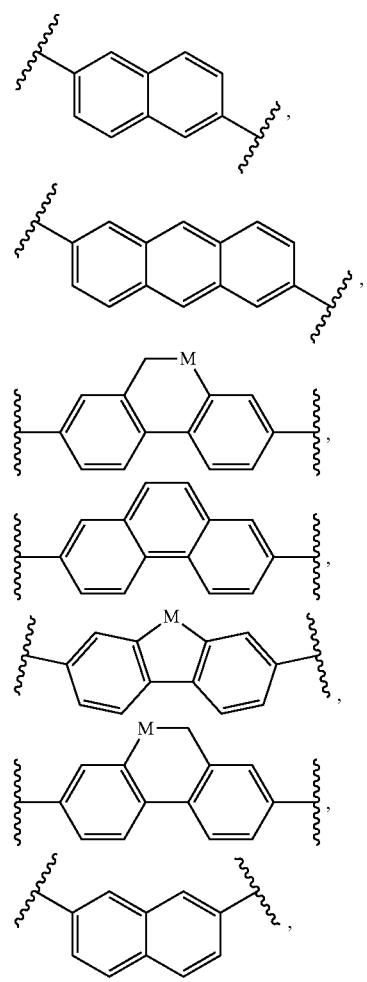

-continued

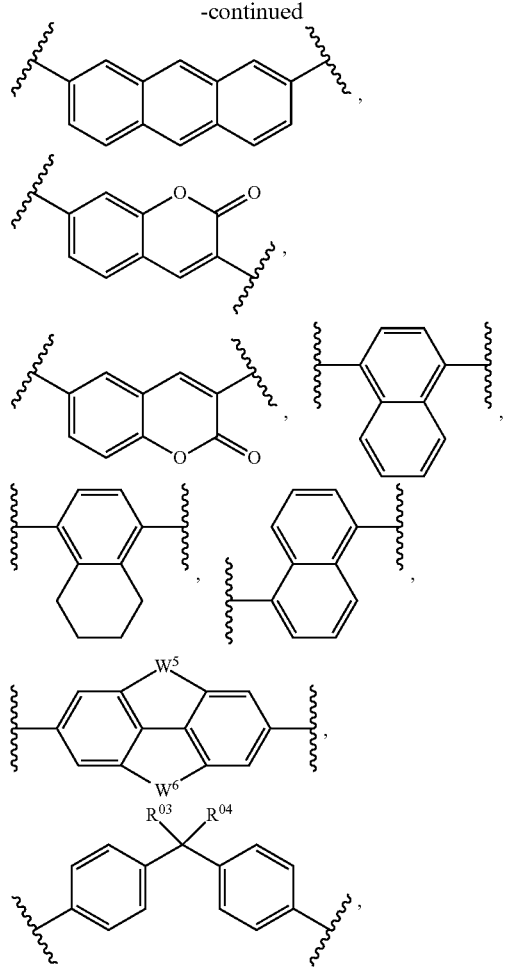

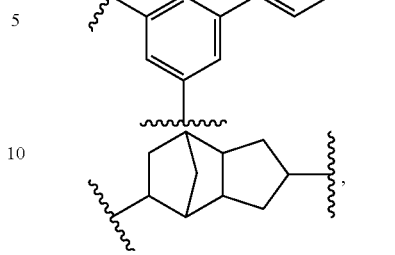

where one or more H atoms may be replaced by a group L, and/or one or more double bonds may be replaced by single bonds, and/or one or more CH groups may be replaced by N, and where M denotes —O—, —S—, —CH$_2$—, —CHY$^{03}$— or —CY$^{03}$Y$^{04}$—;

Y$^{03}$, Y$^{04}$ denote independently of each other one of the meanings given above for R$^{01}$, F, Cl, CN, OCF$_3$ or CF$_3$;

W$^5$, W$^6$ denote independently of each other —CH$_2$CH$_2$—, —CH=CH—, —CH$_2$—O—, —O—CH$_2$—, —C(R$^c$R$^d$)— or —O—;

R$^c$, R$^d$ denote independently of each other H or alkyl having 1 to 6 C atoms; and R$^{03}$, R$^{04}$ denote independently of each other H, F, straight chain alkyl having 1 to 12 C atoms or branched chain alkyl having 3 to 12 C atoms, where one or more H atoms may be replaced by F.

18. The polymerizable compound according to claim 1, wherein m is an integer 12 to 60.

19. The polymerizable compound according to claim 1, wherein m is an integer from 20 to 60.

20. The polymerizable compound according to claim 1, wherein the polymerizable compound of formula (1) is selected from formulae M1 to M31 and M34c to M34f:

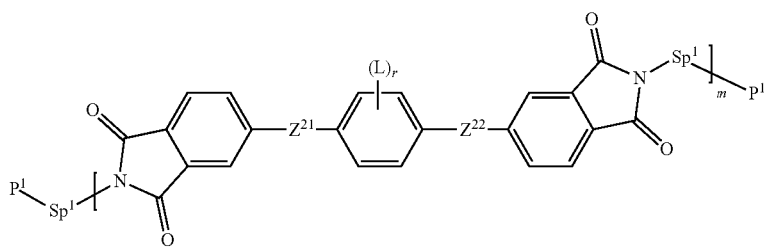

M1

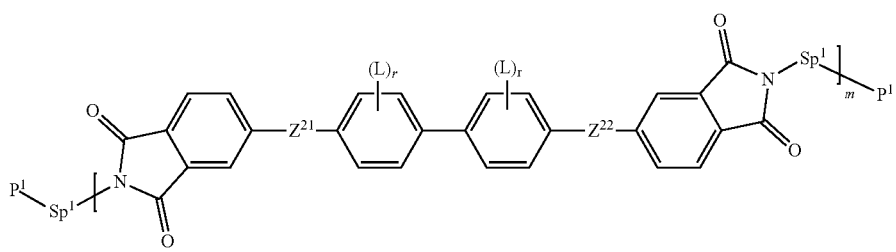

M2

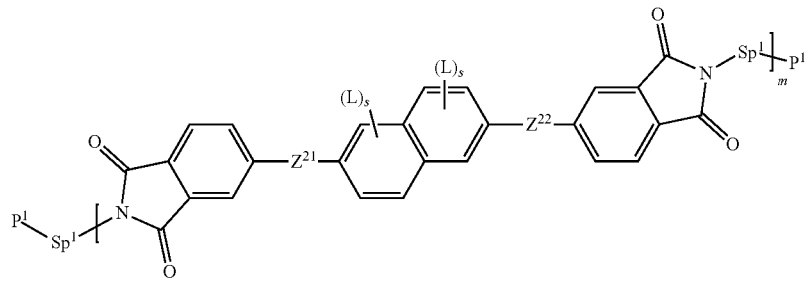
M3
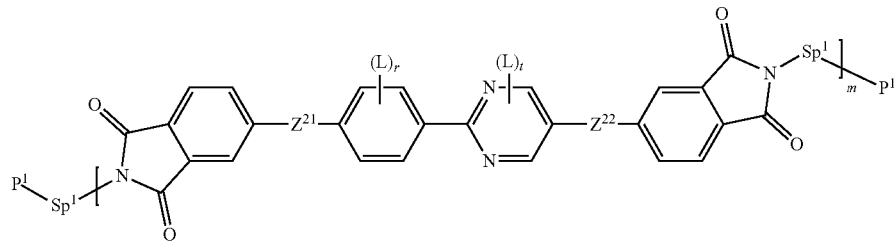
M4
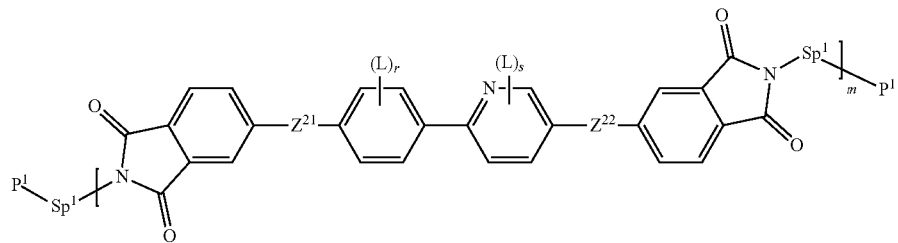
M5
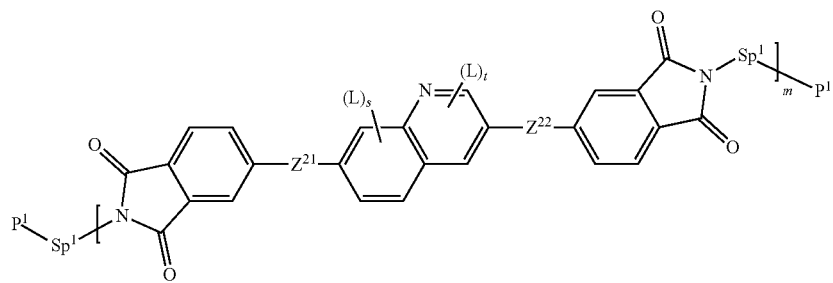
M6
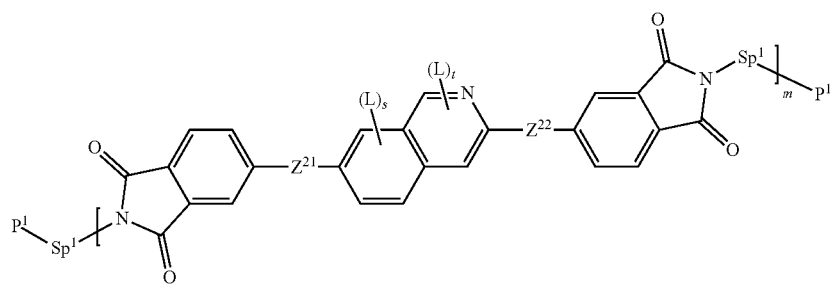
M7
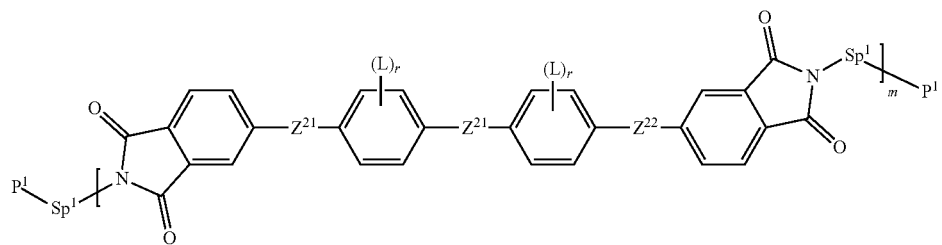
M8

-continued
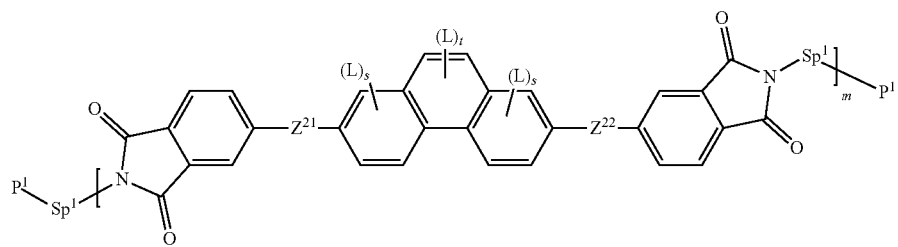
M9
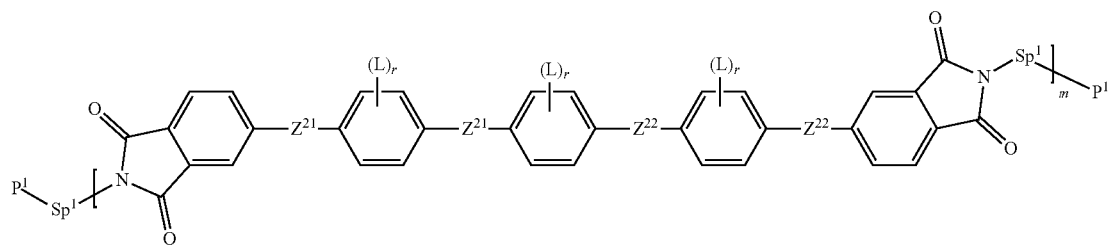
M10
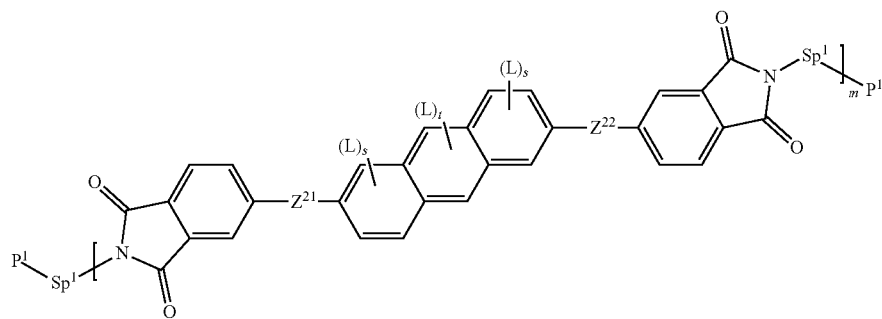
M11
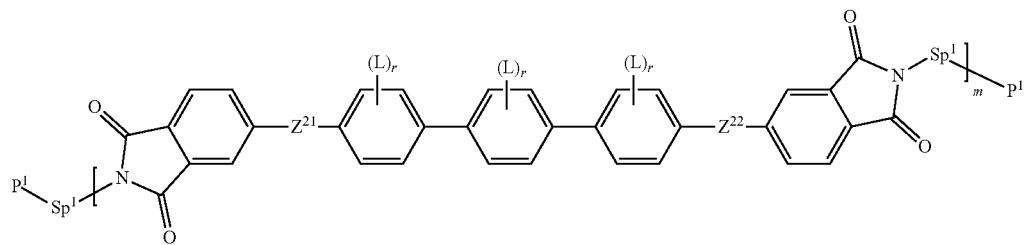
M12
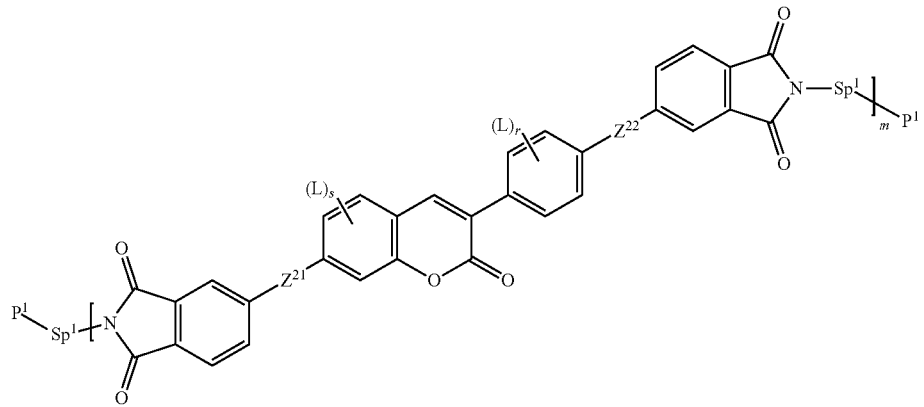
M13

M14
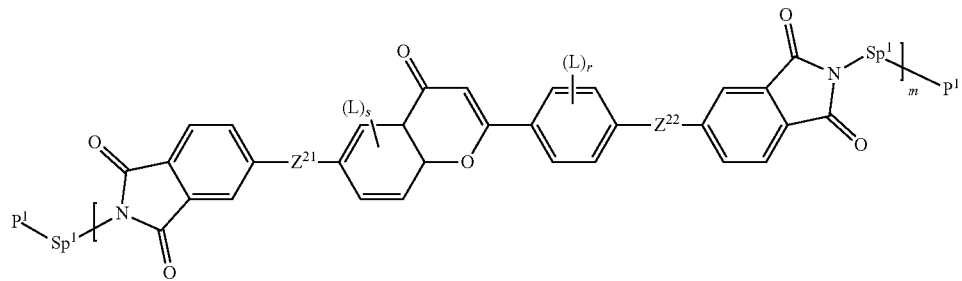
M15
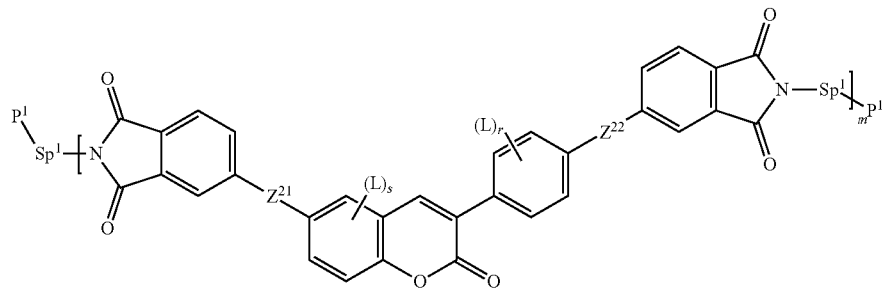
M16
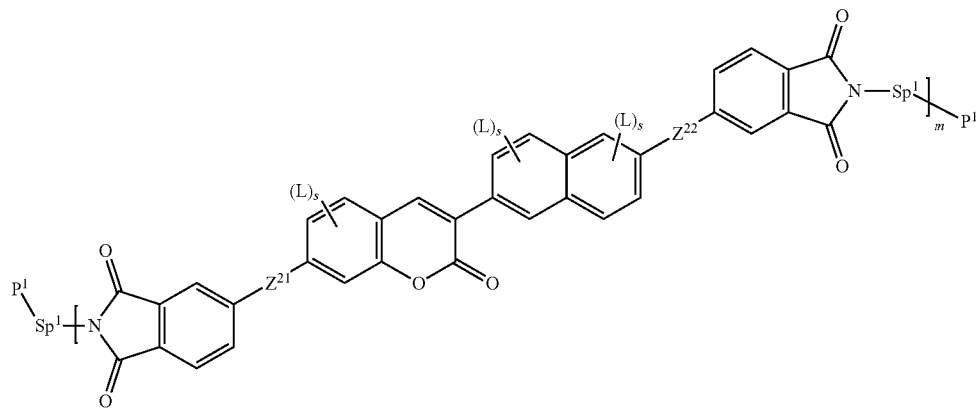
M17
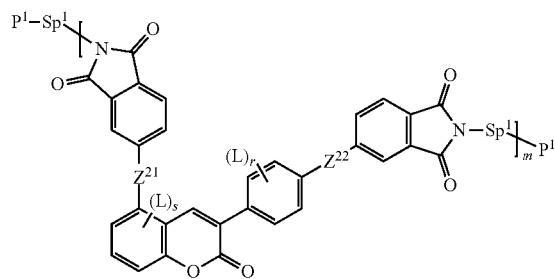
M18
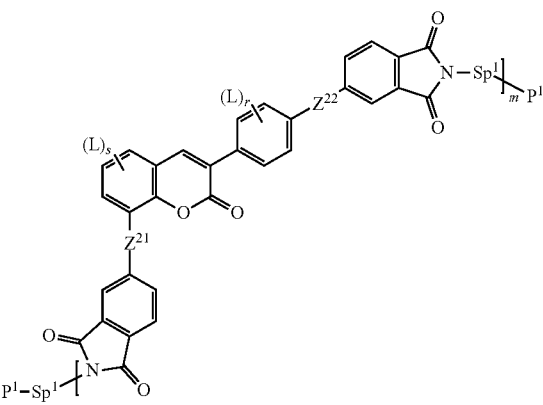

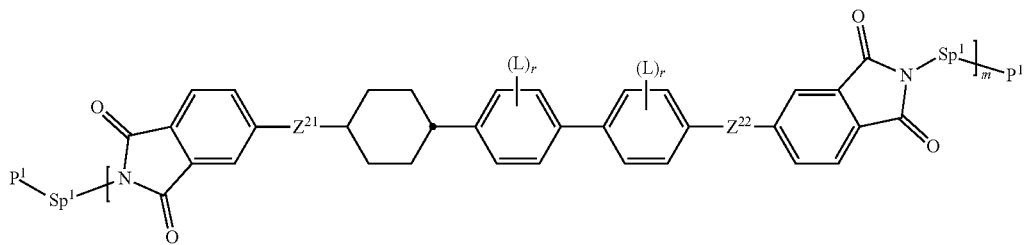
M19
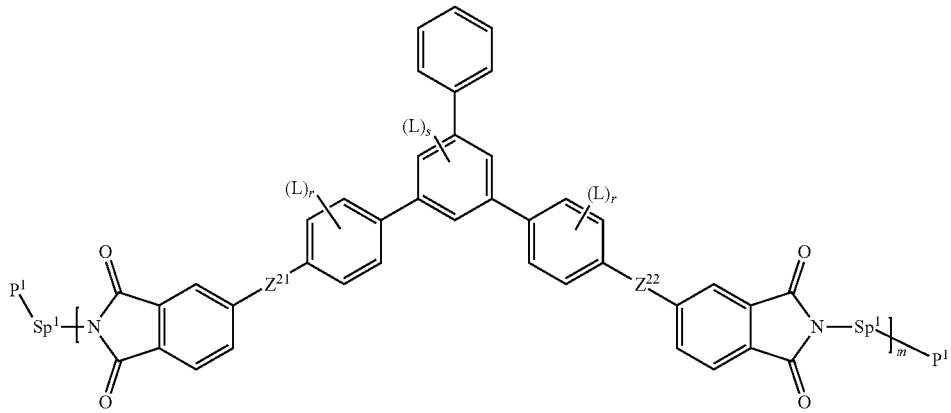
M20
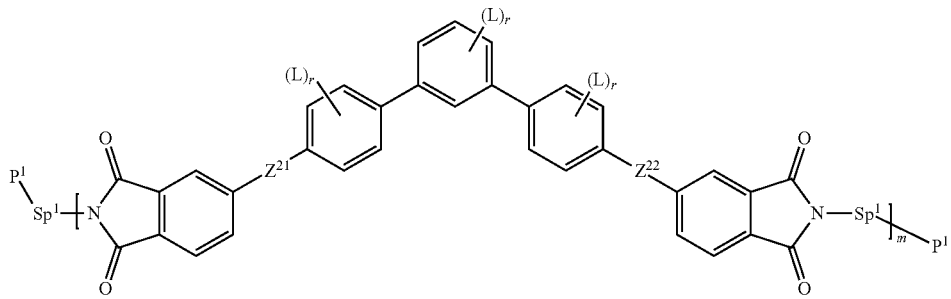
M21
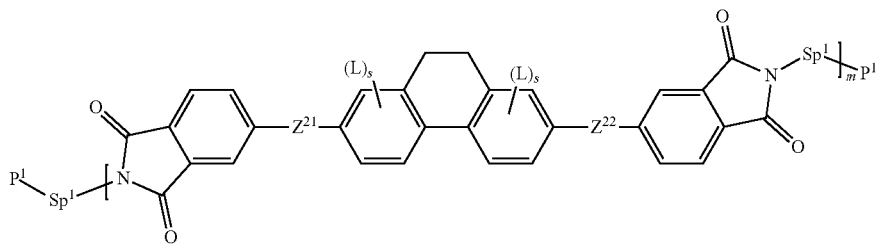
M22
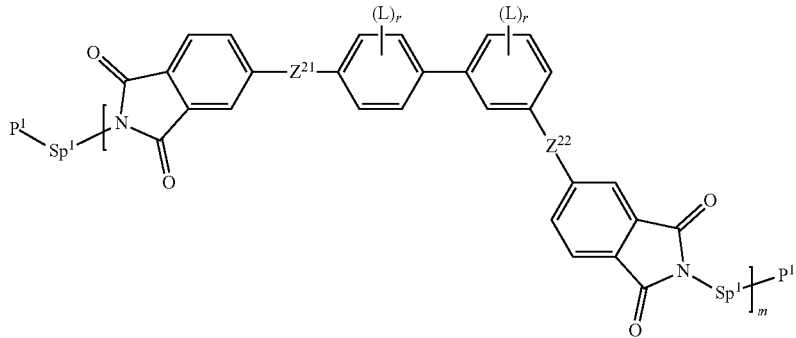
M23

M24
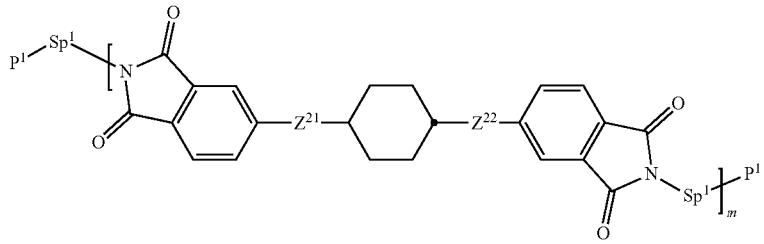
M25
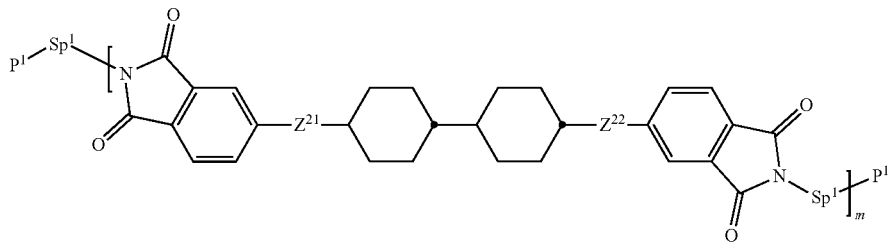
M26
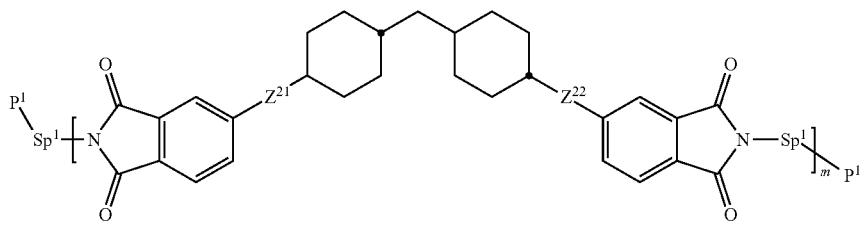
M27
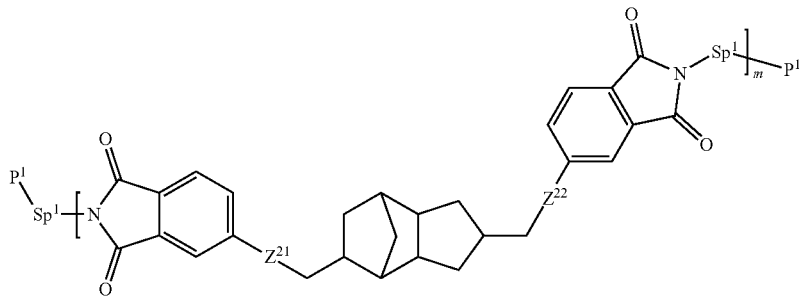
M28
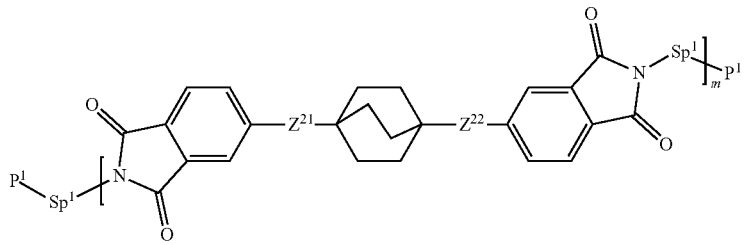
M29
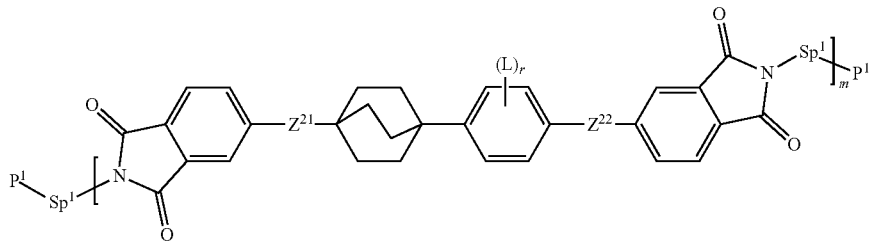

M30

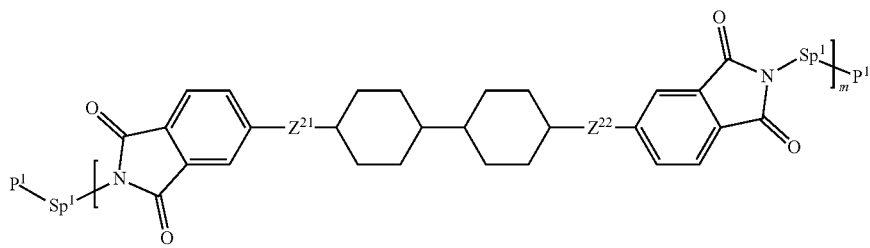

M31

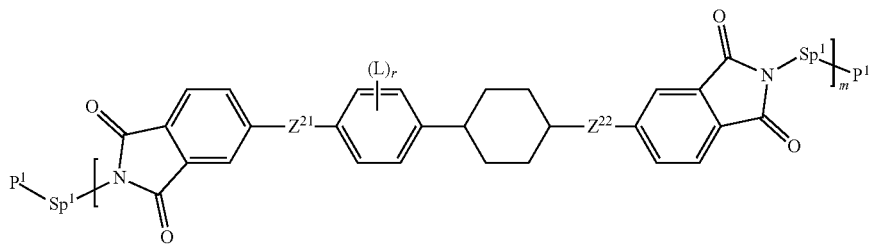

M34c

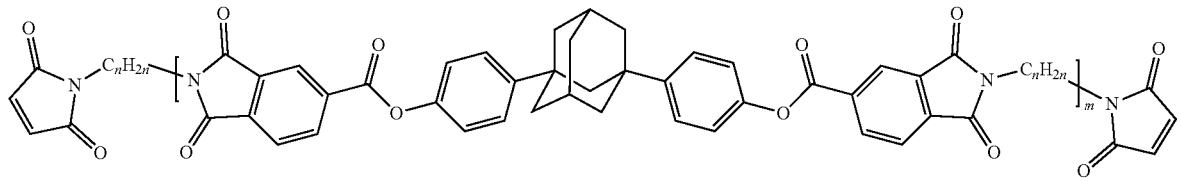

M34d

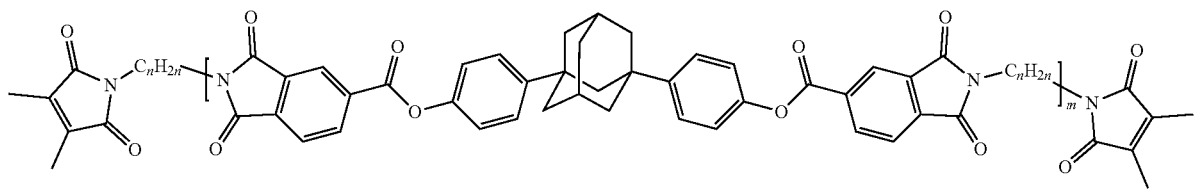

M34e

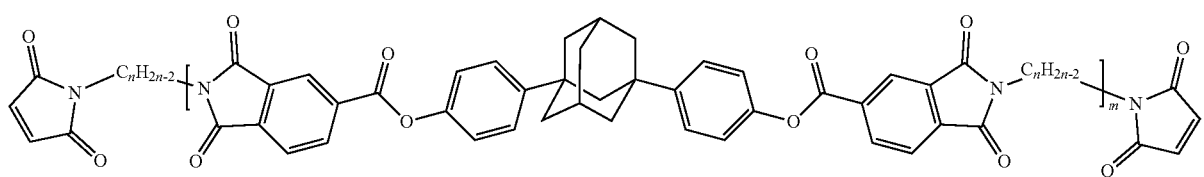

M34f

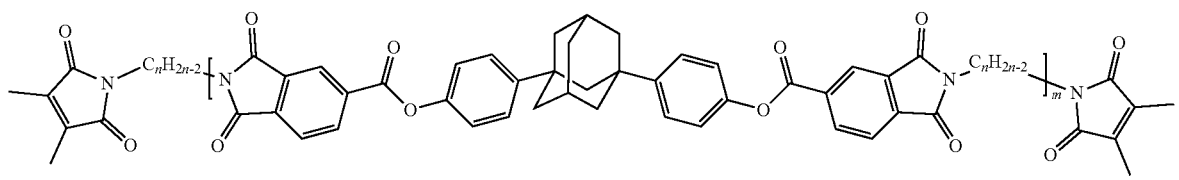

wherein:

L is F, Cl, Br, I, —CN, —NO$_2$, —NCO, —NCS, —OCN, —SCN, —C(=O)NR$^{xx}$R$^{yy}$, —C(=O)OR$^{xx}$, —C(=O)R$^{xx}$, —NR$^{xx}$R$^{yy}$, —OH, —SF$_5$, or straight chain alkyl, alkoxy, alkylcarbonyl, alkoxycarbonyl, alkylcarbonyloxy or alkoxycarbonyloxy with 1 to 20 C atoms, or branched chain alkyl, alkoxy, alkylcarbonyl, alkylcarbonyloxy or alkoxycarbonyloxy with 3 to 20 carbon atoms, wherein one or more H atoms are optionally replaced by F or Cl, —CN straight chain alkyl, alkoxy, alkylcarbonyl, alkoxycarbonyl, alkylcarbonyloxy or alkoxycarbonyloxy with 1 to 6 C atoms, or branched chain alkyl, alkoxy, alkylcarbonyl, alkoxycarbonyl, alkylcarbonyloxy or alkoxycarbonyloxy with 3 to 6 carbon atoms;

R$^{xx}$ and R$^{yy}$ independently of each other denote H or alkyl with 1 to 12 C-atoms;

r is 0, 1, 2, 3 or 4;

s is 0, 1, 2 or 3;

t is 0, 1 or 2;

Z$^{21}$ and Z$^{22}$ are independently and at each occurrence independently from each other, —O—, —S—, —CO—, —COO—, —OCO—, —S—CO—, —CO—S—, —O—COO—, —CO—NR$^{01}$—, —NR$^{01}$—CO—, —NR$^{01}$—CO—NR$^{02}$, —NR$^{01}$—CO—O—, —O—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^{01}$—, —CY$^{01}$=CY$^{02}$—, —C☐C—, —CH=CH—COO—, —OCO—CH=CH—, or a single bond;

R$^{01}$ and R$^{02}$ each, independently of one another, denote H or alkyl having 1 to 12 C atoms;

Sp1 denotes at each occurrence Sp'-X';

Sp' denotes
  a) C$_{1-40}$-straight chain alkylene or C$_{3-40}$-branched chain alkylene, each of which is optionally mono- or polysubstituted by F, Cl, Br, I or CN and in which, in addition, one or more non-adjacent CH$_2$ groups may each be replaced, independently of one another, by —O—, —S—, —NH—, —NR$^{01}$—, —SiR$^{01}$R$^{02}$—, —CO—, —COO—, —OCO—, —OCO—O—, —S—CO—, —CO—S—, —NR$^{01}$—CO—O—, —O—CO—NR$^{01}$—, —NR$^{01}$—CO—NR$^{01}$—, or —CH=CH— in such a way that O and/or S atoms are not linked directly to one another, or
  b) -Sp$^x$-G-Sp$^y$-, wherein Sp$^x$ and Sp$^y$ denote independently of each other C$_{1-20}$-alkylene or a single bond; G denotes C$_{3-20}$-cycloalkylene which is optionally mono- or polysubstituted by C$_{1-20}$-alkyl;

X' denotes —O—, —S—, —CO—, —COO—, —OCO—, —O—COO—, —CO—NR$^{01}$—, —NR$^{01}$—CO—, —NR$^{01}$—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=C—, —N=N—, —CH=CR$^{01}$—, —CY$^{01}$=CY$^{02}$—, —CH=CH—COO—, —OCO—CH=CH— or a single bond;

Y$^{01}$ and Y$^{02}$ each, independently of one another, denote H, F, Cl or CN;

P$^1$ denotes a polymerizable group (P);

n is an integer from 1 to 60; and m is an integer from 2 to 60.

\* \* \* \* \*